(12) United States Patent  
Yamamichi et al.

(10) Patent No.: US 8,048,174 B2  
(45) Date of Patent: Nov. 1, 2011

(54) THEFT PREVENTION SYSTEM

(75) Inventors: Masato Yamamichi, Ota (JP); Masami Yamamichi, legal representative, Ota (JP); Satomi Yamamichi, Ota (JP); Keiko Yamamichi, Maebashi (JP); Toshihisa Nakano, Neyagawa (JP); Kaoru Yokota, Ashiya (JP); Motoji Ohmori, Hirakata (JP); Makoto Tatebayashi, Takarazuka (JP); Shunji Harada, Osaka (JP)

(73) Assignee: Panasonic Corporation, Osaka (JP)

( * ) Notice: Subject to any disclaimer, the term of this patent is extended or adjusted under 35 U.S.C. 154(b) by 1337 days.

(21) Appl. No.: 10/581,442

(22) PCT Filed: Dec. 6, 2004

(86) PCT No.: PCT/JP2004/018169  
§ 371 (c)(1),  
(2), (4) Date: Jan. 4, 2007

(87) PCT Pub. No.: WO2005/056957  
PCT Pub. Date: Jun. 23, 2005

(65) Prior Publication Data  
US 2008/0122595 A1   May 29, 2008

(30) Foreign Application Priority Data  
Dec. 10, 2003   (JP) .................................. 2003-411448

(51) Int. Cl.  
*G06F 21/00* (2006.01)

(52) U.S. Cl. .......................................... 726/35; 713/168
(58) Field of Classification Search .................. None  
See application file for complete search history.

(56) References Cited

U.S. PATENT DOCUMENTS

| | | | |
|---|---|---|---|
| 6,337,621 B1 | 1/2002 | Ogino et al. | |
| 6,525,653 B1 * | 2/2003 | Rigmaiden | 340/426.1 |

FOREIGN PATENT DOCUMENTS

| | | |
|---|---|---|
| JP | 3204006 | 9/1991 |
| JP | 10-100861 | 4/1998 |
| JP | 10-329650 | 12/1998 |
| JP | 2000-052932 | 2/2000 |
| JP | 2002-300637 | 10/2002 |
| JP | 2003-090155 | 3/2003 |

\* cited by examiner

*Primary Examiner* — Gilberto Barron, Jr.  
*Assistant Examiner* — Simon Kanaan  
(74) *Attorney, Agent, or Firm* — Wenderoth, Lind & Ponack, L.L.P.

(57) ABSTRACT

A theft prevention system capable of preventing theft of a target object by disabling the authorized key of the target object in the case where the authorized key has been stolen. When the authorized key is lost, a mobile telephone instructs a vehicle control device to set a warning mode. On receipt of this warning mode instruction, the vehicle control device sets warning mode, generates an electronic key, and transmits the generated electronic key to the mobile telephone, which receives and stores the electronic key. Once the warning mode is set in the vehicle, locking and unlocking are only possible using the electronic key. If the authorized key is found, the mobile telephone instructs the vehicle control device to set the normal mode. Upon receipt of this normal mode instruction, the vehicle control device sets the normal mode in the vehicle.

30 Claims, 30 Drawing Sheets

FIG. 6

EQUIPMENT LIST ~231

| EQUIPMENT ID | MODE | EQUIPMENT COMMUNICATION NUMBER | SECOND ELECTRONIC KEY |
|---|---|---|---|
| CAR 12-34 | 0 | 0909876543 | — |
| CAR 23-56 | 1 | 0909871234 | ab12f64··· |
| PC01 | 0 | abc@defgh.xyz.com | — |
| PC02 | 1 | 0901234567 | f169a45··· |
| MOBILE TELEPHONE 01 | 1 | 0902345678 | 36fed2··· |
| MOBILE TELEPHONE 02 | 0 | 0903456789 | — |
| RESIDENCE 01 | 0 | xyz@abc.def.jp | — |

THEFT PREVENTION SYSTEM

TECHNICAL FIELD

The present invention relates to technology for preventing theft of a target object.

BACKGROUND ART

An immobilizer is well-known as technology for preventing the theft of vehicles and the like. This technology only permits the engine of a vehicle to be started when an ID code transmitted by an IC chip inside the vehicle key matches an ID code of an engine control device inside the vehicle, and disallows operation of the engine using copied keys or any key that is not the authorized key containing the ID code, thereby preventing theft.
Patent Document 1: Japanese Patent No. 3204006

SUMMARY OF THE INVENTION

Problems the Invention Aims to Solve

However, there is a problem with the conventional technology in that, if a third party steals the authorized vehicle key or a vehicle dealer illegitimately distributes or sells the authorized vehicle key to the third party, for example, it is impossible to prevent the third party using the authorized vehicle key to steal the vehicle.

In order solve this problem, an object of the present invention is to provide a theft prevention system, a mobile terminal device, a target object control device, and a device-controlling computer program, that are capable of disabling an authorized key that locks and unlocks an object targeted for theft prevention, and thereby prevent the theft of the object, even when the authorized key has been lost or stolen.

Means to Solve the Problems

In order achieve this object, the present invention is a theft prevention system including an object control device for controlling a prescribed operation of an object targeted for theft prevention, and a mobile terminal device for instructing the object control device to control the prescribed operation, the mobile terminal device having: an instruction transmitting unit operable to transmit to the object control device a warning mode instruction indicating to set a warning mode; an electronic key receiving unit operable to receive an electronic key from the object control device; an electronic key storage unit; an electronic key writing unit operable to write the received electronic key to the electronic key storage unit; and a control instructing unit operable to instruct the object control device to control the prescribed operation, using the stored electronic key, and the object control device comprising: an instruction receiving unit operable to receive the warning mode instruction; a mode setting unit operable to set the warning mode on receipt of the warning mode instruction; an electronic key generating unit operable to generate the electronic key on receipt of the warning mode instruction; an electronic key transmitting unit operable to transmit the generated electronic key to the mobile terminal device; and an object control unit operable, when the warning mode has been set, to control the prescribed operation exclusively in accordance with the control instruction from the mobile terminal device using the electronic key.

Effects of the Invention

According to this construction, the target object control device receives a warning mode instruction indicating to set the warning mode, sets the warning mode, generates an electronic key and transmits the electronic key to the mobile terminal device, where it is subsequently stored. When the warning mode has been set, the target object control device only permits the target object to be controlled in accordance with instructions from the mobile terminal device using the electronic key. Consequently, this construction has the advantage that the authorized key can be disabled to prevent theft of the target object, even when the authorized key to the target object has been stolen.

Here, the instruction transmitting unit may further transmit to the object control device a normal mode instruction indicating to set a normal mode, and the mobile terminal device may further include: a completion notification receiving unit operable to receive from the object control device a completion notification that indicates completion of normal mode setting; and an electronic key deleting unit operable to delete the stored electronic key on receipt of the completion notification.

The instruction receiving unit may further receive from the mobile terminal device a normal mode instruction indicating to set a normal mode, on receipt of the normal mode instruction, the mode setting unit may further set the normal mode, the object control device may further include a completion notification transmitting unit operable to transmit to the mobile terminal device a completion notification indicating completion of normal mode setting, and when the normal mode has been set, the object control unit may prohibit the prescribed operation from being performed in accordance with the control instruction from the mobile terminal device using the electronic key.

This construction has the advantage that the electronic key stored by the mobile terminal device can be disabled to prevent theft of the target object, even if the mobile terminal device is stolen.

Here, the electronic key storage unit may be a portable memory card.

According to this construction, the electronic key is recorded on a portable memory card, which enables other mobile terminal devices to use the electronic key by loading the portable memory card.

Here, the mobile terminal device may be a mobile telephone, the instruction transmitting unit may transmit the warning mode instruction via a mobile telephone network, and the electronic key receiving unit may receive the electronic key via the mobile telephone network.

The mobile terminal device may be a mobile telephone, and the instruction receiving unit may receive the warning mode instruction from the mobile telephone via a mobile telephone network.

According to this construction the mobile terminal device can receive the electronic key from the object control device, even if the mobile terminal device and the target object are located far away from each other.

Here, the control instructing unit may instruct the object control device to control the prescribed operation, by transmitting the electronic key and control instruction information prescribing the control, by short range radio to the object control device.

The object control unit may receive the electronic key and control instruction prescribing the control of the prescribed operation of the target object from the mobile terminal device by short-range radio, and control the prescribed operation in accordance with the received control instruction using the received electronic key.

According to this construction, the mobile terminal device is able to output control instruction information to the target object control device as a result of the user bringing the mobile terminal device near to the target object control device.

Here, when the warning mode has been set, the object control unit may prohibit a prescribed operation from being performed using a mechanical key.

According to this construction the mechanical key can be disabled when it has been lost.

Here, when the normal mode has been set, the object control unit may control the prescribed operation of the target object in accordance with a mechanical key.

According to this construction, the mechanical key can be enabled if it is found.

Here, the instruction receiving unit may receive the warning mode instruction from the mobile terminal device.

According to this construction, the mobile terminal device that outputs the warning mode instruction also outputs the control instruction to the target object control device using the electronic key, so the two functions can be integrated in a single device, which is convenient for the user.

Here, the instruction receiving unit may receive the warning mode instruction from a mobile terminal device other than the mobile terminal device.

According to this construction, the mobile terminal device that outputs the warning mode instruction is a different device to the output mobile terminal device that outputs the control instruction to the target object control device using the electronic key. Consequently, the target object cannot be stolen even if the mobile terminal device that outputs the warning mode instruction is lost.

Here, the target object may be provided with a sensor unit operable to output the warning mode instruction to the object control device on sensing an irregularity, and the instruction receiving unit may receive the warning mode instruction from the sensor unit.

According to this construction, the target object control device sets the warning mode if a force is exerted on the target object, enabling theft of the of the target object to be prevented.

BRIEF DESCRIPTION OF THE DRAWINGS

FIG. 4 shows an exemplary screen displayed by the display unit 107 (cont.

FIG. 5 shows an exemplary screen displayed by the display unit 107;

FIG. 6 shows an exemplary data structure of an equipment list 231 stored in an information storage unit 202;

FIG. 7 is a block diagram showing a construction of a vehicle control device 300a;

FIG. 15 is the flow-chart showing operations for setting the warning mode (cont. from FIG. 14);

FIG. 17 is the flow-chart showing operations for setting the normal mode (cont. from FIG. 16);

FIG. 19 is the flow-chart showing the locking and unlocking operations (cont. from FIG. 18);

FIG. 20 is a flow-chart showing operations of a door-lock mechanism 322a;

FIG. 26 is the flow-chart showing operations for disabling the vehicle (cont. from FIG. 25);

DETAILED DESCRIPTION OF THE INVENTION

1. First Embodiment

Figure 1:
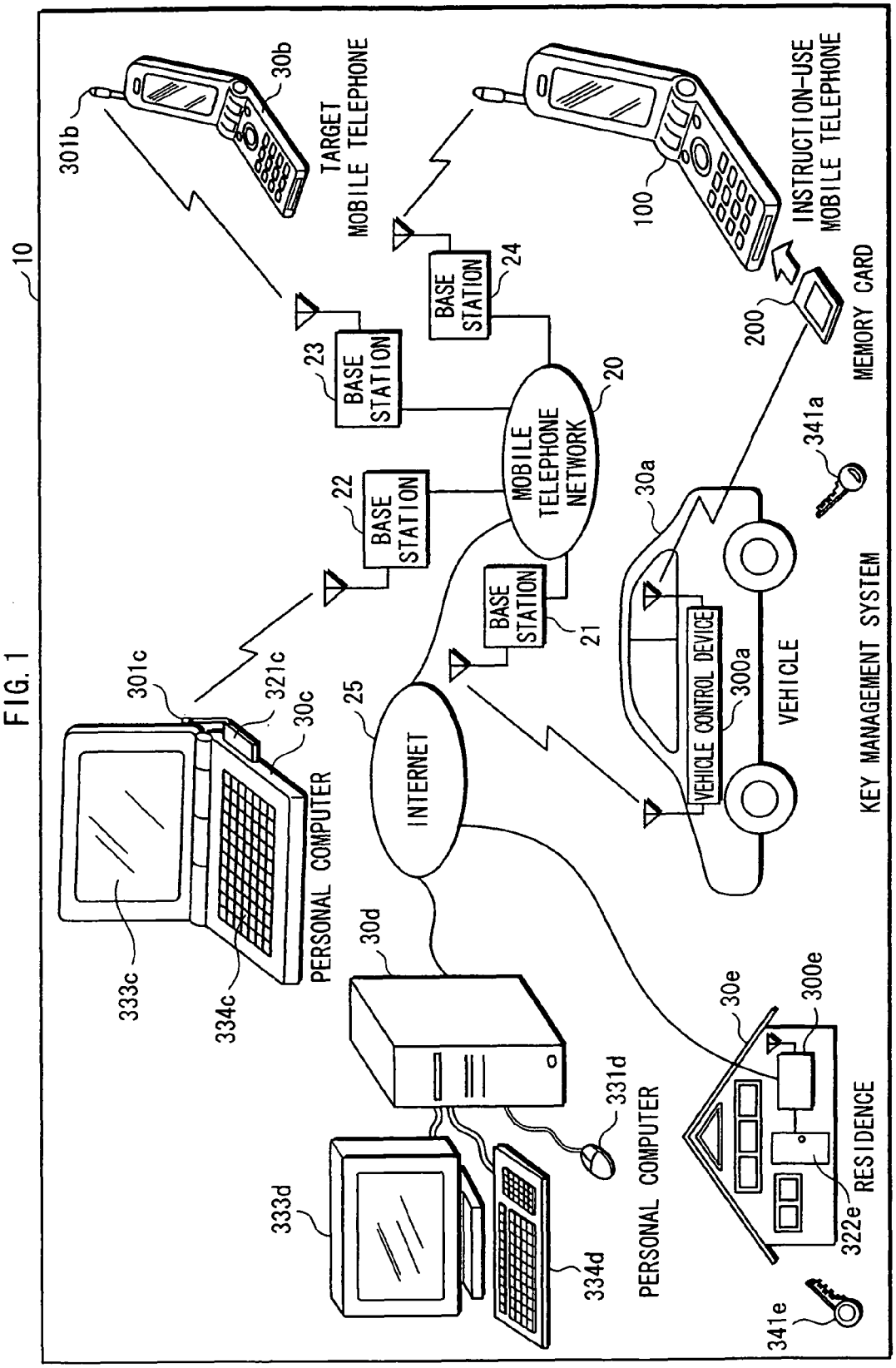
FIG. 1 shows the construction of a key management system 10 of a first embodiment.

Key management system 10 is described as a first embodiment of the present invention.

1.1 Construction of Key Management System 10

The key management system 10 is constituted from an instruction-use mobile telephone 100, a memory card 200, a vehicle 30a, a target mobile telephone 30b, a personal computer 30c, a personal computer 30d, and a residence 30e.

The memory card 200 is loaded in the instruction-use mobile telephone 100, a vehicle control device 300a is installed in the vehicle 30a, a communications card 321c is loaded in the personal computer 30c, a mouse 331d, a display 333d, and a keyboard 334d are connected to the personal computer 30d, and a door 322e and a door control device 300e are installed in the residence 30e.

The instruction-use mobile telephone 100, the target mobile telephone 30b, the vehicle control device 300a, and the communications card 321c are each connected to a mobile telephone network 20 via a radio base station. The personal computer 30d and the door control device 300e are connected to the Internet 25. Further, the mobile telephone network and the Internet 25 are connected to each other.

The vehicle 30a and the target mobile telephone 30b, the personal computer 30c, the personal computer 30d, and the residence 30e are each set to either a normal mode and a warning mode. The normal mode and the warning mode are described in a later section.

Figure 7:
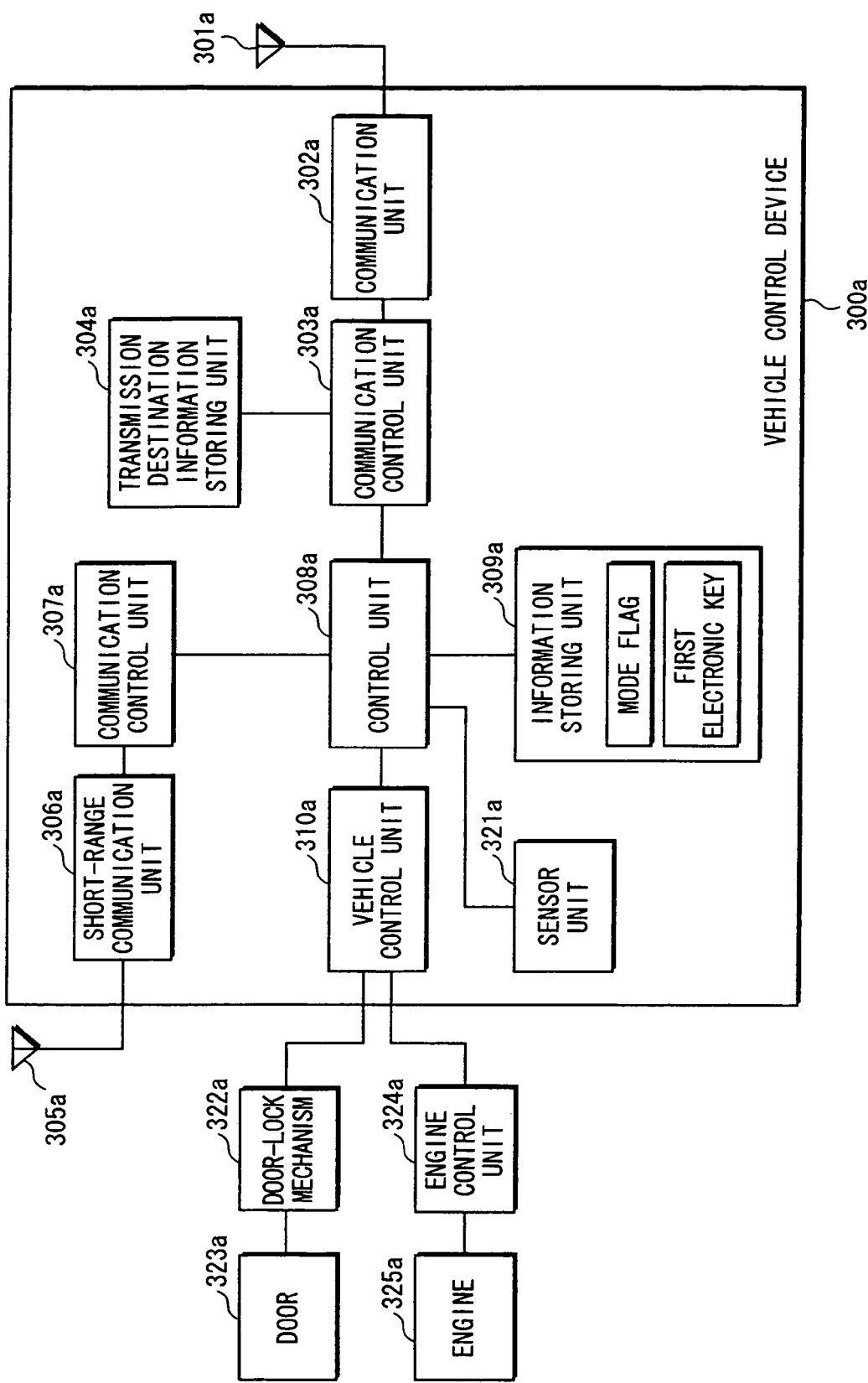

The vehicle 30a is constructed to include a door 323a, a door-lock mechanism 322a, an engine 325a and an engine control unit 324a, as shown in FIG. 7. The door-lock mechanism 322a permits a specific mechanical key 341a to lock or unlock the door 323a when the vehicle 30a is in the normal mode. However, operations to lock or unlock the door 323a using the mechanical key 341 are disregarded when the vehicle 30a is in the warning mode. The engine control unit 324a starts or stops the engine 325a using the specific mechanical key 341a when the vehicle is in the normal mode. But here again, operations to start or stop the engine 325a using the mechanical key 341 are disregarded when the vehicle 30a is in the warning mode.

If a vehicle user loses the mechanical key 341a when the vehicle 30a is in the normal mode, the user instructs the instruction-use mobile telephone 100 to output to the vehicle control device 300a, via the radio base station 24 and mobile telephone network 20, a warning mode setting request to switch the vehicle 30a from the normal mode to the warning mode. On receipt of the warning mode setting request, the vehicle control device 300a sets the vehicle 30a to the warning mode by setting the warning mode, generates a first electronic key, and securely outputs the generated first electronic key to the memory card 200 via the radio base station 21, the mobile telephone network 20, the radio base station 24, and the instruction-use mobile telephone 100. The memory card 200 stores the received first electronic key as a second electronic key.

When the vehicle 30a is in the warning mode, the door-lock mechanism 322a of the vehicle 30a disregards operations to lock or unlock the door 323a using the mechanical key 341a. Consequently, the door 323a will not be locked or unlocked, even if a third party acquires the mechanical key 341a and attempts to use it. Moreover, when the vehicle 30a is in the warning mode, the engine control unit 324a disregards operations to start or stop the engine 325a using the mechanical key 341a. Consequently, the engine 325a, the engine will not start or stop, even if a third party acquires the mechanical key 341a and attempts to use it.

When the vehicle 30a is in the warning mode, an instruction from the user of the instruction-use mobile telephone 100 causes the memory card 200 storing the second electronic key to securely transmit the stored second electronic key by short-range radio to the vehicle control device 300a. The vehicle control device 300a receives the second electronic key, compares the received second electronic key with the stored first electronic key, and if they match, controls the door-lock mechanism 322a so as to lock or unlock the door 323a of the vehicle 30a.

If a mechanical key 341a that has been lost is found, the user instructs the instruction-use mobile telephone 100 to output to the vehicle control device 300a the normal mode setting request to switch from the warning mode to the normal mode, via the radio base station 24 and mobile telephone network 20. On receipt of the normal mode setting request, the vehicle control device 300a then securely receives the second electronic key from the memory card 200, judges whether the received second electronic key matches the stored first electronic key, and judging affirmatively, sets the vehicle 30a to the normal mode, and deletes the stored first electronic key.

When the vehicle 30a is in the normal mode, the door-lock mechanism 322a permits locking and unlocking of the door 323a of the vehicle 30a using the mechanical key 341a. Consequently, if the user finds the mechanical key 341a, they can use it to lock and unlock the door 323a. When the vehicle 30a is in the normal mode, the engine control unit 324a permits starting or stopping of the engine 325a using the mechanical key 341a. Consequently, if the user finds the mechanical key 341a, they can use it to start or stop the engine 325a.

The instruction-use mobile telephone 100 and memory card 200 similarly set the residence 30e to either the normal mode or the warning mode via the mobile telephone network 20 and the Internet 2 in response to a user instruction. When in the normal mode, the door 322e is locked and unlocked using the mechanical key 341e. When in the warning mode, on the other hand, attempts to lock or unlock the door 322 using the mechanical key 341e are disregarded, and the door 322e is locked or unlocked instead by the memory card 200 performing a locking or unlocking operation on the door control device 300e.

The instruction-use mobile telephone 100 and the memory card 200 similarly set the target mobile telephone 30b to either the normal mode or the warning mode via the mobile telephone network 20 in response to a user instruction. When in the normal mode, the target mobile telephone 30b is used normally by a user. When in the warning mode, on the other hand, a power source unit 321b of the target mobile telephone 30b is locked. Power is not supplied to the various components of the target mobile telephone 30b that have calling functions and the like, preventing these functions from being used by normal operations. The target mobile telephone 30b can be only used when the power source unit 321b has been unlocked. The memory card 200 unlocks the power source unit 321b of the target mobile telephone 30b.

The instruction-use mobile telephone 100 and the memory card 200 similarly set the personal computer 30c to either the normal mode or the warning mode via the mobile telephone network 20 in response to a user instruction. When in the normal mode, the personal computer 30c is used normally by a user. When in the warning mode, a power source unit 335c of the personal computer 30c is locked. Power is not supplied to the various components of the personal computer 30c that have various computer-related functions, preventing these functions from being used by normal operations. The personal computer 30c can only be used when the power source unit 321c has been unlocked. The memory card 200 unlocks the power source unit of the target mobile telephone 30b.

The instruction-use mobile telephone 100 and the memory card 200 similarly set the personal computer 30d to either a normal mode or a warning mode via the mobile telephone network 20 and the internet 25 in response to a user instruction. When in the normal mode, the personal computer 30d is used normally by a user. When in the warning mode, on the other hand, a keyboard 334d, and a mouse 331d of the personal computer 30d are locked, and no input operations are possible. Input operations on the personal computer 30d are only possible when the keyboard 334d and the mouse 331d have been unlocked. The memory card 200 unlocks the keyboard 334d and the mouse 331d of the personal computer 30d.

1.2 Instruction-Use Mobile Telephone 100

Figure 2:
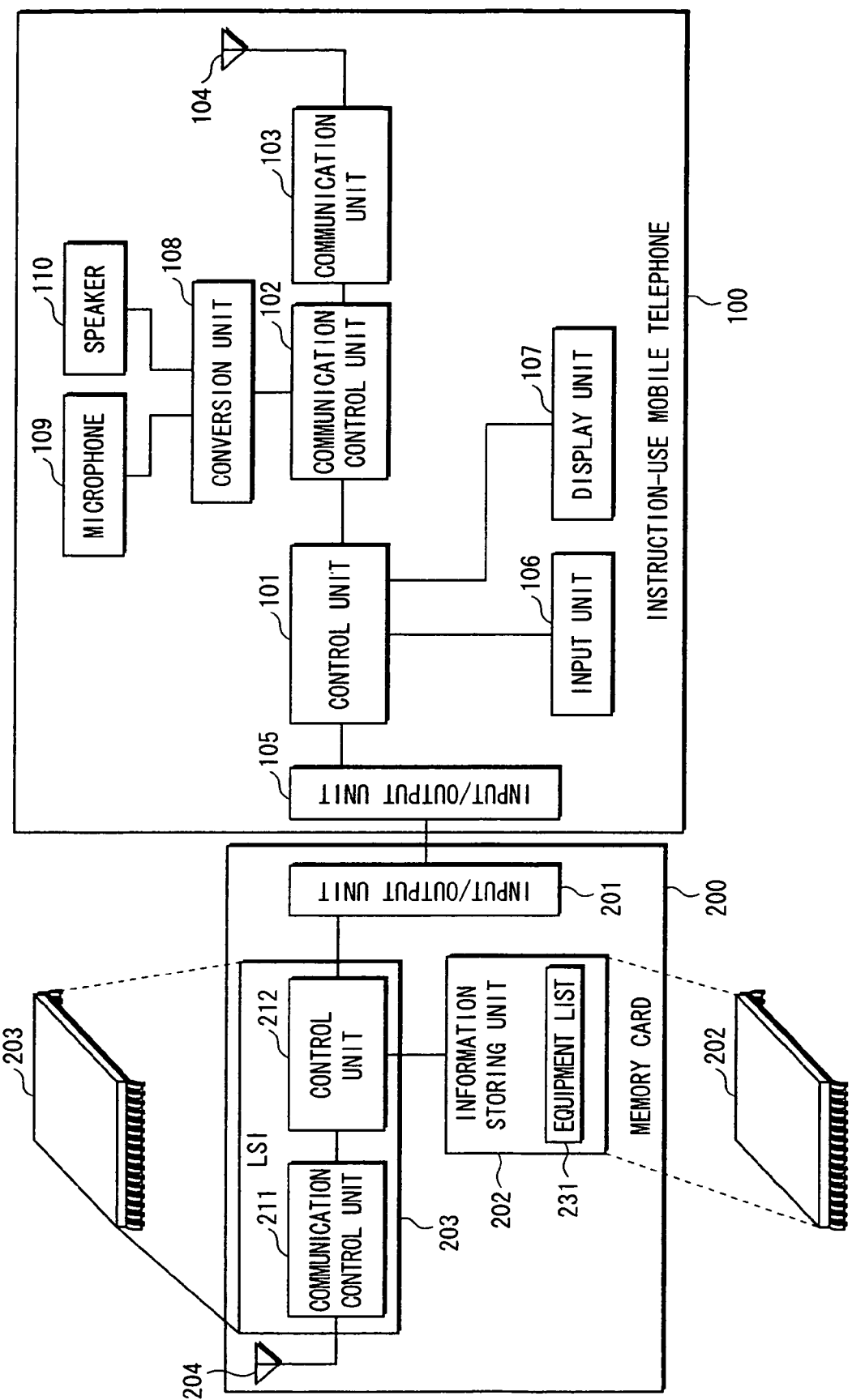
FIG. 2 is a block diagram showing the construction of an instruction-use mobile telephone 100 and a memory card 200.

The instruction-use mobile telephone is constructed from a control unit 101, a communication control unit 102, a communication unit 103, an antenna 104, an input/output unit 105, an input unit 106, a display unit 107, a conversion unit 108, a microphone 109, and a speaker 110, as shown in FIG. 2.

Specifically, the instruction-use mobile telephone 100 is a computer system constructed from a microprocessor, ROM, RAM, and the like. The RAM has a computer program stored therein. The instruction-use mobile telephone 100 realizes a portion of its functions as a result to the microprocessor operating in accordance with the computer program.

(1) Antenna 104, Communication Unit 103, Communication Control Unit 102, Microphone 109, Speaker 110, and Conversion Unit 108

The communication unit 103 amplifies the radio frequency signal received by the antenna 104, converts the output signal into an IF signal, amplifies the IF signal, and demodulates the amplified IF signal to a baseband signal. The communication unit 103 also modulates a high frequency signal using the baseband signal, converts the modulated output to a radio frequency, amplifies the radio frequency signal, and outputs the amplified radio frequency signal to the antenna 104.

The communication control unit 102 generates a baseband signal and outputs it to the communication unit 103, and further receives a baseband signal from the communication unit 103.

This enables the communication control unit 102, the communication unit 103, and the antenna 104 to transmit/receive information to and from other connected communications devices via the radio base station 24 and the mobile telephone network 20.

The microphone 109 converts a user's voice into an analog electrical signal, and outputs the analog electrical signal to the conversion unit 108. The speaker 110 receives the voice analog electrical signal from the conversion unit 108, and outputs sound. The conversion unit 108 converts analog electrical signals into digital signals, and converts digital signals into analog electrical signals.

(2) Display Unit 107

Figure 3:
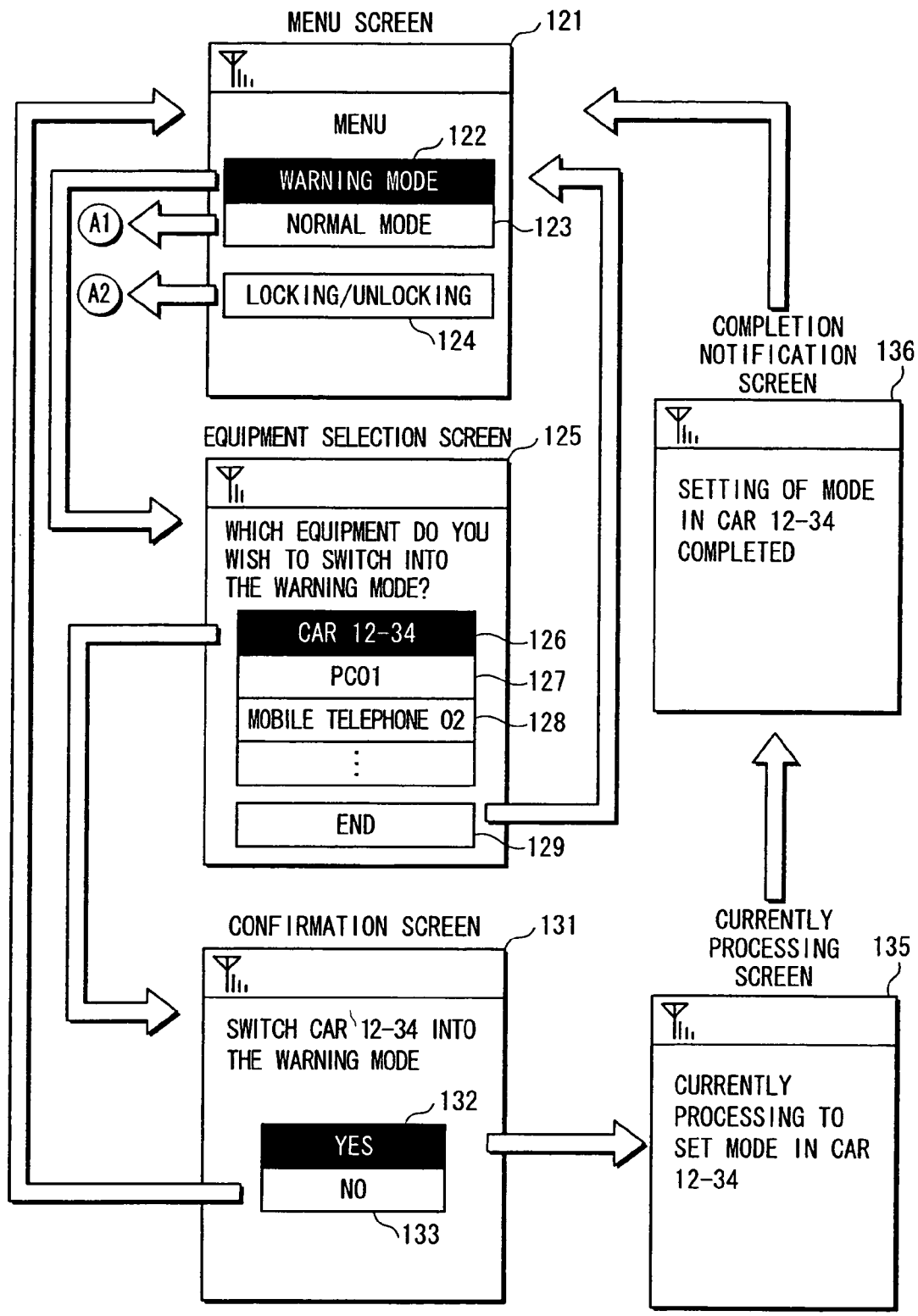
FIG. 3 shows an exemplary screen displayed by a display unit 107 (cont.
Figure 4:
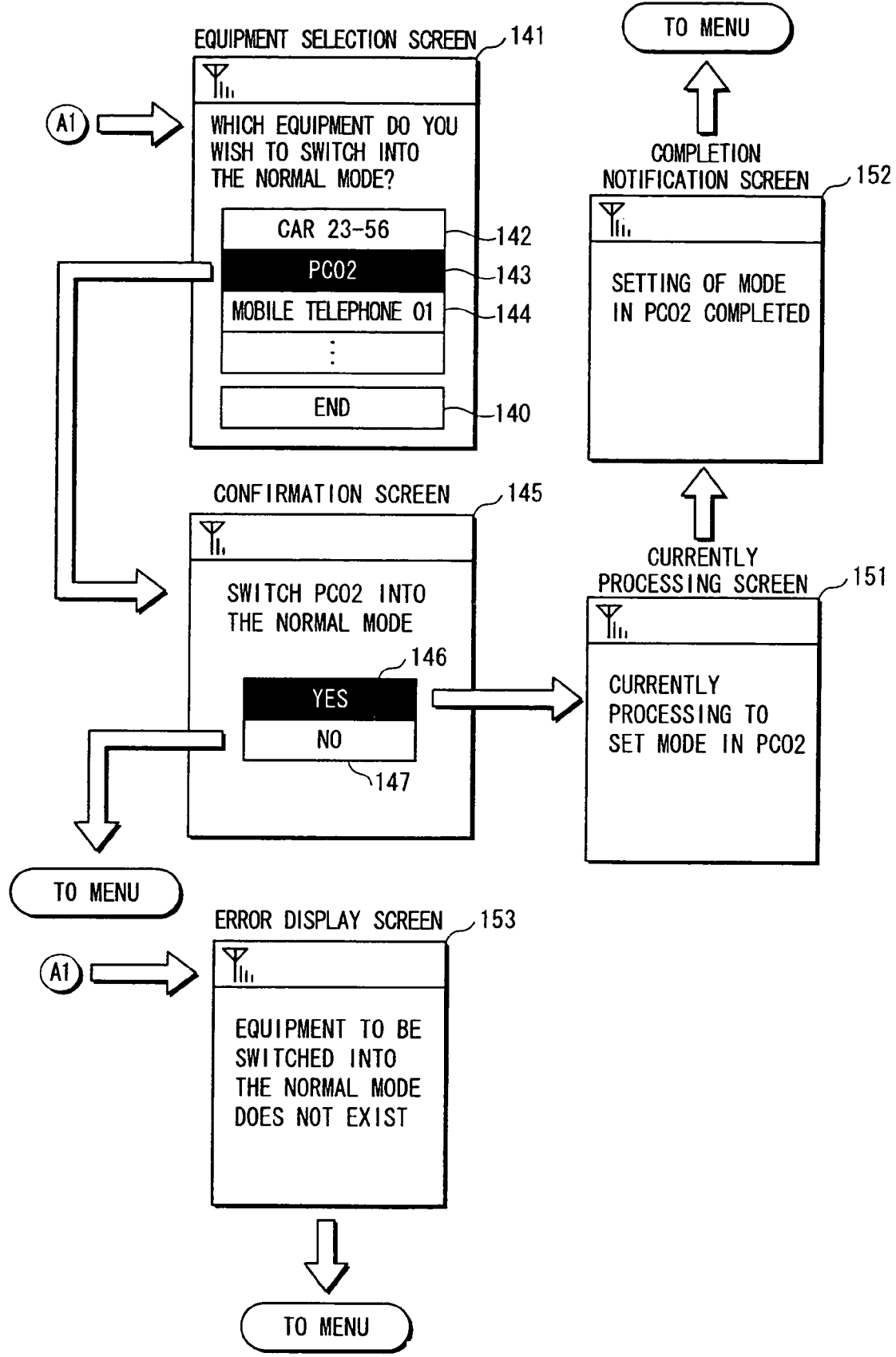
in FIG. 4)
Figure 5:
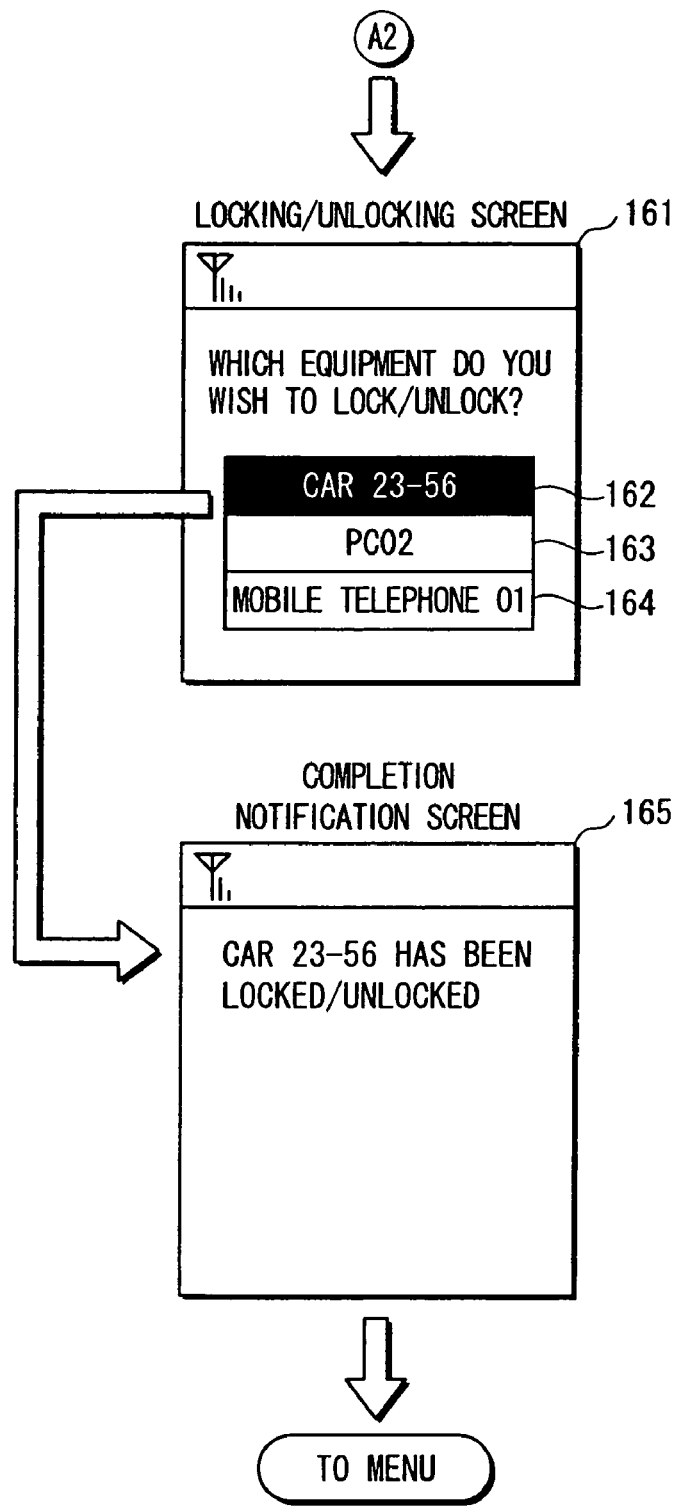
in FIG. 5)

The display unit 107 displays a menu screen 121, an equipment selection screen 125, a confirmation screen 131, a currently processing screen 135, a completion notification screen 136, an equipment selection screen 141, a confirmation screen 145, a currently processing screen 151, a completion notification screen 152, an error display screen 153, a lock-unlock screen 161, and a completion notification screen 165, as shown in FIGS. 3 to 5, as well as other screens not depicted, under the control of the control unit 101.

As shown in FIG. 3, the menu screen 121 includes options 122, 123 and 124 corresponding to which "warning mode", "normal mode" and "lock/unlock" are displayed respectively. The options 122, 123 and 124 are commands for setting the warning mode, setting the normal mode, and locking/unlocking, respectively. When the user selects one of these options, setting the warning mode, setting the normal mode, or locking/unlocking is carried out accordingly.

The equipment selection screen includes options 126, 127, 128, . . . , and option 129, as shown in FIG. 3. "Car 12-34", "PC01", "mobile telephone 02", . . . , are displayed as examples of the options 126, 127 and 128, . . . , respectively. "Car 12-34", "PC01", "mobile telephone 02", . . . , are equipment IDs, each of which is an identifier for identifying a piece of equipment such as a car, a personal computer, a mobile telephone, or the like. When the user selects one of the options 126, 127, and 128, processing to set warning mode begins for the equipment ID of the selected option. When the option 129, which indicates "end", is selected, equipment selection ends, and the display unit 107 then displays the menu screen 121.

The confirmation screen 131 includes options 132 and 133. "YES" and "NO" are displayed for the options 132 and 133, respectively, as shown in FIG. 3. When the user selects option 132, setting of the warning mode is performed, and when option 133 is selected, setting of the warning mode is cancelled.

The currently processing screen 135 contains a message indicating that mode setting is being performed the relevant equipment.

The completion notification screen 136 contains a message indicating that mode setting has been completed for the relevant equipment.

The equipment selection screen 141 includes options 142, 143, 144, . . . , as shown in FIG. 4. "Car 23-56", "PC02", "mobile telephone 01" . . . are displayed as examples of the options 142, 143, and 144, . . . , respectively. "Car 23-56", "PC02", "mobile telephone 01" . . . are equipment IDs. When the user selects one of the options 142, 143, 144, . . . , the processing to set the normal mode begins for the equipment identified by the equipment ID of the selected option. When the option 140, which indicates "end", is selected, equipment selection ends, and the display unit 107 then displays the menu screen 121.

The confirmation screen 145 includes options 146 and 147. "YES" and "NO" are displayed for options 146 and 147 respectively, as shown in FIG. 4. When the option 147 is selected by the user, processing to set the normal mode is performed, and when the option 147 is selected, setting of the normal mode is cancelled.

The currently processing screen 151 contains a message indicating that mode setting is being performed for the relevant equipment.

The completion notification screen 152 includes a message indicating that the mode setting has been completed for the relevant equipment.

The error display screen 153 indicates that an error has occurred, and displays, for instance, a message indicating that the equipment to be set to the normal mode does not exist, as shown in FIG. 4.

The lock-unlock screen 161 includes the options 162, 163, 164, as shown in FIG. 5. "Car 23-56", "PC02", and "mobile telephone 01" are displayed as examples of the options 162, 163, and 164, respectively. "Car 23-56", "PC02", "mobile telephone 01" are equipment IDs. When the user selects one of the options 162, 163, or 164, the locking or unlocking is performed in relation to the equipment ID of the selected option.

The completion notification screen 165 contains a message indicating that the locking or unlocking of the relevant equipment has been completed.

(3) Control Unit 101

Menu Screen 121 Display and Selected Option Reception

The control unit 101 generates the menu screen 121 shown in FIG. 3 in response to a user instruction, and outputs the generated menu screen 121 to the display unit 107 in response to a user instruction.

Next, the control unit 101 receives one of the options 122, 123 and 124 displayed on menu screen 121 via the input unit as a result of a user selection. On receipt of one of the options 122, 123, and 124, the control unit 101 performs the setting of the warning mode, the setting of the normal mode, or the locking or unlocking accordingly.

Overview of Setting Warning Mode

On receipt of option 122, the control unit 101 reads an equipment list that includes the equipment information relating to the equipment that is to be set to the warning mode, from the memory card 200 via the input/output unit 105. The control unit 101 then generates the equipment selection screen 125 from the read equipment list, outputs the generated equipment selection screen 125 to the display unit 107, and instructs the display unit 107 to display the equipment selection screen 125.

Next, the control unit 101 receives one of the options from the equipment selection screen via the input unit 106, and acquires the equipment ID corresponding to the received option.

Next, on receipt of the option 132 included in the confirmation screen 131 via the input unit 106, the control unit 101 performs the processing for setting the warning mode.

Summary of Setting Normal Mode

On receipt of the option 123, the control unit 101 reads the equipment list that includes the equipment information relating to the equipment that is to be set to the normal mode, from the memory card 200 via the input/output unit 105, generates the equipment selection screen 141 from the read equipment list, outputs the generated equipment selection screen 141 to the display unit 107, and instructs the display unit 107 to display the equipment selection screen 141.

Next, the control unit 101 receives one of the options included in the equipment selection screen 141 via the input unit 106, and acquires the equipment ID corresponding to the received option.

Next, on receipt of the selection of option 146 included in the confirmation screen 145 via the input unit 106, the control unit 101 receives performs the processing to set the normal mode.

Overview of Locking and Unlocking

On receipt of the option 124, the control unit 101 performs the processing for unlocking or locking.

Detailed Description of Reading the Equipment List

The control unit 101 reads the equipment list from the memory card 200 via the input/output unit 105 as follows.

The control unit 101 outputs to the memory card 200 an equipment list request indicating to read the equipment list, via the input/output unit 105. The control unit 101 outputs to the memory card 200, via the input/output unit 105, information indicating the warning mode when the equipment is to be set to the warning mode, and information indicating the normal mode when the equipment is to be set to the normal mode.

Next the control unit 101 and the memory card perform mutual authentication. The mutual authentication is performed using a challenge response method. If the mutual authentication is completed successfully, the control unit 101 receives from the memory card 200 via the input/output unit 105 either the equipment information relating to the equipment that is to be set to the warning mode or the normal mode, or null information indicating nonexistence of relevant equipment information.

Detailed Description of Setting Warning Mode

The control unit 101 generates the currently processing screen 135, and outputs the generated currently processing screen 135 to the display unit 107.

Next, the control unit 101 outputs the acquired equipment ID corresponding to the received option, to the memory card 200 via the input/output unit 105, and receives an equipment communication number corresponding to the equipment ID from the memory card 200 via the input/output unit.

Next, the control unit 101 outputs the received equipment communication number to the communication control unit 102, and requests the communication control unit 102 to establish communication with a communication terminal (i.e. control device) identified by the equipment communication number. An example of such an equipment control device is the vehicle control device 300a installed in the vehicle 30a. Hereinafter, the communication terminal identified by the equipment communication number is described as the "equipment control device".

On establishing communication, the control unit 101 outputs to the memory card 200 via the input/output unit 105 the warning mode setting request indicating to set the warning mode, and further transmits the warning mode setting request to the equipment control device identified by the equipment communication number via the communication control unit 102, the communication unit 103, the antenna 104, the radio base station 24, and the mobile telephone network 20.

The control unit 101 subsequently relays communication between the equipment control device and the memory card 200.

The control unit 101 receives messages from the memory card 200 via the input/output unit 105, and outputs the received messages to the display unit 107. Examples of such messages include authentication failure information indicating the failure of authentication between the memory card 200 and the equipment control device, and an error message when the control unit 101 attempts to set the warning mode when the equipment control device is already in the warning mode.

Next, the control unit 101 receives the completion notification indicating that the warning mode has been set from the memory card 200 via the input/output unit 105. On receipt of the completion notification, the control unit 101 generates the completion notification screen 136, and outputs the generated completion notification screen 136 to the display unit 107. Further, the control unit 101 ends communication with the equipment control device.

Detailed Description of Setting Normal Mode

The control unit 101 generates the currently processing screen 151, and outputs the generated currently processing screen 151 to the display unit 107.

Next, the control unit 101 outputs the equipment ID corresponding to the received option to the memory card 200 via the input/output unit 105, and receives the equipment communication number corresponding to the received option from the memory card 200 via the input/output unit 105.

Next, the control unit 101 outputs the received equipment communication number to the communication control unit 102, and requests the communication control unit 102 to establish communication with the communication terminal (i.e. the equipment control device) identified by the equipment communication number.

On establishing communication, the control unit 101 outputs to the memory card 200 via the input/output unit 105 the normal mode setting request indicating to set the normal mode. Further, the control unit 101 transmits the normal modes setting request to the equipment control device identified by the equipment communication number via the communication control unit 102, the communication unit 103, the antenna 104, the radio base station 24, and the mobile telephone network 20.

The control unit 101 subsequently relays communication between the equipment control device and the memory card 200.

The control unit 101 receives messages from the memory card 200 via the input/output unit 105, and outputs the received messages to the display unit 107. Examples of such messages include authentication failure information indicating the failure of authentication between the memory card 200 and the equipment control device, and the error message from when the control unit attempts to set the normal mode when the equipment control device is already in the normal mode.

Next, the control unit 101 receives the completion notification indicating that the normal mode has been set, from the memory card 200 via the input/output unit 105. On receipt of the completion notification, the control unit 101 generates the completion notification screen 152, and outputs the generated completion notification screen 152 to the display unit 107. Further, the control unit 101 ends communication with the equipment control device.

Detailed Description of Processing to Lock and Unlock

The control unit 101 outputs the locking or unlocking instruction to the memory card 200 via the input/output unit 105.

Further, the control unit 101 receives messages from the memory card 200 via the input/output unit 105, and outputs the received messages to the display unit 107. Examples of such messages include authentication failure information indicating failure of the authentication between the memory card 200 and the equipment control device, the error message when the control unit attempts to perform the processing for locking or unlocking when the equipment control device is already in the normal mode, a message indicating that the second electronic key transmitted from the memory card 200 and the first electronic key stored by the equipment control device fail to match, and in the case where they do match, a message indicating that the unlocking or locking process has been completed.

(4) Input/Output Unit 105 and Input Unit 106

The input/output unit 105 transmits receiver information between the control unit 101 and the memory card 200.

The input unit 106 is constructed from a numeric key pad and other keys, and outputs operation information corresponding to user key operations to the control unit 101.

1.3 Memory Card 200

The memory card 200, as shown in FIG. 2, has memory for storing digital information, and performs radio communication with the equipment control device using radio waves in a 2.45 GHz frequency band. The memory card has a range of around a meter, and a communication speed of 1 Mbps.

The memory card 200 is loaded in and connected electrically to the instruction-use mobile telephone 100. Thus, the memory card transmits and receives information to and from the instruction-use mobile telephone 100 via the electrical connection.

As shown in FIG. 2, the memory card 200 is formed from a plate-like resin case 32 mm long, 34 mm wide, and 2.1 mm thick, enclosing an information storage unit 202 constructed from a single chip, an LSI (Large Scale Integrated circuit) unit 203, and an antenna 204, and an input output/output unit 201. The LSI unit 203 is tamper resistant, and is constructed from a communication control unit 211 and a control unit 212.

LSI unit 203 is super-functional LSI manufactured by integrating a plurality of constituent parts integrated on a single chip. Specifically, the LSI unit 203 is a computer system constructed to include a microprocessor, ROM, and RAM. The LSI unit 203 realizes a portion of its functions as a result of the microprocessor operating in accordance with the computer program.

(1) Communication Unit 211 and Antenna 204

The communication unit 211 is constructed from a demodulation unit and modulation unit (not depicted) and transmits and receives information to and from the control unit 212 and the equipment control device by short-range radio.

The demodulation unit receives electric signals from the antenna 204, selects a signal with a frequency of the 2.45 GHz from the received electrical signals, extracts a pulse signal wave from the selected signal, and outputs the extracted pulse signal wave as information.

The modulation unit switches the impedance of the antenna 204 according to bits (0 or 1) included in a bit sequence constituting information received from the control unit 212. Specifically, the modulation unit changes the impedance to a first value when the bits are "1", and to a second value when the bits are "0". This enables the modulation unit to vary the amplitude and phase of the radio waves reradiated from the antenna 204, and to use these variations in phase and amplitude to communicate information.

The antenna 204 is a reception antenna that receives radio waves, converts the received radio waves into electrical signals, and outputs the electrical signals to the communication control unit 211 and to a power source unit, which is not depicted. The antenna 204 also reflects (reradiates) the received radio waves.

(2) Information Storage Unit 202

The information storage unit 202 stores information such as the equipment list 231 shown in FIG. 6. The equipment list 231 is composed of a plurality pieces of equipment information, each piece including an equipment ID, a mode, an equipment communication number, and a second electronic key. Each piece of equipment information uniquely corresponds to the vehicle 30*a*, the target mobile telephone 30*b*, the personal computer 30*c*, the personal computer 30*d*, the residence 30*e* or another piece of equipment.

The equipment ID is identity information identifying a corresponding piece of equipment.

The mode indicates the mode currently set in the corresponding piece of equipment, and takes a value of either "1" or "0". "0" indicates that the piece of equipment is in the normal mode, and "1" indicates that the piece of equipment is in the warning mode.

The equipment communication number is a telephone number or e-mail address that is set in the corresponding piece of equipment. Note that the equipment communication number may be a URI (Universal Resource Identifier) or URL (Uniform Resource Locator).

The second electronic key is an electronic key allocated by the equipment control device included in the corresponding piece of equipment.

(3) Control Unit 212

Reading of Equipment Communication Number

The control unit 212, receives the equipment ID from the instruction-use mobile telephone 100 via the input/output unit 201, reads the piece of equipment information that includes the received equipment ID from the equipment list 231 stored in the information storage unit 202, extracts the equipment communication number from the read equipment information, and outputs the extracted equipment communication number to the instruction-use mobile telephone 100 via the input/output unit 201.

Next, the control unit 212 receives the warning mode setting request, normal mode setting request, and locking and unlocking instruction from the instruction-use mobile telephone 100 via the input/output unit 201.

Setting of Warning Mode

On receipt of the warning mode setting request from the instruction-use mobile telephone 100, the control unit 212 next receives a ciphertext C from the equipment control device identified by the equipment communication number, via the mobile telephone network 20, the radio base station 24, the instruction-use mobile telephone 100, and the input/output unit 201.

The ciphertext C is generated in the equipment control device by using a shared key K to perform an encryption algorithm E on a generated random number R. The details of this procedure are described in a later section.

Next, the control unit 212 performs a decryption algorithm D on the received ciphertext C using the shared key K to generate a decrypted text R', and transmits the generated decrypted text R' to the equipment control device via the instruction-use mobile telephone 100, the wireless base station 24, and the mobile telephone network 20.

The equipment control device judges whether the received decrypted text R' matches the generated random number R, as described in a later section. The generation and transmission of the ciphertext C, generation and reception of the decrypted text R', and comparison of the decrypted text R' with the random number R, is processing that enables the equipment control device to authenticate that the memory card 200 is authorized. When the decrypted text R' and the random number R match, the equipment control device is able to confirm that the memory card 200 is authorized.

Upon the success of the authentication processing, the control unit 212 executes the processing for sharing a session key with the equipment control device. The processing for sharing the session key is described in a later section. In this way, it is possible for both the control unit 212 and the equipment control device to securely generate and store identical session keys.

Next, the control unit 212 receives an encrypted electronic key that has been generated by the equipment control device encrypting the first electronic key (described below) generated in the equipment control device. The control unit 212 then uses the session key to decrypt the received encrypted electronic key to generate the second electronic key, and stores the generated second electronic key internally. Next, the control unit 212 outputs completion notification indicating that the warning mode has been set, to the instruction-use mobile telephone 100 via the input/output unit 201.

Setting of Normal Mode

On receipt of the normal mode setting request from the instruction-use mobile telephone 100, the control unit 212 performs a challenge-response type mutual authentication with the equipment control device identified by the equipment communication number. Since mutual authentication is a well-known technique a detailed description of this is omitted here.

Upon a successful authentication, the control unit 212 performs session key sharing with the equipment control device identified by the equipment communication number to generate a session key.

Next the control unit 212 reads the internally stored second electronic key, encrypts the read second electronic key using the session key to generate an encrypted electronic key, and transmits the generated encrypted electronic key to the equipment control device, via the input/output unit 201, the instruction-use mobile telephone 100, the radio base station 24, and the mobile telephone network 20.

Next, the control unit 212 receives a message (result notification) from the equipment control device via the mobile telephone network 20, the radio base station 24, the instruction-use mobile telephone 100, and the input/output unit 201.

The message indicates whether or not the second electronic key transmitted by the control unit 212 matches the first electronic key stored by the equipment control device. When the received message indicates a match, the control unit 212 deletes the stored second electronic key, and outputs the received message to the instruction-use mobile telephone 100.

Processing to Lock and Unlock

The control unit 212 receives a locking/unlocking instruction indicating to lock or unlock from the instruction-use mobile telephone 100 via the input/output unit 201. On receipt of the locking/unlocking instruction, the control unit 212 establishes a wireless communications channel with the equipment control device via the communication control unit 211 and the antenna 204. Next, the control unit 212 performs mutual authentication with the equipment control device.

Upon a successful authentication, the control unit 212 shares a session key with the equipment control device, reads the stored second electronic key, encrypts the read second electronic key to generate an encrypted electronic key, and outputs the generated encrypted electronic key to the equipment control device via the communication control unit 211 and the antenna 204.

Next, the control unit 212 receives a message (result notification) from the equipment control device via the antenna 204 and the communication control unit 211. The message indicates whether or not the second electronic key read by the control unit 212 matches the first electronic key stored by the equipment control device. Next, the control unit 212 outputs the received message to the instruction-use mobile telephone 100.

(3) Input/Output Unit 201

The input/output unit 201 transmits and receives information to and from the control unit 212 and the instruction-use mobile telephone 100

1.4 Vehicle Control Device 300a

The vehicle control device 300a is installed in the vehicle 30a, and is constructed from an antenna 301a, a communication unit 302a, a communication control unit 303a, a transmission destination information storage unit 304a, an antenna 305a, a short range communication unit 306a, a communication control unit 307a, a control unit 308a, an information storage unit 309a, a vehicle control unit 310a, and a sensor unit 321a, as shown in FIG. 7. The vehicle control device 300a is referred to above as an example of the equipment control device referred to above.

Specifically, the vehicle control device 300a is a computer system constructed from a microprocessor, ROM, RAM, and the like. The RAM has a computer program stored therein. The vehicle control device 300a realizes a portion of its functions as a result of the microprocessor operating in accordance with the computer program.

(1) Information Storage Unit 309a

The information storage unit 309a has a mode flag pre-stored therein, and includes a region for storing the first electronic key.

Here, the mode flag is set to either "1" or "0". The mode flag being "0" indicates that the vehicle control device 300a is set to the normal mode. The mode flag being "1" indicates that the vehicle control device 300a is set to the warning mode.

(2) Control Unit 308a

Establishing Communication with Instruction-Use Mobile Telephone 100

The control unit 308a establishes communication with the instruction-use mobile telephone 100 via the mobile telephone network 20 and the wireless base station 24, and subsequently receives a warning mode-setting request or normal mode setting request from the instruction-use mobile telephone 100 via the mobile telephone network 20.

Further, the control unit 308a receives communication requests by short-range radio from the memory card 200 via the antenna 305a, the short range communication unit 306a, and the communication control unit 307a.

Setting of Warning Mode

On receipt of the warning mode setting request, the control unit 308a generates a random number R, and performs encryption algorithm E on the generated random number R using a shared key K which it possesses advance, to generate the ciphertext $C=E(K,R)$.

Note that E(A,B) denotes a ciphertext obtained by performing an encryption algorithm E on a plaintext B using a key A.

Next, the control unit 308a transmits the generated ciphertext C to the memory card 200 via the mobile telephone network 20 and the instruction-use mobile telephone 100.

Next, the control unit 308a receives the decrypted text R' from the memory card 200 via the instruction-use mobile telephone 100 and the mobile telephone network 20. As described above, the decrypted text R' is generated in the memory card 200 by performing a decryption algorithm D on the ciphertext C using the shared key K.

Next, the control unit 308a judges whether or not the generated random number R and the received decrypted text R' match. The control unit 308a recognizes the memory card 200 as being unauthorized when there is no match, and recognizes that the memory card 200 is authorized when there is a match.

When there is no match, the control unit 308a transmits information indicating authentication failure to the memory card 200 via the mobile telephone network 20 and the instruction-use mobile telephone 100, and outputs an instruction to disconnect from the mobile telephone network 20.

When there is a match, the control unit 308a reads the mode flag from the information storage unit 309a, and judges whether the mode flag is "1" or "0". A mode flag of "0" indicates that the vehicle control device 300a in the normal mode. On the other hand, a mode flag of "1" indicates that the vehicle control device in the warning mode. If the mode flag is "1" some error has occurred, and the control unit 308a outputs a message indicating an error (error notification) to the memory card 200 via the mobile telephone network 20 and the instruction-use mobile telephone.

When the mode flag is "0", the control unit 308a generates a random number, and acquires a current time and date. The current time and date is composed of the year, the month, the day, the minute, the second, and the millisecond. Next, the control unit 308 performs an XOR operation on the generated random number and the acquired current time and date to generate a first electronic key, and writes the generated first electronic key into the information storage unit 309a. Next, the control unit 308 updates the mode flag from "0" to "1" by writing the mode flag of "1" into the information storage unit 309a.

Next the control unit 308a shares a session key with the memory card 200, performs an encryption algorithm on the first electronic key using the generated session key to generate an encrypted electronic key, and transmits the encrypted electronic key to the memory card 200 via the mobile telephone network 20 and the instruction-use mobile telephone 100.

Setting of Normal Mode

On receipt of the normal mode setting request, the control unit 308a performs mutual authentication with the memory card 200, and if authentication is successful, shares a session key.

Next, the control unit 308a receives the encrypted electronic key from the memory card 200 via the instruction-use mobile telephone 100 and the mobile telephone network 20, performs a decryption algorithm on the received encrypted electronic key using the generated session key to generate a decrypted electronic key, reads the first electronic key from the information storage unit 309a, and judges whether or not the read first electronic key matches the decrypted electronic key. The control unit 308a transmits a message (result notification) indicating whether or not there is a match to the memory card 200 via the mobile telephone network 20 and the instruction-use mobile telephone 100.

When there is a match, the control unit 308a overwrites the mode flag "1" stored in the information storage unit 309a with a "0", and deletes the first electronic key stored in the information storage unit 309a. The control unit 308a then instructs the instruction-use mobile telephone 100 to disconnect from the mobile telephone network 20.

Processing to Lock and Unlock

On receipt of a communication request from the memory card 200 by short-range radio, the control unit 308a establishes short-range radio communication with the memory card 200. Next, the control unit 308a and the memory card b 200 perform mutual authentication by the short-range radio. Upon successful authentication, the control unit 308a reads the mode flag from the information storage unit 309a, and judges whether or not the read mode flag is "0" or "1". When the read mode flag is "0" some error has occurred, and the control unit outputs a message indicating an error (error notification) to the memory card 200 by the short-range radio.

When the read mode flag is "1", the control unit 308a shares a session key with the memory card 200.

Next, the control unit 308a receives the encrypted electronic key from the memory card 200 by the short-range radio, performs the decryption algorithm on the received encrypted electronic key using the generated session key to generate the decrypted electronic key, reads the first electronic key from the information storage unit 309a, and judges whether or not the read first electronic key matches the generated decrypted key. When there is no match, the control unit 308a transmits a message (result notification) to this effect to the memory card 200 by the short-range radio. When there is a match, the control unit 308a outputs an electronic key-dependent instruction to lock or unlock, to the vehicle control unit 310a so as to lock or unlock the door 323a. The control unit 308a then outputs a message (result notification) indicating that door 323a has been locked or unlocked.

Processing to Start/Stop Engine

The control unit 308a receives instructions to start and stop the engine from the instruction-use mobile telephone 100, and outputs the received instructions to start and stop the engine to the vehicle control unit 310a, similarly to the processing for locking and unlocking the door 323a.

Irregularity Message from Sensor Unit 321a

The control unit 308a receives a message indicating that abnormal vibrations have been sensed in the vehicle 30a from the sensor unit 321a. On receipt of the message, the control unit 308a sets the mode flag to "1" in a similar way to the above-described setting of the warning mode, generates a first electronic key, establishes communication with a mobile telephone that whose telephone number is recorded in the transmission destination information storage unit 304a, and transmits the generated first electronic key to the mobile telephone.

(3) Transmission Destination Information Storage Unit 304a

The transmission destination information storage unit 304a has a telephone number of a mobile telephone pre-stored therein.

(4) Vehicle Control Unit 310a

The vehicle control unit 310a receives the electronic key-dependent instruction to lock or unlock, or the electronic key-dependent instruction to stop or start the engine, from the control unit 308a.

On receipt of the electronic key-dependent instruction to lock or unlock, the vehicle control unit 310a outputs the instruction to the door-lock mechanism 322a. On receipt of the electronic key-dependent instruction to stop or start the engine, the vehicle control unit 310a outputs the instruction to the engine control unit 324a.

(5) Door-Lock Mechanism 322a

The door-lock mechanism 322a detects an operation to lock or unlock the door using the mechanical key 341a. On detection of such an operation, the door-lock mechanism 322a reads the mode flag and judges whether the read mode flag is "0" or "1" via the control unit 308a and the vehicle control unit 310a, and when the read mode flag is "0", locks or unlocks the door 323a. When the read mode flag is "1", on the other hand, the door-lock mechanism 322a does not unlock or lock the door 323a.

The door-lock mechanism 322a receives the electronic key-dependent instruction to lock or unlock the electronic key, from the vehicle control unit 310a. On receipt of the instruction, the door-lock mechanism 322a locks or unlocks the door 323a.

(6) Engine Control Unit 324a

The engine control unit 324a operates similarly to the door-lock mechanism 324a.

In other words, the engine control unit 324a starts and stops the engine according to an operation using the mechanical key 341a when in the normal mode. However, the engine control unit 324a disregards any attempt to stop or start the engine according to an operation using the mechanical key 341a when in the warning mode. Rather, the engine control unit 324a accepts the electronic key-dependent instruction to start and stop the engine. On receipt of the electronic key-dependent instruction, the engine control unit 324a stops or starts the engine accordingly.

(7) Antenna 301a, Communication Unit 302a, Communication Control Unit 303a

The communication unit 302a amplifies the radio frequency signal received by the antenna 301a, converts the output signal into an IF signal, amplifies the IF signal, and demodulates the amplified IF signal to a baseband signal. The communication unit 302a also modulates a high frequency signal using a baseband signal, converts the modulated output into a radio frequency signal, amplifies the radio frequency signal, and outputs it to the antenna 301a.

The communication control unit 303a generates a baseband signal and outputs the generated baseband signal to the communication unit 302a. The communication control unit 303 also receives a baseband signal from the communication unit 302a.

In this way, the communication control unit 303a, the communication unit 302a, and the antenna 301a communicate information with other communications devices via the radio base station 21 and the mobile telephone network 20.

(8) Antenna 305a, Short Range Communication Unit 303a, and Communication Control Unit 307a The communication control unit 307a is constructed from a demodulation unit and modulation unit (not depicted), and communicates information between the control unit 308a and the memory card 200 by short-range radio.

The modulation unit receives electrical signals from the antenna 305a, selects the signal having the 2.45 GHz frequency from the received electrical signals, extracts a pulse signal wave from the selected signal, and outputs the extracted pulse signal as information.

Further the modulation unit modulates bits (0 or 1) of a bit sequence constituting information received from the control unit 308a onto a carrier wave, and outputs the result to the antenna 305a.

The antenna 305a is a communication antenna that receives radio waves, converts the received radio waves into an electrical signal, and outputs the electrical signal to the short-range communication unit 306a. Further, the antenna 305a outputs the electrical signal received from the short-range communication unit 306a into space as radio waves.

(9) Sensor Unit 321a

The sensor unit 321a is constructed using a vibration sensor or the like, and senses irregular vibrations of the vehicle 30a. For example, the sensor will detect, as an irregularity in the vehicle 30a, externally applied vibrations caused when a third party attempting to steal the vehicle 30a performs some physical operation. On detecting such irregular vibrations, the sensor notifies the control unit 308a with message indicating the detection.

1.5 Target Mobile Telephone 30b

Figure 8:
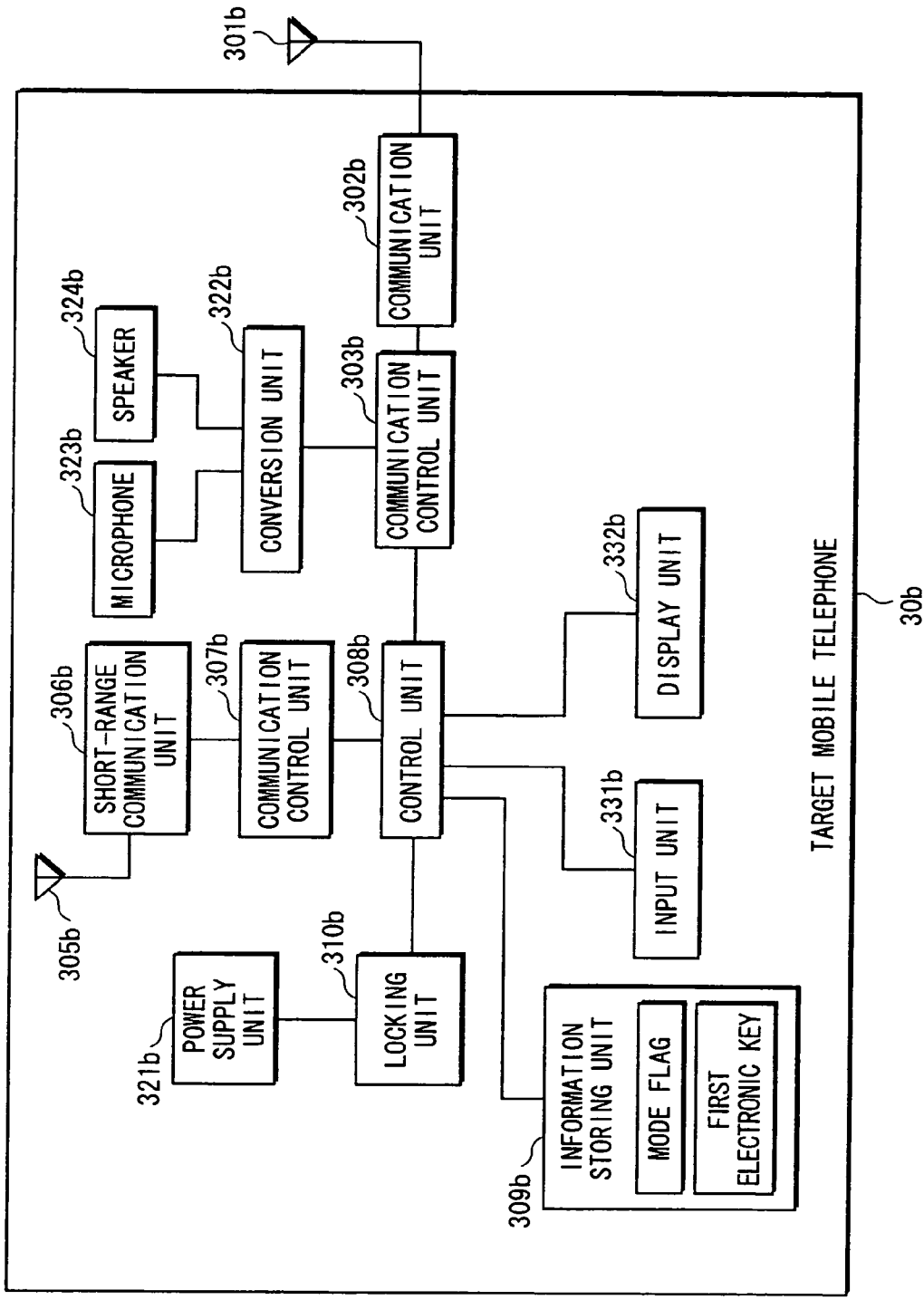
FIG. 8 is a block diagram showing a construction of a target mobile telephone 30b.

The target mobile telephone 30b is constructed from an antenna 301b, a communication unit 302b, a communication control unit 303b, an antenna 305b, a short-range communication unit 306b, a communication control unit 307b, a control unit 308b, an information storage unit 309b, a locking unit 310b, a power source unit 321b, an input unit 331b, a display unit 332b, a conversion unit 322b, a microphone 323b, and a speaker 324b, as shown in FIG. 8.

Specifically, the target mobile telephone 30b is a computer system constructed from a microprocessor, ROM, RAM, and the like, similarly to the instruction-use mobile telephone 100. The RAM has a computer program stored therein. The target mobile telephone 100 realizes a portion of its functions as a result of the microprocessor operating in accordance with the computer program.

The target mobile telephone 30b includes components similar to those of the vehicle control device 300a. The antenna 301b, the communication unit 302b, the communication control unit 303b, the antenna 305b, the short-range communication unit 306b, the communication control unit 307b, the control unit 308b, the information storage unit 309b, and the locking unit 310b correspond to the antenna 301a, the communication unit 302a, the communication control unit 303a, the transmission destination information storage unit 304a, the antenna 305a, the short-range communication unit 306a, the communication control unit 307a, the control unit 308a, the information storage unit 309a, and the vehicle control unit 310a, which form the vehicle control device 300a.

The following description focuses on aspects of the target mobile telephone 30b that differ from the vehicle control device 300a. In this specification, the target mobile telephone 30b is an example of an equipment control device.

(1) Locking Unit 310b

The locking unit 310b receives the electronic key-dependent instructions to lock or unlock the power source unit 321b from the control unit 308b.

On receipt of the electronic key-dependent locking instruction, the locking unit 310b instructs the power source unit 321b to stop supplying power to specified components.

The specified components are the antenna 301b, the communication unit 302b, the communication control unit 303b, the conversion unit 322b, the microphone 323b, and the speaker 324b. These components all relate to the calling function in the target mobile telephone 30b.

On receipt of the electronic key-dependent unlocking instruction, the locking unit 310b instructs the power source unit 321b to supply power to the specified components.

(2) Power Source Unit 321b

The power source unit 321b supplies or stops supplying power to the specified components of the target mobile telephone 30b in response to the instructions of the locking unit 310b.

The power source unit 321*b* also supplies power to other components of the target mobile telephone 30*b*.

1.6 Personal Computer 30*c*

Figure 9:
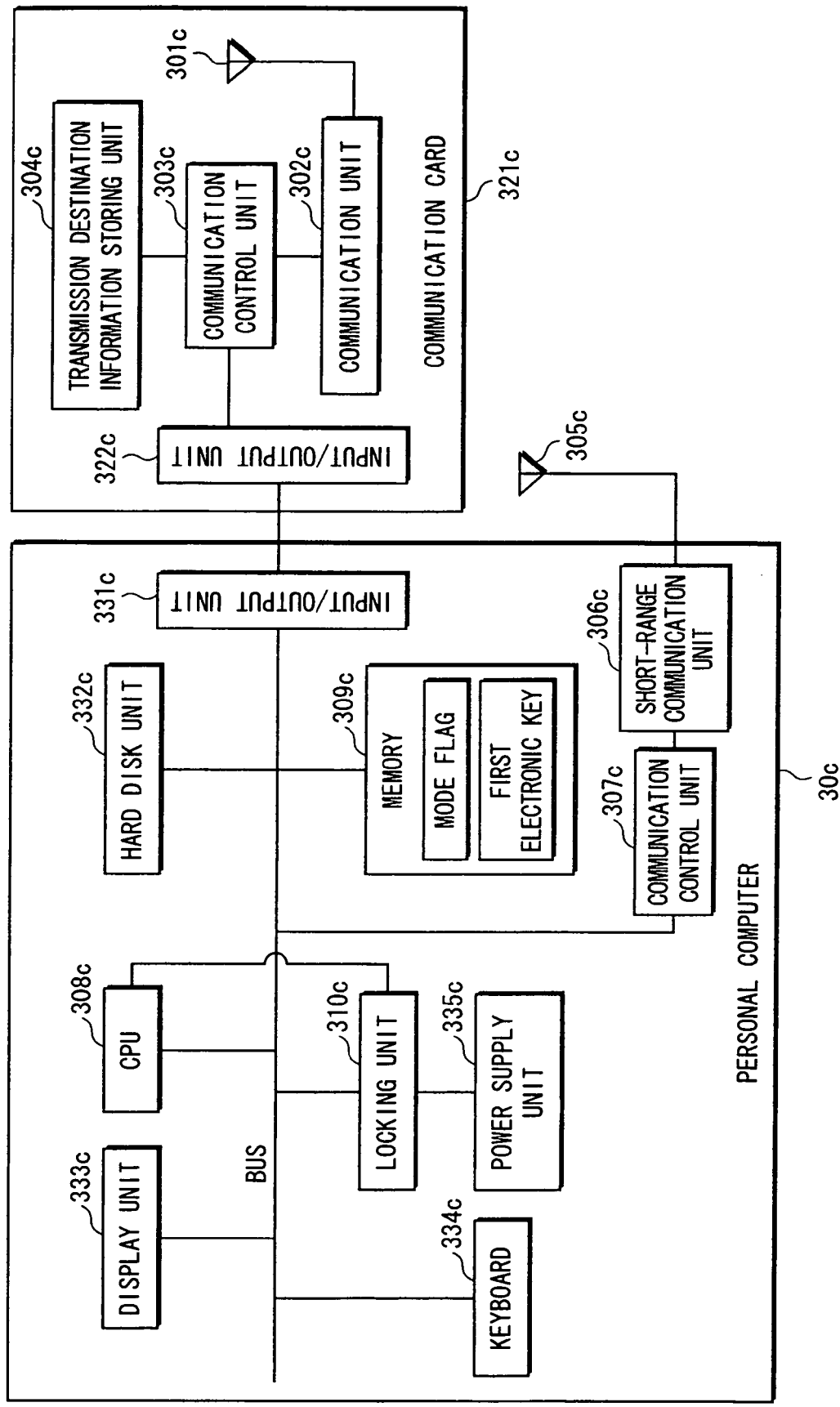
FIG. 9 is a block diagram showing a construction of a personal computer 30c and a communications card 321c.

The personal computer 30*c* is constructed from an antenna 305*c*, a short-range communication unit 306*c*, a communication control unit 307*c*, a CPU 308*c*, a memory 309*c*, a locking unit 310*c*, an input/output unit 331*c*, a hard disk unit 332*c*, a display unit 333*c*, a keyboard 334*c*, and a power source unit 335*c*, as shown in FIG. 9. Moreover, a communication card 321*c* constructed from an antenna 301*c*, a communication unit 302*c*, a communication control unit 303*c*, a transmission destination information storage unit 304*c*, and an input/output unit 322*c* is connected to the personal computer 30*c*.

Together, the personal computer 30*c* and the communication card 321*c* have components similar to the vehicle control device 300*a*.

The antenna 301*c*, the communication unit 302*c*, the communication control unit 303*c*, and the transmission destination information storage unit 304*c*, which make up the communication card 321*c*, correspond to the antenna 301*a*, the communication unit 302*a*, the communication control unit 303*a*, and the transmission destination information storage unit 304*a* which make up the vehicle control device 300*a*. Similarly, the antenna 305*c*, the short-range communication unit 306*c*, the communication control unit 307*c*, the CPU 308*c*, the memory 309*c*, and the locking unit 310*c* which make up the personal computer 30*c* correspond, respectively, to the antenna 305*a*, the short-range communication unit 306*a*, the communication control unit 307*a*, the control unit 308*a*, the information storage unit 309*a*, and the vehicle control unit 310*a* which make up the vehicle control device 300*a*.

The following description focuses on aspects of the personal computer 30*c* and communication card 321*c* which differ from the vehicle control device 300*a*. In this specification the personal computer 30*c* is an example of an equipment control device.

(1) Locking Unit 310*c*

The locking unit 310*c* receives electronic key-dependent instructions to lock or unlock the power source unit 335*c* from the CPU 308*c*.

On receipt of the electronic key-dependent locking instruction, the locking unit 310*c* instructs the power source unit 335*c* to stop supplying power to specified components.

The specified components are the hard disk unit 332*c*, the display unit 333*c*, and the keyboard 334*c*. These components all relate to main functions of the personal computer 30*c*.

On receipt of the electronic key-dependent unlocking instruction, the locking unit 310*c* instructs the power source unit 335*c* to supply power to the specified components.

(2) Power Source Unit 335*c*

The power source unit 335*c* supplies or stops supplying power to the specified components of the personal computer 30*c* in response to instructions from the locking unit 310*c*.

The power source unit 335*c* also supplies power to other components of the personal computer 30*c*.

1.7 Personal Computer 30*d*

Figure 10:
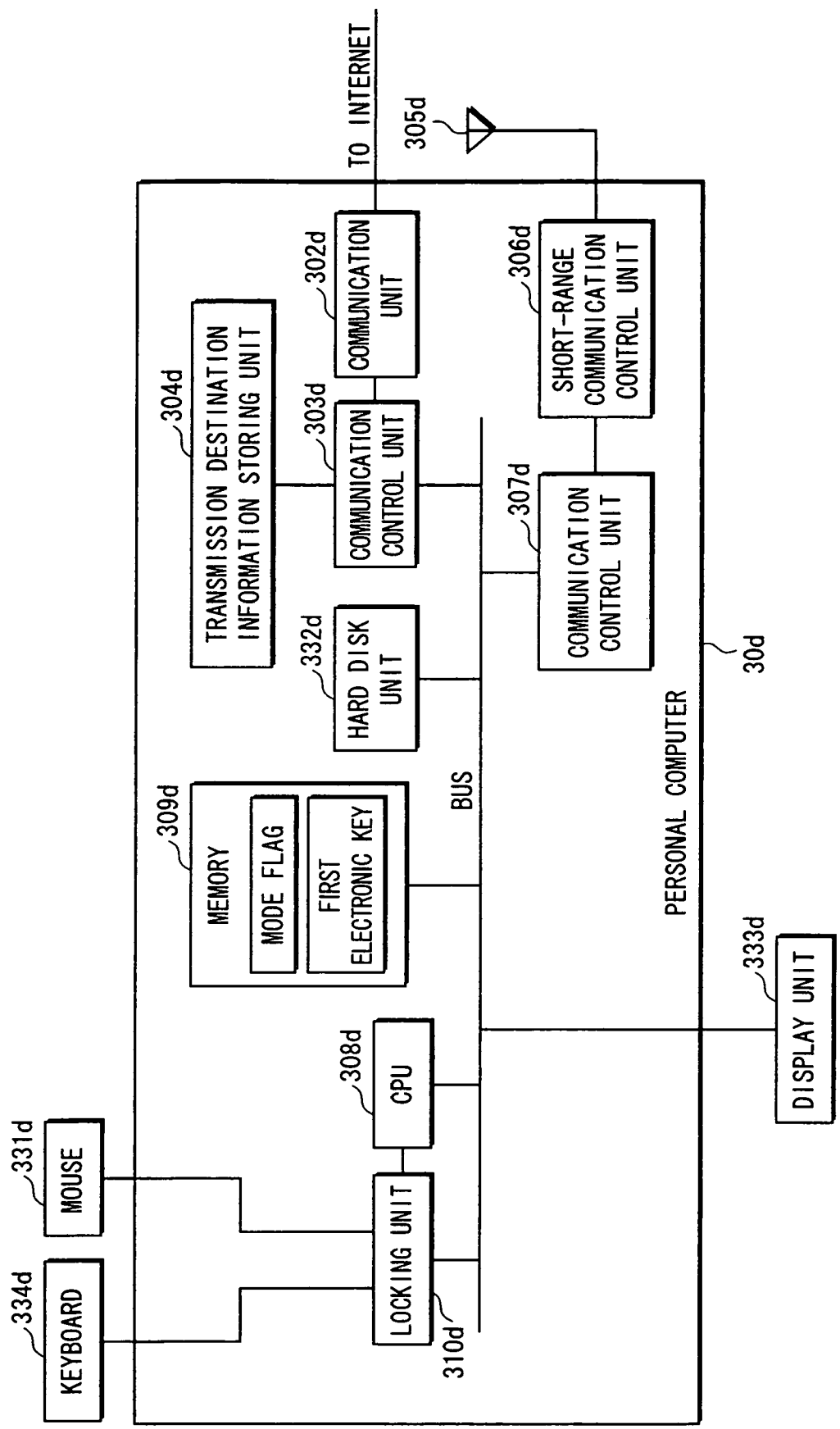
FIG. 10 is a block diagram showing a construction of a personal computer 30d.

The personal computer 30*d* is constructed from a communication unit 302*d*, a communication control unit 303*d*, a transmission destination information storage unit 304*d*, an antenna 305*d*, a short-range communication unit 306*d*, a communication control unit 307*d*, a CPU 308*d*, a memory 309*d*, a locking unit 310*d*, and a hard disk unit 332*d*, as shown in FIG. 10. A display 333*d* is connected to the personal computer 30*d*, and a keyboard 334*d* and a mouse 331*d* are connected to the locking unit 310*d*.

The personal computer 30*d* has components similar to those of the vehicle control device 300*a*. The communication unit 302*d*, the communication control unit 303*d*, the transmission destination information storage unit 304*d*, the antenna 305*d*, the short-range communication unit 306*d*, the communication control unit 307*d*, the CPU 308*d*, the memory 309*d*, and the locking unit 310*d* which make up the personal computer 30*d* respectively correspond to the communication unit 302*a*, the communication control unit 303*a*, the transmission destination information storage unit 304*a*, the antenna 305*a*, the short-range communication unit 306*a*, the communication control unit 307*a*, the control unit 308*a*, the information storage unit 309*a*, and the vehicle control unit 310*a* which make up the vehicle control device 300*a*.

The following description focuses on aspects of the personal computer 30*d* that differ from the vehicle control device 300*a*. In this specification, the personal computer is an example of an equipment control device.

The locking unit 310*d* receives electronic key-dependent instructions to lock and unlock the keyboard 334*d* and the mouse 331*d* from the CPU 308*d*.

On receipt of the electronic key-dependent locking instruction, the locking unit 310*d* disables the reception of information from the keyboard 334*d* and the mouse 331*d*.

On receipt of the electronic key-dependent unlocking instruction, the locking unit 310*d* enables the reception of information from the keyboard 334*d* and the mouse 331*d*, and outputs the received information to the CPU 308*d*.

1.8 Door Control Device 300*e*

Figure 11:
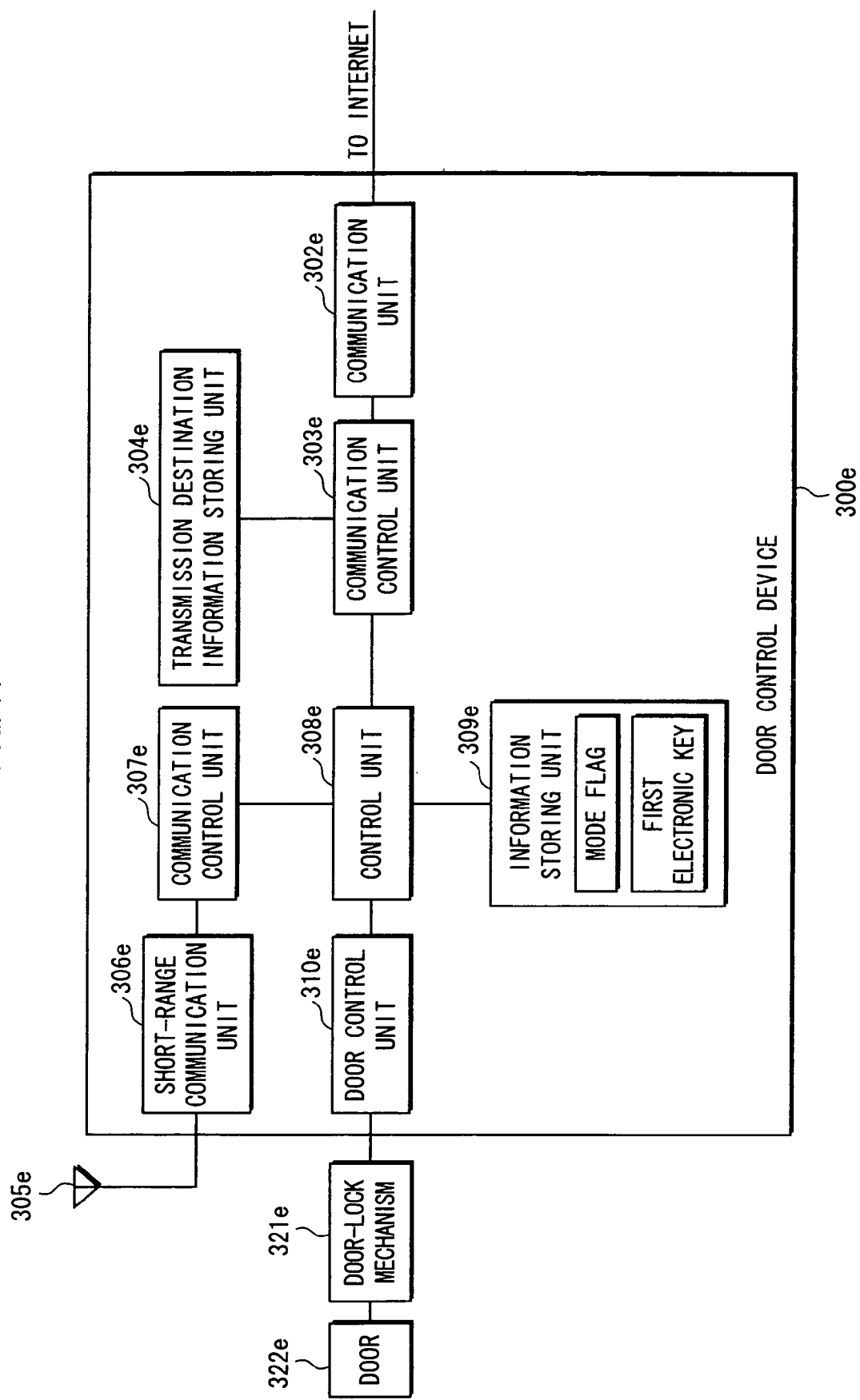
FIG. 11 is a block diagram showing a construction of a door control device 300e.

The door control device 300*e* is constructed from a communication unit 302*e*, a communication control unit 303*e*, a transmission destination information storage unit 304*e*, an antenna 305*e*, a short-range communication unit 306*e*, a communication control unit 307*e*, a control unit 308*e*, an information storage unit 309*e*, and a door control unit 310*e*, as shown in FIG. 11.

The door control device 300*e* has components similar to those of the vehicle control device 300*a*. The communication unit 302*e*, the communication control unit 303*e*, the transmission destination information storage unit 304*e*, the antenna 305*e*, the short-range communication unit 306*e*, the communication control unit 307*e*, the control unit 308*e*, the information storage unit 309*e*, and the door control unit 310*e* which make up the door control device 300*e* respectively correspond to the communication unit 302*a*, the communication control unit 303*a*, the transmission destination information storage unit 304*a*, the antenna 305*a*, the short-range communication unit 306*a*, the communication control unit 307*a*, the control unit 308*a*, the information storage unit 309*a*, and the vehicle control unit 310*a*, which make up the vehicle control device 300*a*.

(1) Door Control Unit 310*e*

The door control unit 310*e* receives an electronic key-dependent instruction to lock or unlock the door.

On receipt of the electronic key-dependent locking or unlocking instruction, the door control unit 310*e* outputs the instruction to a door-lock mechanism 312*e*

(2) Door-Lock Mechanism 321*e*

The door-lock mechanism 312*e* detects the operations to lock and unlock the door using the mechanical key 341*e*. On detecting such an operation, the door-lock mechanism 312*e* reads the mode flag from the information storage unit 309*e* via the control unit 308*e* and the door control unit 310*e*, judges whether the read mode flag is a "1" or a "0", and when it is "0", locks or unlocks the door 332*e* in accordance with the detected operation. When the mode flag is "1", on the other hand, the door locking mechanism does not lock or unlock the door 322*e* when an operation to lock or unlock the door using the mechanical key 341*e* is detected.

The door-lock mechanism 321*e* accepts electronic key-dependent instructions to lock and unlock the door 322*e* from the door control unit 310*e*. On receipt of such an instruction the door-lock mechanism 321*e* locks or unlocks the door 322*e* in accordance with the instruction.

1.9 Operations of Key Management System 10

The following describes the operations of the key management system 10.

(1) Operations of Key Management System 10

Figure 12:
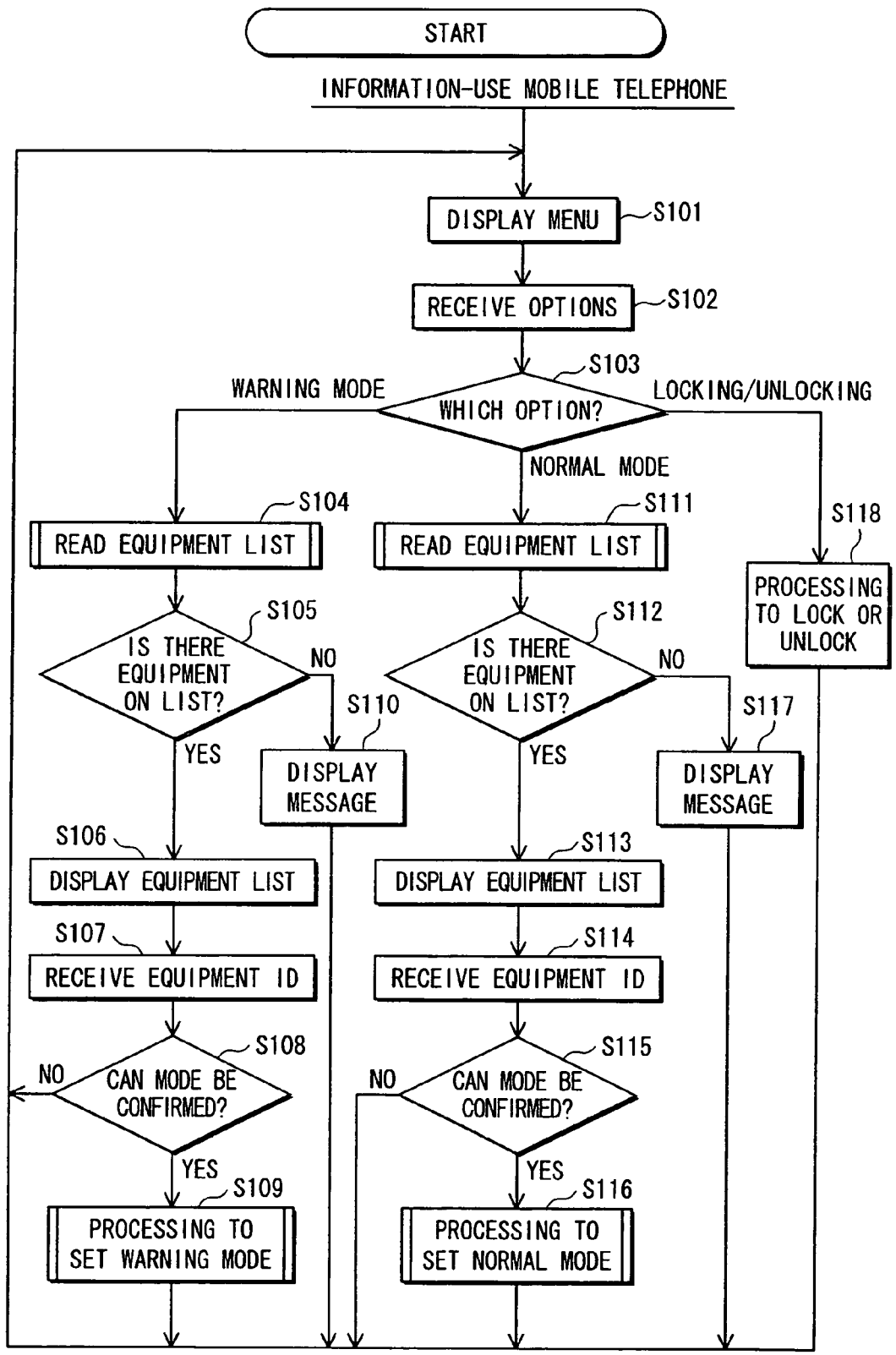
FIG. 12 is a flow-chart showing an overview of operations performed by the key management system 10.

An overview of the operations of the key management system is given below with reference to the flow-chart shown in FIG. 12

The control unit 101 of the instruction-use mobile telephone 100 generates the menu screen 121 in response to a user instruction, and the display unit 107 displays the menu screen 121(Step S101).

Next, the control unit 101 receives one of the options 122, 123, or 124 displayed on the menu screen 121 as a result of a user operation, via the input unit 106 (Step S102).

When the received option indicates to set the warning mode (Step S103), the control unit 101 attempts to read an equipment list, which includes equipment information relating to equipment that can be set to the warning mode, from the memory card 200, via the input/output unit 105 (Step S104). When there is no equipment that can be set to the warning mode on the list (Step S105), the control unit 101 outputs a message to this effect to the display unit 107 (Step S110), and then returns to Step 101 and repeats the above processing.

When equipment that can be set to the warning mode is present on the equipment list (Step S105), the control unit 101 generates the equipment selection screen 125 from the read equipment list, and the display unit 107 displays the generated equipment selection screen 125 (Step S106).

Next, the control unit 101 receives one of the options included on the equipment selection screen 125 via the input unit 106, and acquires the equipment ID corresponding to the selected option (Step S107).

Next, the control unit 101 checks the mode of the selected piece of equipment, and if the piece of equipment is in the normal mode (Step S108), performs processing to set the warning mode (Step S109). If the equipment is in the warning mode (Step S108), the control unit 101 returns to Step S101 and repeats the above processing.

When, on the other hand, the received option indicates to set the normal mode (Step S103), the control unit 101 attempts to read the equipment list, which includes equipment information relating to the equipment that can be set to the normal mode, from the memory card 200 via the input/output unit 105 (Step S111). When there is no equipment that can be set to the normal mode on the equipment list (Step S112), the control unit 101 outputs a message to this effect to the display unit 107 (Step S117), and then returns to Step 101 and repeats the above processing.

When equipment that can be set to the normal mode is present on the equipment list (Step S112), the control unit 101 generates the equipment selection screen 141 from the read equipment list, and the display unit 107 displays the generated equipment selection screen 141 (Step S113).

Next, the control unit 101 receives one of the options included on the equipment selection screen 141 via the input unit 106, and acquires the equipment ID corresponding to the selected option (Step S114).

Next, the control unit 101 checks the mode of the selected piece of equipment, and if the piece of equipment is in the warning mode (Step S115), performs processing to set the normal mode (Step S116). If the piece of equipment is in the normal mode (Step S115), the control unit 101 returns to Step S101 and repeats the above processing.

When the received option indicates locking or unlocking (Step S103), the control unit 101 performs the processing for locking or unlocking (Step S118), and then returns to Step S101 and repeats the above processing.

(2) Operations for Reading the Equipment List

Figure 13:
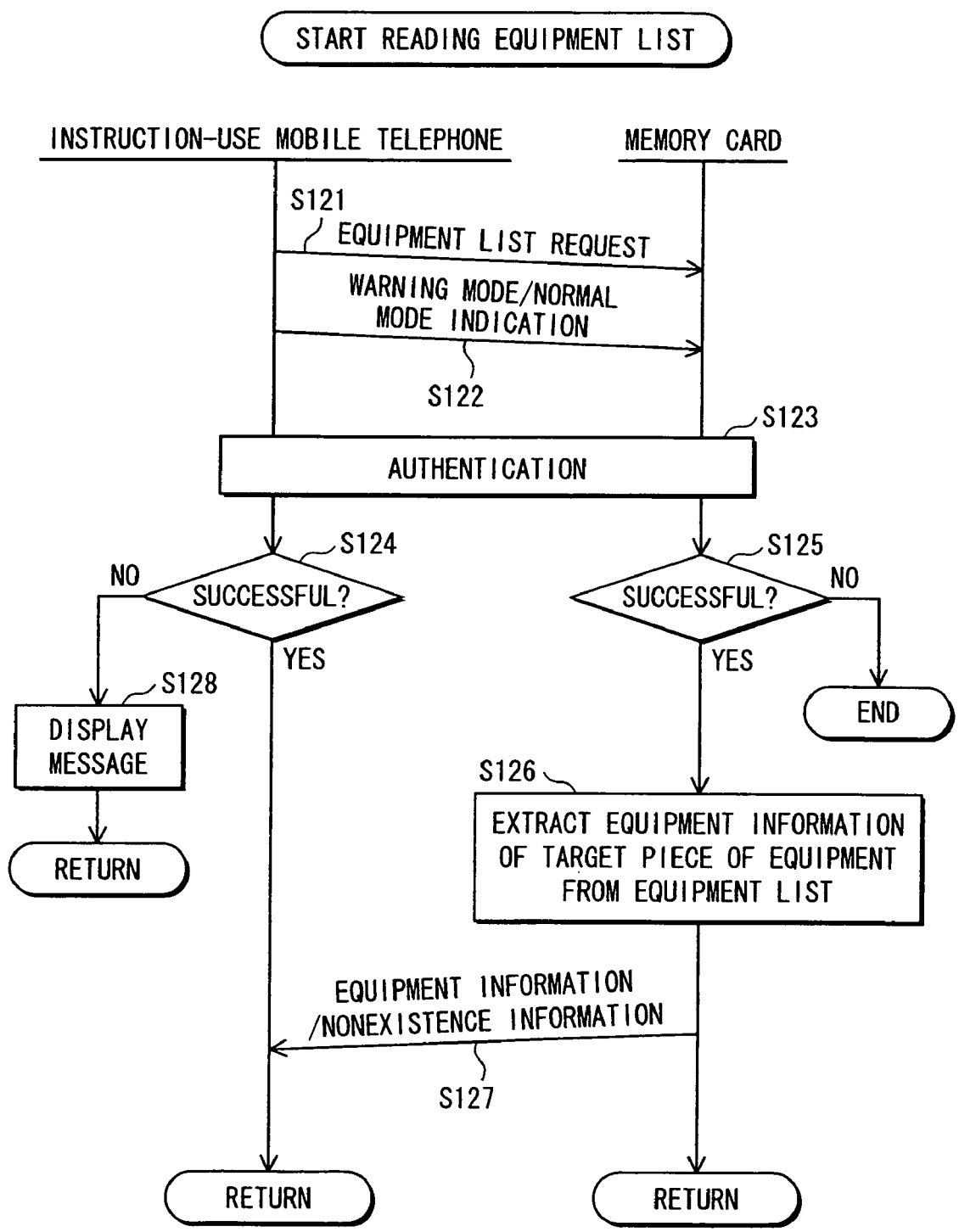
FIG. 13 is a flow-chart showing operations for reading an equipment list.

The operations for reading the equipment list are described below with reference to the flow-chart shown in FIG. 13.

The control unit 101 outputs an equipment list request indicating that the equipment list is to be read, to the memory card 200 via the input/output unit 105 (Step S121). Next, the control unit 101 outputs information indicating the warning mode when the piece of equipment is to be set to the warning mode, or information indicating the normal mode when the piece of equipment is to be set to the normal mode, to the memory card 200 via the input/output unit 105 (Step S122).

Next, the control unit 101 performs mutual authentication with the memory card 200 (Step S123). If the mutual authentication is successful (Steps S124 and S125), the control unit 212 attempts to extract the equipment information for the piece of equipment from the equipment list 231 (Step S126). Next, the control unit 212 outputs either the equipment information relating to the piece of equipment that is to be set to the warning mode or normal mode, or nonexistence information indicating the nonexistence of the relevant equipment information (Step S127).

Next, the control unit 101 receives the equipment information, or the nonexistence information indicating the nonexistence of the equipment information, from the memory card 200 via the input/output unit 105 (Step S127).

(3) Operations for Setting Warning Mode

Figure 14:
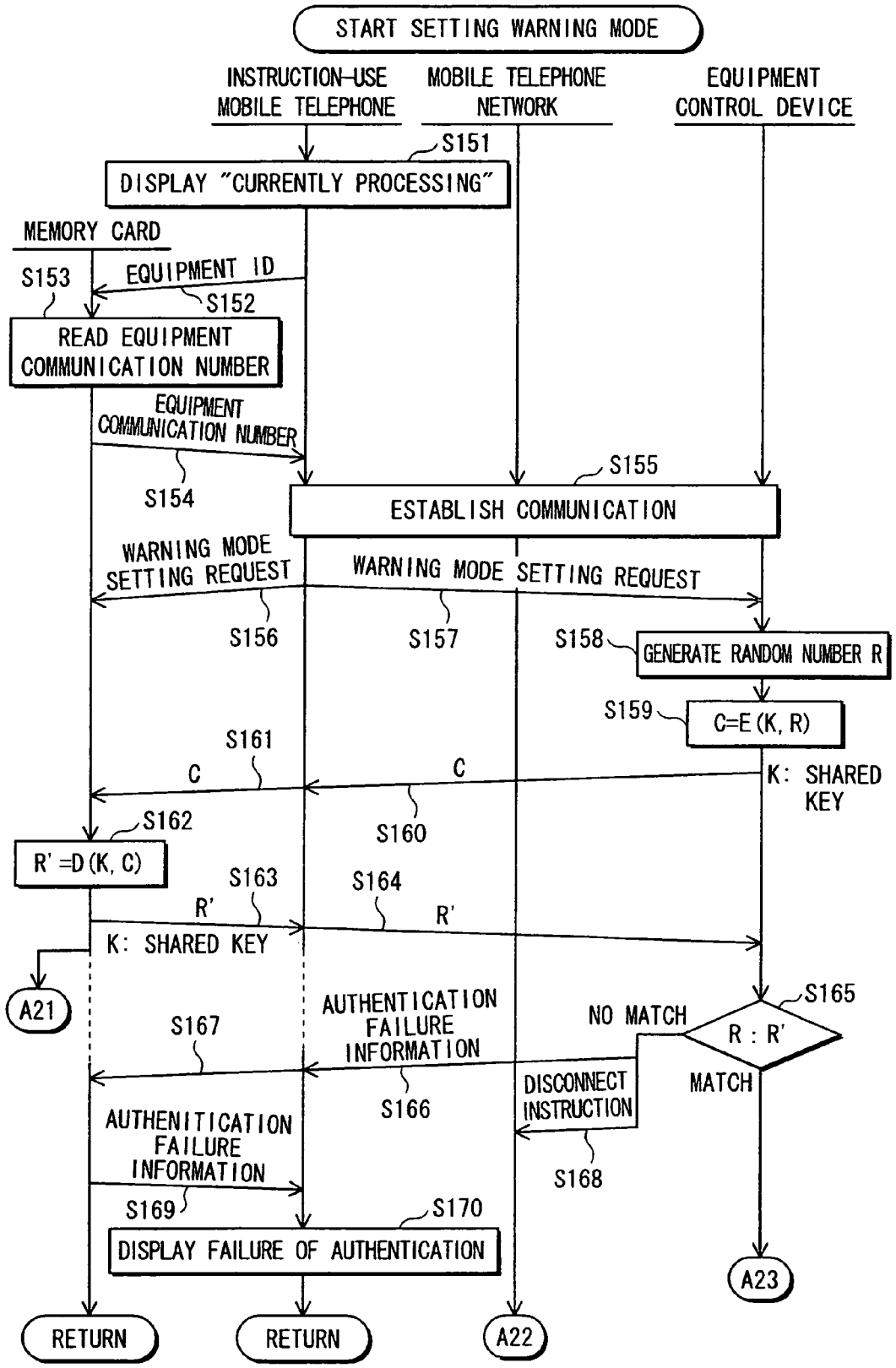
FIG. 14 is a flow-chart showing operations for setting a warning mode (cont.
Figure 15:
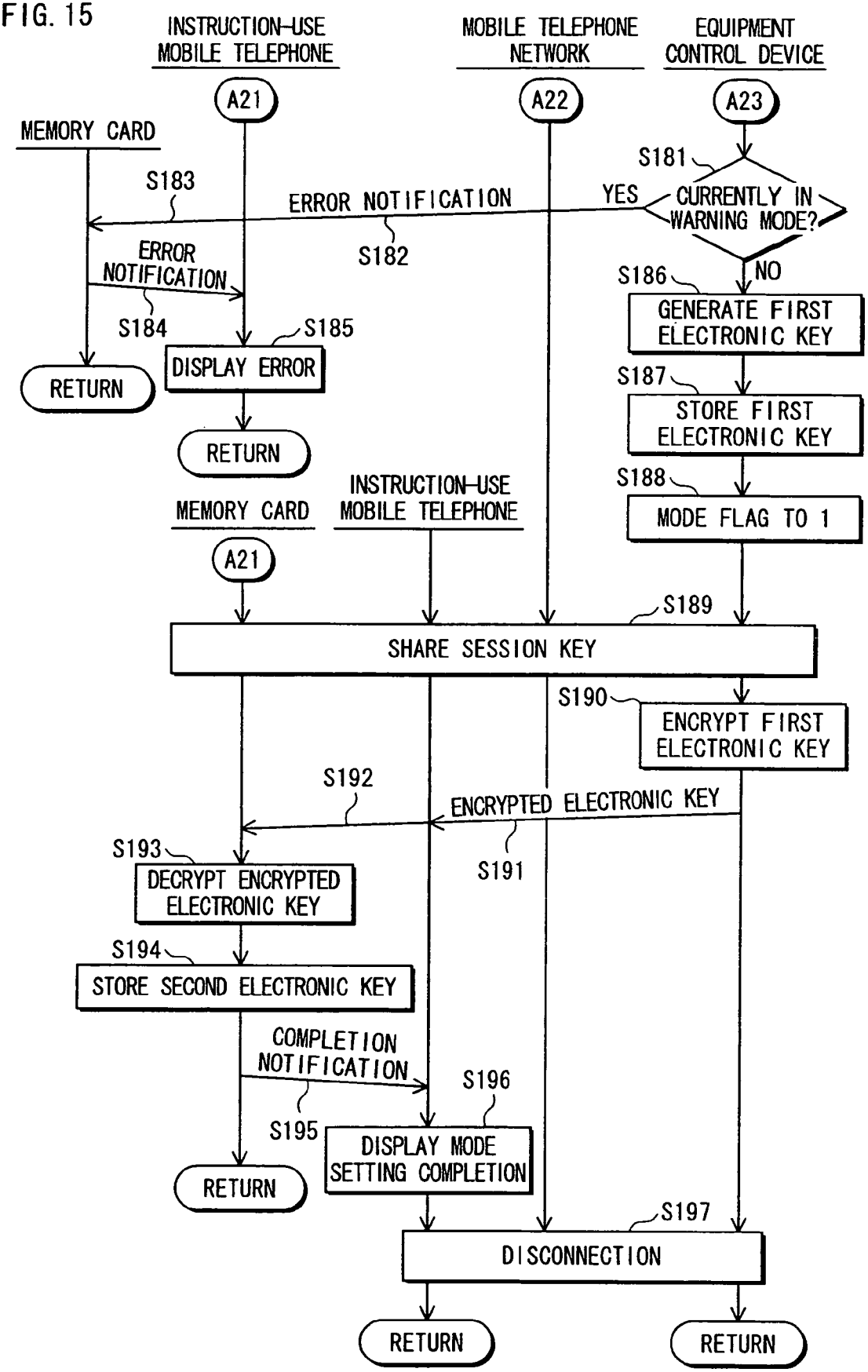
in FIG. 15)

The operations for setting the warning mode are described below with reference to the flow-chart shown in FIGS. 14 and 15.

The control unit 101 of the instruction-use mobile telephone 100 generates the currently processing screen 135, and the display unit 107 displays the generated currently processing screen 135 (Step S151). Next, the control unit 101 outputs the acquired equipment ID, which corresponds to the received option, to the memory card 200, via the input/output unit 105 (Step S152).

The control unit 212 of the memory card 200 receives the equipment ID from the instruction-use mobile telephone 100 (Step S152), reads the equipment information that includes the received equipment ID from the equipment list 231 stored in the information storage unit 202, extracts the equipment communication number from the read equipment information (Step S153), and outputs the extracted equipment communication number via the input/output unit 201 to the instruction-use mobile telephone 100 (Step S154).

The control unit 101 receives the equipment communication number corresponding to the equipment ID from the memory card 200 via the input/output unit 105 (Step S154).

Next, the control unit 101 outputs the received equipment communication number to the communication control unit 102, and establishes communication between the communication control unit 102 and the communication terminal identified by the equipment communication number, which is the equipment control device (Step S155).

On establishing communication, the control unit 101 outputs the warning mode setting request indicating that the piece of equipment is to be set to the warning mode, to the memory card 200 via the input/output unit 105 (Step S156), and transmits the warning mode setting request to the equipment control device identified by the equipment communication number via the communication control unit 102, the communication unit 103, the antenna 104, the radio base station 24, and the mobile telephone network 20 (Step S157).

The control unit 308*a* generates a random number R (Step S158), and performs the encryption algorithm E on the generated random number R using a shared key K held in advance to generate a ciphertext C=E(K,R) (Step S159), and transmits the generated ciphertext C to the memory card 200 via the mobile telephone network 20 and the instruction-use mobile telephone 100 (Steps S160 and S161).

Next, the control unit 212 performs a decryption algorithm D on the received ciphertext C using the shared key K to generate a decrypted text R' (Step S162), and transmits the decrypted text R' to the equipment control device via the input output unit 201, the instruction-use mobile telephone 100, the wireless base station 24, and the mobile telephone network 20 (Steps S163 and S164).

The control unit 308*a* receives the decrypted text R' from the memory card 200 via the instruction-use mobile telephone 100 and the mobile telephone network 20 (Steps S163 and S164). Next, the control unit 308*a* judges whether or not the generated random number R and the received decrypted text R' match. When there is no match (Step S165), the control unit 308*a* transmits authentication failure information indicating the failure of authentication to the memory card 200 via the mobile telephone network 20 and the instruction-use mobile telephone 100 (Step S166 and Step S167). The memory card 200 outputs the authentication failure information to the instruction-use mobile telephone 100 (Step S169), and the instruction-use mobile telephone 100 displays a message indicating the failure of authentication (Step S170). The control unit 308*a* also outputs an instruction to end communication to the mobile telephone network 20 (Step S168), and communication is ended accordingly.

When there is a match (Step S165), the control unit 308*a* reads the mode flag from the information storage unit 309*a*, and judges whether the mode flag is "1" or "0". If the mode flag is "1" (Step S181), the control unit 308*a* outputs the message indicating an error (error notification) to the memory card 200 via the mobile telephone network 20 and the instruction-use mobile telephone (Steps S182 and S183). The memory card 200 then outputs the message to the instruction-use mobile telephone 100 (Step S184), and the instruction-use mobile telephone 100 displays the message (Step S185).

If the mode flag is "0" (Step S181), the control unit 308*a* generates a random number, acquires the current time and date, and performs an XOR operation on the generated random number and the acquired time and date to generate a first electronic key (Step S186), and writes the generated first electronic key into the information storage unit 309*a* (Step S187). Next, the control unit 308*a* updates the mode flag from "0" to "1" (Step S188) by writing the mode flag "1" into the information storage unit 309*a*.

Next, the control unit 308*a* shares a session key with the control unit 308*a* (Step S189), performs an encryption algorithm on the first electronic key to generate the encrypted electronic key using the session key (Step S190), and transmits the encrypted electronic key to the memory card 200 via the mobile telephone network 20 and the instruction-use mobile telephone 100 (Steps S191 to S192).

Next, the control unit 212 receives the encrypted electronic key from the control unit 308*a* (Step S191 and Step S192), decrypts the received encrypted electronic key to generates the second electronic key using the session key (Step S193), and stores the generated second electronic key internally (Step S194). Next, the control unit 212 outputs completion notification indicating that the warning mode has been set to instruction-use mobile telephone 100 via the input/output unit 201 (Step S195). The instruction-use mobile telephone 100 displays a screen indicating that the mode setting has been completed (Step S196).

Communication between the instruction-use mobile telephone 100 and the vehicle control unit is then ended (Step S197).

(4) Operations for Setting Normal Mode

Figure 16:
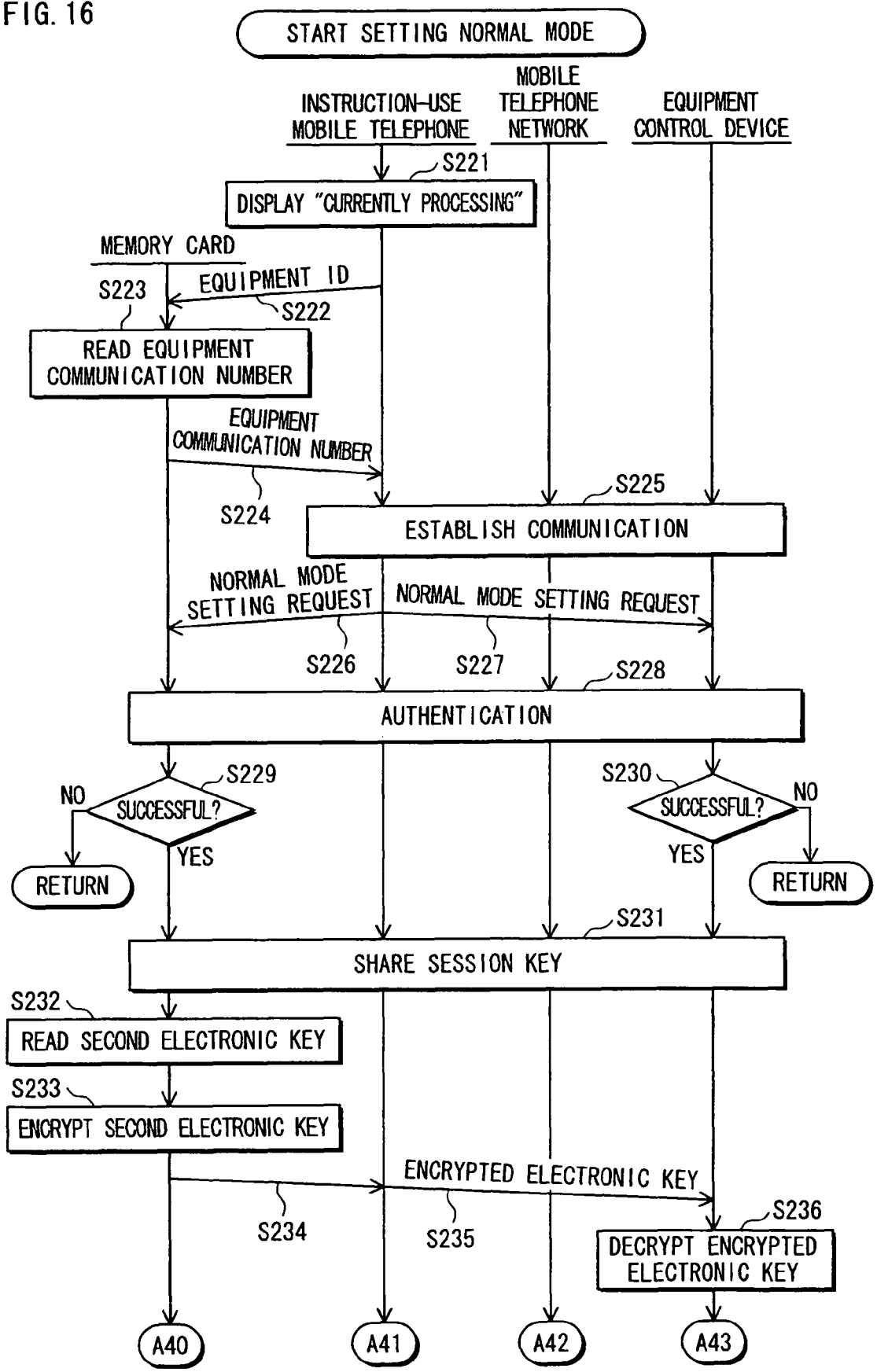
FIG. 16 is a flow-chart showing operations for setting a normal mode (cont.
Figure 17:
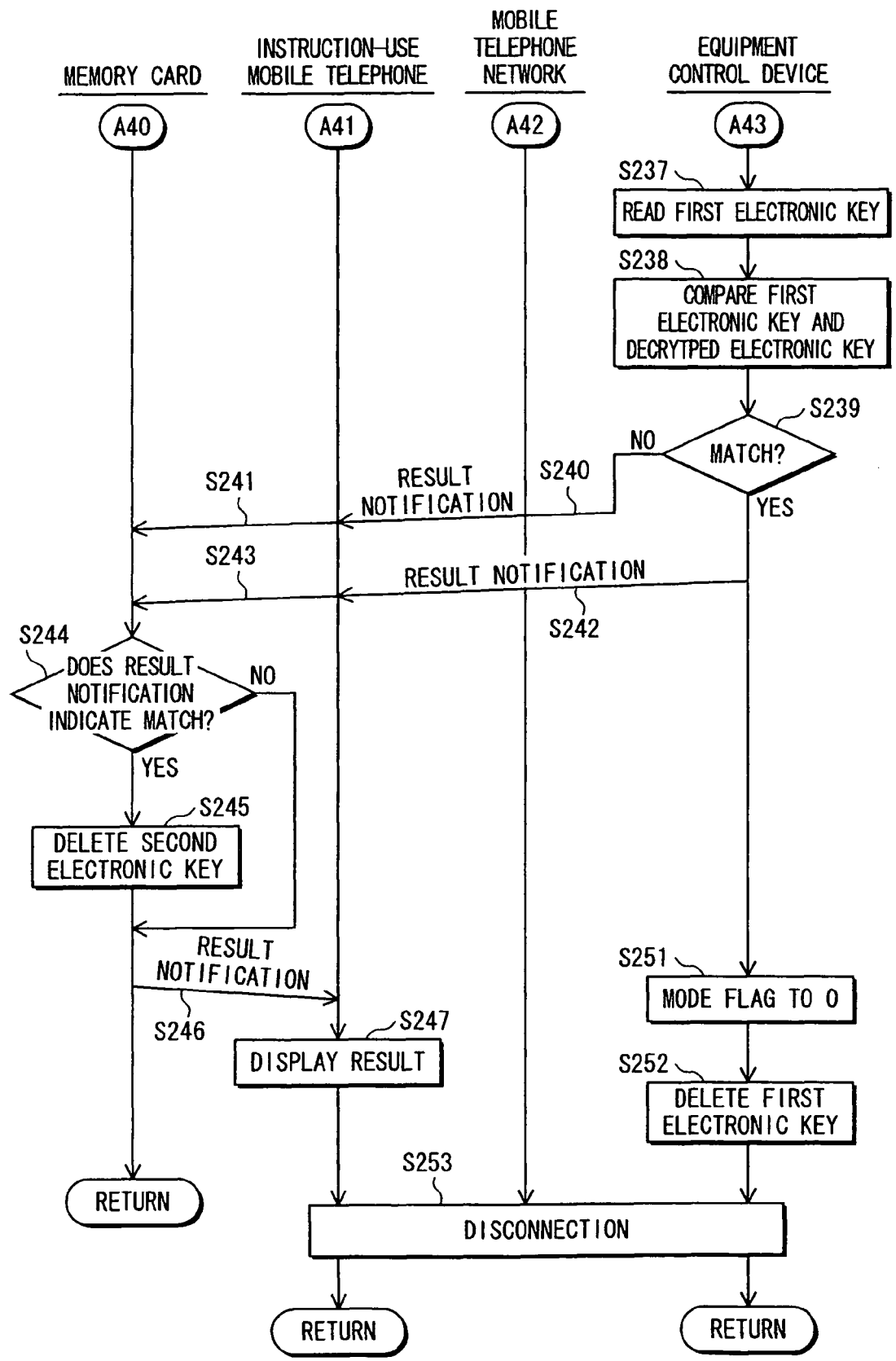
in FIG. 17)

The operations for setting the normal mode are described below with reference to the flow-chart in FIG. 16 and FIG. 17.

The control unit 101 generates the currently processing screen 151, and the display unit 107 displays the currently processing screen 151 (Step S221). Next, the control unit 101 outputs the acquired equipment ID, which corresponds to the received option, to the memory card 200 (Step S222).

The control unit 212 of the memory card 200 receives the equipment ID from the instruction-use mobile telephone 100 (Step S222), reads the equipment information that includes the received equipment ID from the equipment list 231 stored in the information storage unit 202, extracts the equipment communication number from the read equipment information (Step S223), and outputs the extracted equipment communication number to the instruction-use mobile telephone 100 via the input/output unit 201 (Step S224).

The control unit 101 receives the equipment communication number corresponding to the equipment ID from the memory card 200 via the input/output unit 105 (Step S224).

Next, the control unit 101 outputs the received equipment communication number to the communication control unit 102, and establishes communication between the communication control unit 102 and the communication terminal identified by the equipment communication number, which is the equipment control device (Step S225).

On establishing communication, the control unit 101 outputs the normal mode setting request indicating that the piece of equipment is to be set to the normal mode, to the memory card 200 via the input/output unit 105 (Step S226), and transmits the normal mode setting request to the equipment control device identified by the equipment communication number via the communication control unit 102, the communication unit 103, the antenna 104, the radio base station 24, and the mobile telephone network 20 (Step S227).

Next, the equipment control device and the memory card 200 perform mutual authentication (Step S228), and share the session key if authentication is successful (Step S231).

Next, the control unit 212 reads the internally stored second electronic key (Step S232), encrypts the read second electronic key to generate an encrypted electronic key using the session key (Step S233), and transmits the generated encrypted electronic key to the equipment control device via the input/output unit 201, the instruction-use mobile telephone 100, the radio base station 24, and the mobile telephone network 20 (Steps S234 and S235).

Next, the control unit 308*a* receives the encrypted electronic key from the memory card 200 via the instruction-use mobile telephone 100 and the mobile telephone network 20 (Step S235), generates the decrypted electronic key by performing the decryption algorithm on the received encrypted electronic key using the session key (Step S236), reads the first electronic key from the information storage unit 309*a* (Step S237), and judges whether or not the read first electronic key matches the generated decrypted electronic key. Both when there is a match and when there is no match (Step S239) the control unit 308*a* transmits a message (result notification) indicating the result to the memory card 200 via the mobile telephone network and the instruction-use mobile telephone 100 (Steps S240 and S241, and Steps S242 and S243).

When there is match (Step S239), the control unit 308a overwrites the mode flag "1" stored in the information storage unit 309a with the mode flag "0" (Step S251), and deletes the first electronic key from the information storage unit 309a (Step S252).

The control unit 212 of the memory card 200 receives the message (result notification) (Steps S240 and S241, and Steps S242 and S243). When the received message indicates the first electronic key matches the decrypted electronic key (Step S244), the control unit deletes the stored second electronic key (Step S245). The control unit 212 then outputs the received message to the instruction-use mobile telephone 100 (Step S246), and the instruction-use mobile telephone 100 displays the message (Step S247).

Subsequently, communication between the instruction-use mobile telephone 100 and the equipment control device is ended (Step S253).

(5) Operations for Locking and Unlocking

Figure 18:
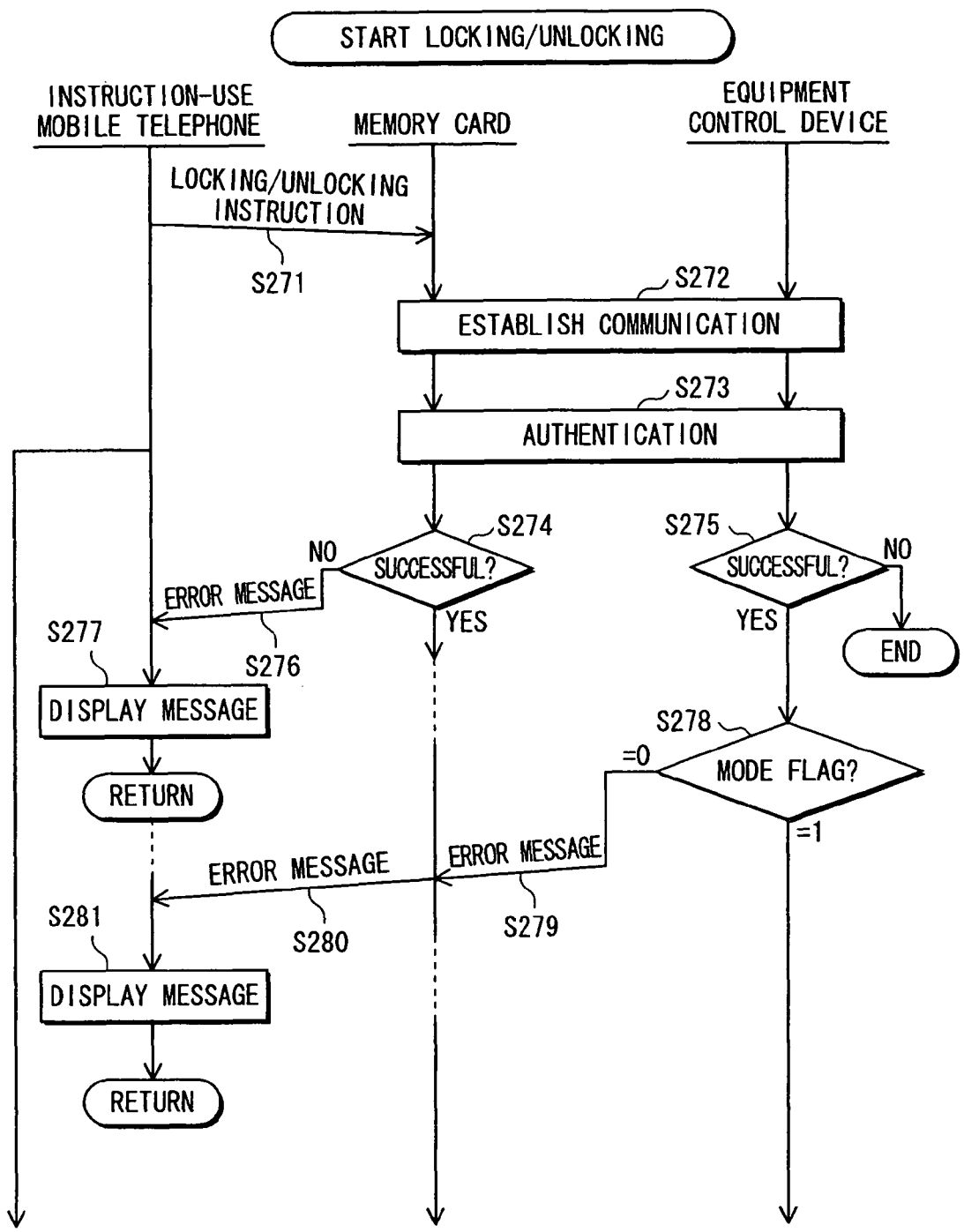
FIG. 18 is a flow-chart showing locking and unlocking operations, (cont.
Figure 19:
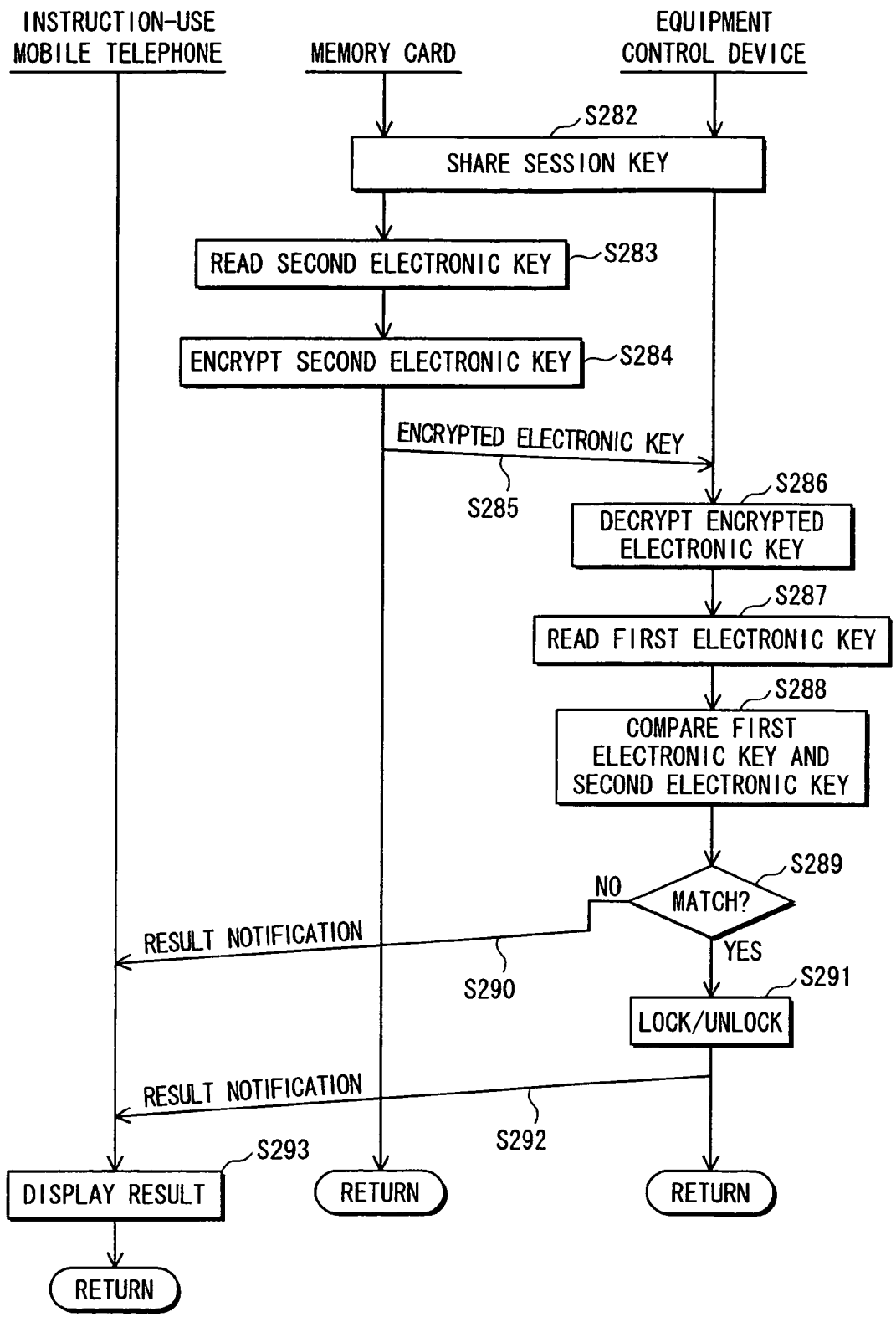
in FIG. 19)

The operations for setting the normal mode are described below with reference the flow-chart in FIG. 18 and FIG. 19.

The control unit 101 of the instruction-use mobile telephone 100 outputs the locking or unlocking instruction to the memory card 200 via the input/output unit 105, (Step S271).

The control unit 212 of the memory card 200 receives the locking/unlocking instruction indicating locking or unlocking from the instruction-use mobile telephone 100 via the input/output unit 201 (Step S271), and establishes a radio communication channel with the equipment control device via the communication control unit 211 and the antenna 204 (Step S272). Next the control unit 212 performs mutual authentication with the equipment control unit (Step S273).

If the authentication fails (Step S274), the control unit 212 outputs a message to this effect to the instruction-use mobile telephone 100 (Step S276), and the instruction-use mobile telephone displays the message (Step S277).

If the authentication fails (Step S275), the control unit 308a ends the processing.

If the authentication is successful (Step S275), the control unit 308a reads the mode flag from the information storage unit 309a, and judges whether the read mode flag is "0" or "1". When the read mode flag is "0", some error has occurred, and the control unit 308a outputs a message indicating the error (error notification) by short-range radio to the instruction-use mobile telephone 100 via the memory card (Steps S279 and S280). The instruction-use mobile telephone 100 displays the message (Step S281).

When the read mode flag is "1" (Step S278), the control unit 308a shares the session key with the memory card 200 (Step S282).

The control unit 212 reads the stored second electronic key (Step S283), encrypts the read second electronic key to generate the encrypted electronic key (Step S284), and outputs the encrypted electronic key to the equipment control device via the communication control unit 211 and the antenna 204 (Step S285).

Next, the control unit 308a receives the encrypted electronic key from the memory card 200 by short-range radio (Step S285), performs the decryption algorithm on the received encrypted electronic key using the generated session key to generate the decrypted electronic key (Step S286), reads the first electronic key from the information storage unit 309a (Step S287), and judges whether or not the read first electronic key matches the decrypted electronic key (Step S288). When there is no match, the control unit 308a outputs a message (result notification) to this effect to the memory card 200 by short-range radio (Step S290). On the other hand, when there is a match (Step S289), the control unit 308a outputs an electronic key-dependent instruction to lock or unlock to the vehicle control device (Step S291). Next, the control unit 308a outputs a message (result notification) indicating that the door 323a has been locked or unlocked to the memory card 200 by short-range radio (Step S292).

The instruction-use mobile telephone 100 displays the received message (Step S293).

(5) Operations of the Door-Lock Mechanism 322a

Figure 20:
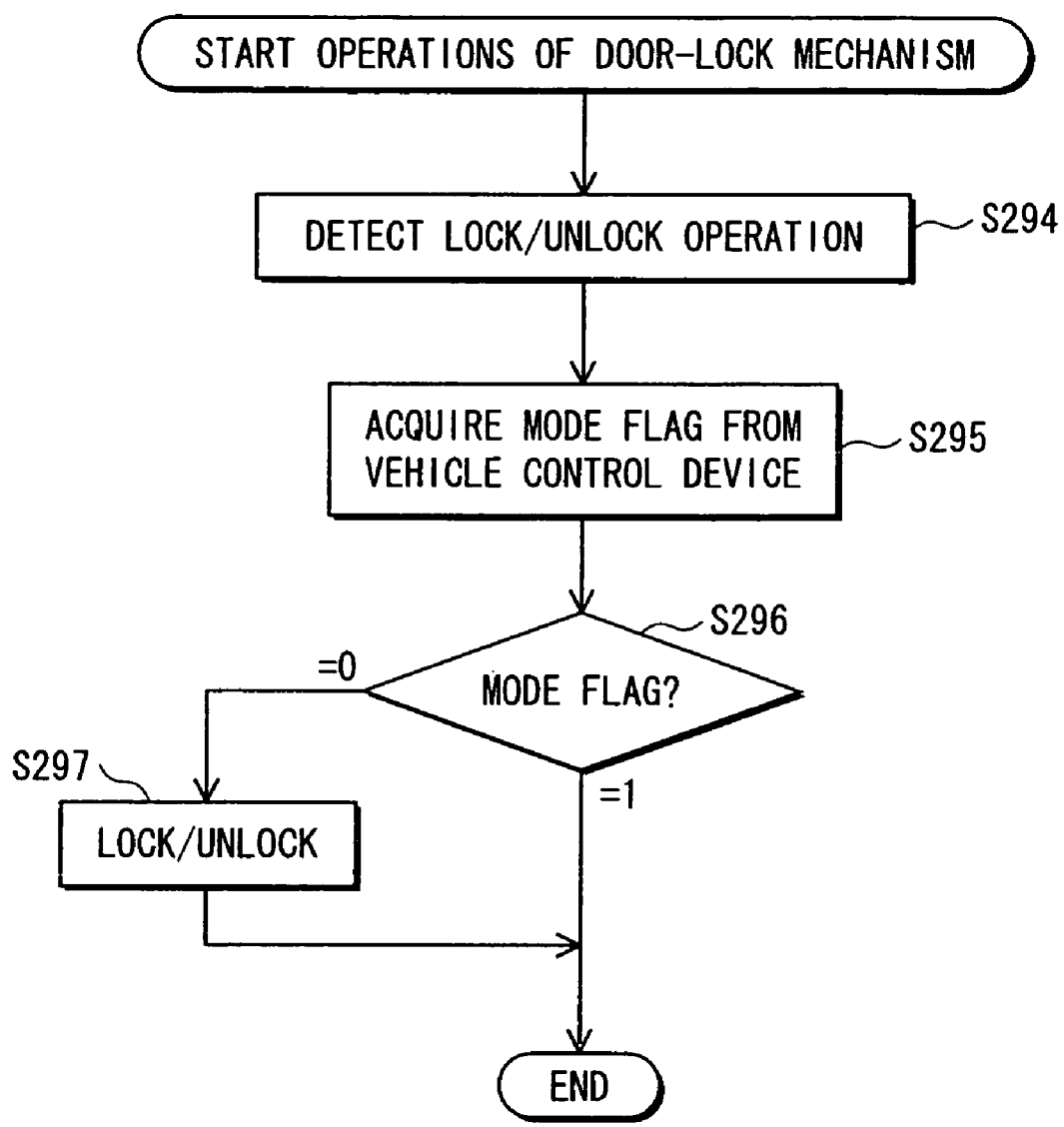

The operations of the door-lock mechanism 322a are described below with reference to the flow-chart shown in FIG. 20.

The door-lock mechanism 322a detects the operation to lock or unlock the door using the mechanical key 341a (Step S294), reads the mode flag via the control unit 308a and the vehicle control unit 310a (Step S295), and judges whether the read mode flag is "0" or "1".

When the mode flag is "0" (Step S296), the door-lock mechanism 322a locks or unlocks the door 323a according to the operation using the mechanical key 341a (Step S297). However, when the mode flag is "1" (Step S296), the door-lock mechanism 322a does not unlock or lock the door 323a when the operation is performed.

1.10 Summary

According to the first embodiment described above, if the user of a vehicle 30a loses the mechanical key 341a, for example, the instruction-use mobile telephone 100, in response to a user operation, instructs the vehicle control device 300a installed in the vehicle 30a to set the warning mode. The vehicle control device 300a sets the warning mode, generates an electronic key, and transmits the generated electronic key to the instruction-use mobile telephone 100. The instruction-use mobile telephone 100 then stores the electronic key.

When in the warning mode, the vehicle control device 300a of a vehicle 30a disregards operations to unlock or lock the door 323a using the mechanical key 341a. The same goes for operations to start or stop the engine using the mechanical key 341a. However, when instruction-use mobile telephone 100, in response to a user operation, uses the internally stored electronic key to perform the door 323a locking or unlocking operation, or engine starting or stopping operation, the vehicle control unit 310a accepts the operation, and locks or unlocks the door 323a, or starts or stops the engine 325a accordingly.

If the lost mechanical key 341a is found, the mobile telephone 100, in response to a user operation, instructs the vehicle control device 300a installed in the vehicle 30a to return to the normal mode. The vehicle control device 300a then sets the normal mode, and the instruction-use mobile telephone 100 deletes the stored electronic key.

When in the normal mode, the vehicle control device 300a accepts operations using the mechanical key 341a to lock and unlock the door 323a, and to start and stop the engine 325a. At this time, the instruction-use mobile telephone cannot unlock the door 323a or start and stop the engine 325a since it does not hold the electronic key.

With this construction, the vehicle can be set to the warning mode to disable the mechanical key and prevent theft in the case where the mechanical key is lost. Moreover, when the vehicle is set to the normal mode, it is not possible to lock or unlock the door, or to start or stop the engine using the instruction-use mobile telephone since the instruction-use mobile telephone does not hold the electronic key. Consequently, a vehicle in the normal mode cannot be stolen when the instruction-use mobile telephone is lost.

2 Second Embodiment

A theft prevention system 50 is described below as another embodiment of the present invention.

Figure 21:
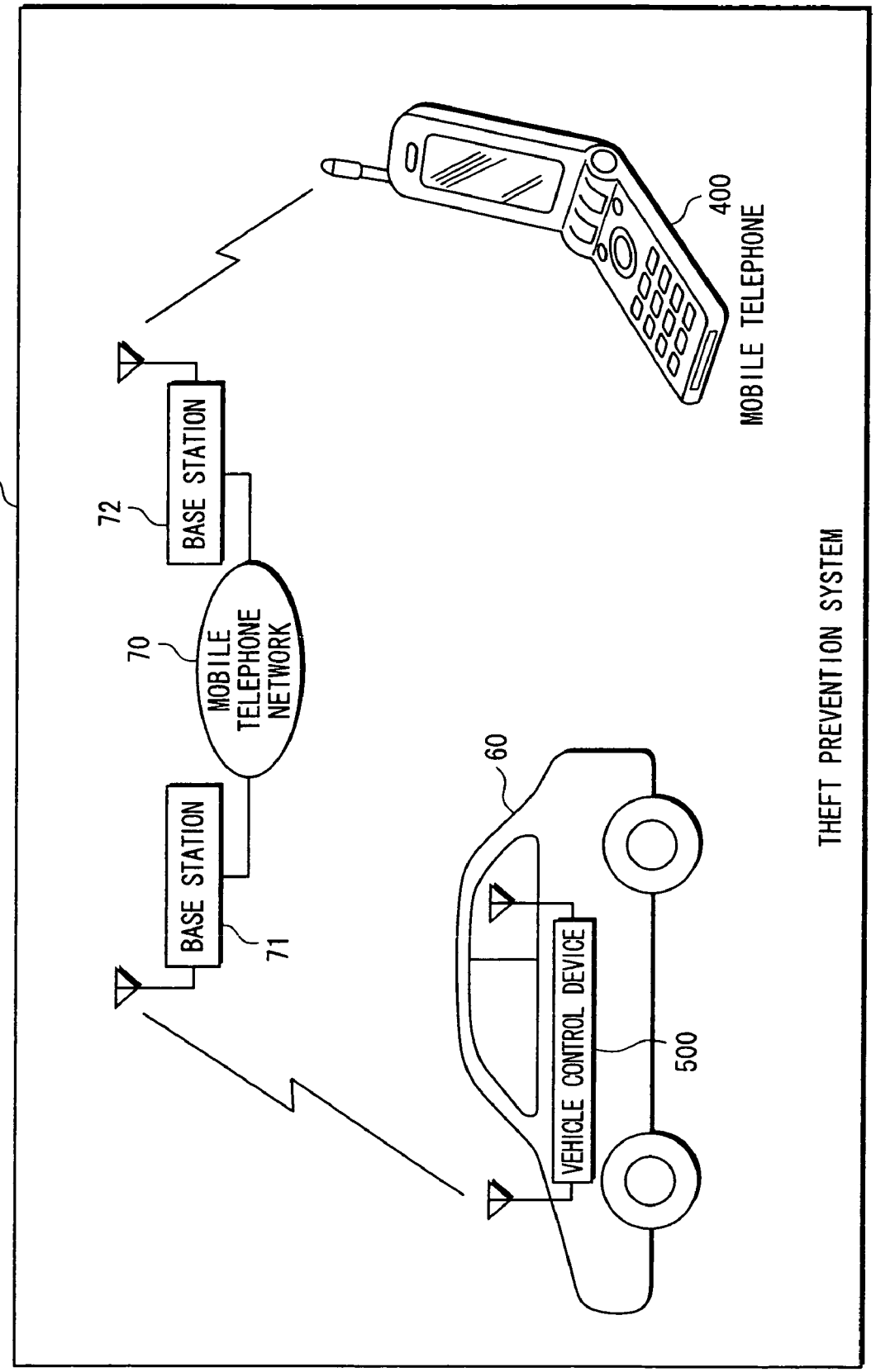
FIG. 21 shows a construction of a theft prevention system 50.

The theft prevention system 50 has an object of preventing the theft of a user-owned vehicle 60, and is constructed from a mobile telephone 400 and the vehicle 60, as shown in FIG. 21.

A vehicle control device 500 is installed in the vehicle 60, and the vehicle control device 500 and the mobile telephone 400 are connected via a mobile telephone network 70.

The user of the vehicle 60 possesses a vehicle key, which is used to lock and unlock the doors and to start and stop the engine. The vehicle control device 500 enables or disables door and engine operations that use the vehicle key.

The vehicle 60 may be a car which requires a specific mechanical key for these operations. Note that in the following description of the vehicle 60 is assumed to be a car, although another vehicle such as a truck, a bus, a motorcycle or a bicycle could be also be used.

The vehicle key is a mechanical key which is required when operating the car to lock/unlock the doors of the vehicle 60 and to start/stop the engine. The systems for locking/unlocking the door of the vehicle 60 and for starting/stopping the engine are well known, and a description of these parts is therefore omitted here.

The door of the vehicle 60 has both a first locking/unlocking system that uses a regular key and a second locking/unlocking system that uses an electronic locking device, and is constructed such that operations to open and close the doors and the like cannot be performed unless both the first and second locking/unlocking systems are unlocked. The electronic locking device is controlled by the vehicle control device 500. The engine of the vehicle 60 is provided with both an engine stopping/starting system with a normal ignition switch that uses the vehicle key and a separate electronic switch. If the electronic switch is OFF, operations to start the engine of the vehicle 60 cannot be performed. The electronic switch is switched ON and OFF by the vehicle control device 500.

With the above construction, the vehicle control device 500 can enable and disable door and engine operations which use the vehicle key in the vehicle 60. A description of the electronic locking device and the electronic switch is omitted, as these technologies are well known.

2.1 Mobile Telephone

Figure 22:
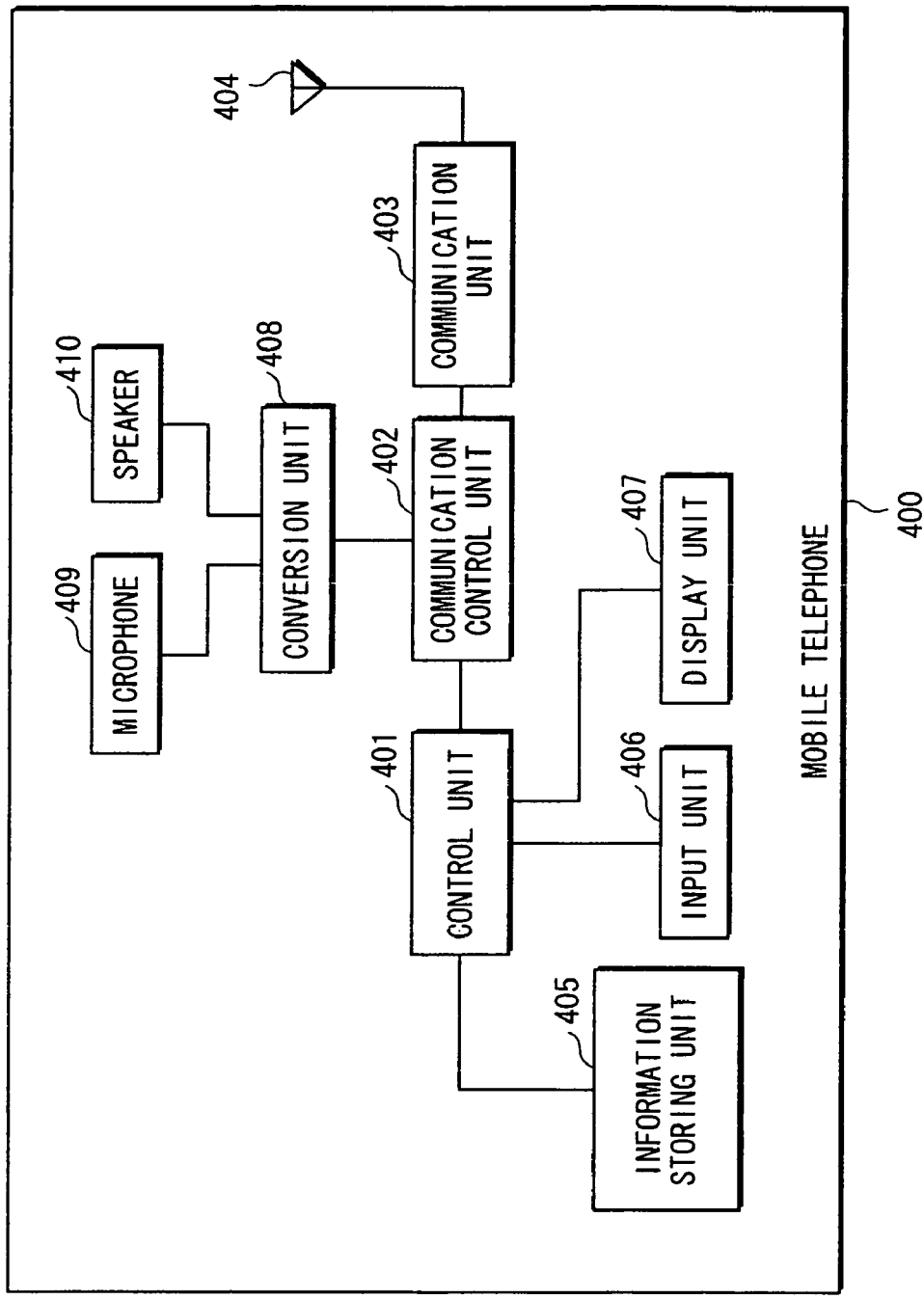
FIG. 22 is a block diagram showing a construction of a mobile telephone 400.

The mobile telephone 400 is constructed from a control unit 401, a communication control unit 402, a communication unit 403, an antenna 404, an information storage unit 405, an input unit 406, a display unit 407, a conversion unit 408, a microphone 409, and a speaker 410, as shown in FIG. 22.

Specifically, the mobile telephone 400 is a computer system that includes a microprocessor, ROM, RAM, and the like. A computer program is stored in the RAM. The mobile telephone 400 achieves a portion of its function as a result of the microprocessor operating in accordance with the computer program.

The communication control unit 402, the communication unit 403, the antenna 404, the input unit 406, the display unit 407, the conversion unit 408, the microphone 409, and the speaker 410 have similar constructions to the communication control unit 102, the communication unit 103, the antenna 104, the input unit 106, the display unit 107, the conversion unit 108, the microphone 109 and the speaker 110 of the instruction-use mobile telephone 100.

(1) Information Storage Unit 405

The information storage unit 405 includes a region for storing information.

(2) Control Unit 401

Overall Operations

The control unit 401 generates a vehicle operation menu screen as a result of a user instruction, and outputs the generated vehicle operation menu screen to the display unit 407.

Next, the control unit 401 receives one of the options displayed on the vehicle operation menu screen via the input unit 406. The options include "disable" and "enable" among others.

On receipt of "disable", the control unit 401 reads a vehicle list from the information storage unit 405, and outputs the read list to the display unit 407. The control unit 401 then receives a vehicle ID identifying one of the vehicles on the displayed vehicle list from the input unit 406.

Next, the control unit 401 checks whether or not the identified vehicle has already been disabled. This check is performed by judging whether or not second enabling information is stored in the information storage unit 405. In other words, if second enabling information is stored in the information storage unit 405, the control unit judges 401 that the vehicle 60 has already been disabled. Conversely, if second enabling information is not stored, the control unit 401 judges that the vehicle has not yet been disabled.

On receipt of "enable", the control unit 401 reads the vehicle list from the information storage unit 405, and checks whether there are relevant vehicles on the list. If there are no relevant vehicles on the list, the control unit 401 outputs a message to this effect to the display unit 407.

If there are relevant vehicles is on the list, the control unit 401 receives the vehicle ID identifying one of the vehicles on the list.

The control unit 401 then checks whether or not the vehicle has been disabled, and if disabled, performs processing to enable vehicle operations.

On receipt of one of the other options, the control unit 401 performs the corresponding processing.

Processing to Disable Vehicle

The control unit 401 reads a vehicle telephone number corresponding to the received vehicle ID from the information storage unit 405, outputs the telephone number to the communication control unit 402, and causes the communication control unit 402 to establish communication with the communication terminal identified by the vehicle telephone number, this being a vehicle control device 500.

On establishing communication, the control unit 401 transmits a vehicle disabling request to the vehicle control device 500 distinguished by the vehicle telephone number via the communication control unit 402, the communication unit 403, the antenna 404, and the mobile telephone network 70.

The control unit 401 receives a ciphertext C from the vehicle control device 500, performs a decryption algorithm D on the received ciphertext C using a shared key K to generate a decrypted text R', and transmits the generated decrypted text R' to the vehicle control device 500 via the mobile telephone network 70.

Next, the control unit 401 receives the first enabling information from the control unit 401, and stores the received first enabling information as second enabling information in the information storage unit 405.

Subsequently, the control unit 401 instructs the communication control device 402 to end the communication between the mobile telephone 400 and the vehicle control device 500.

Processing to Disable Vehicle Operations

The control unit 401 judges whether or not the second enabling information is stored in the information storage unit 405. If the second enabling information is not stored, the control unit instructs the display unit 407 to display information indicating this result, and then ends the processing.

If the second enabling information is stored, the control unit 401 reads the second enabling information from the information storage unit 405, and transmits the second enabling information to the vehicle control device 500 via the mobile telephone network 70.

The control unit 401 receives enable completion information, which indicates that vehicle operations have been enabled, from the vehicle control unit 500 via the mobile telephone network 70, deletes the second enabling information stored in the information storage unit 405, instructs the display unit 407 to display a screen indicating that the vehicle operations have been enabled, and subsequently ends the processing.

2.2 Vehicle Control Device 500

Figure 23:
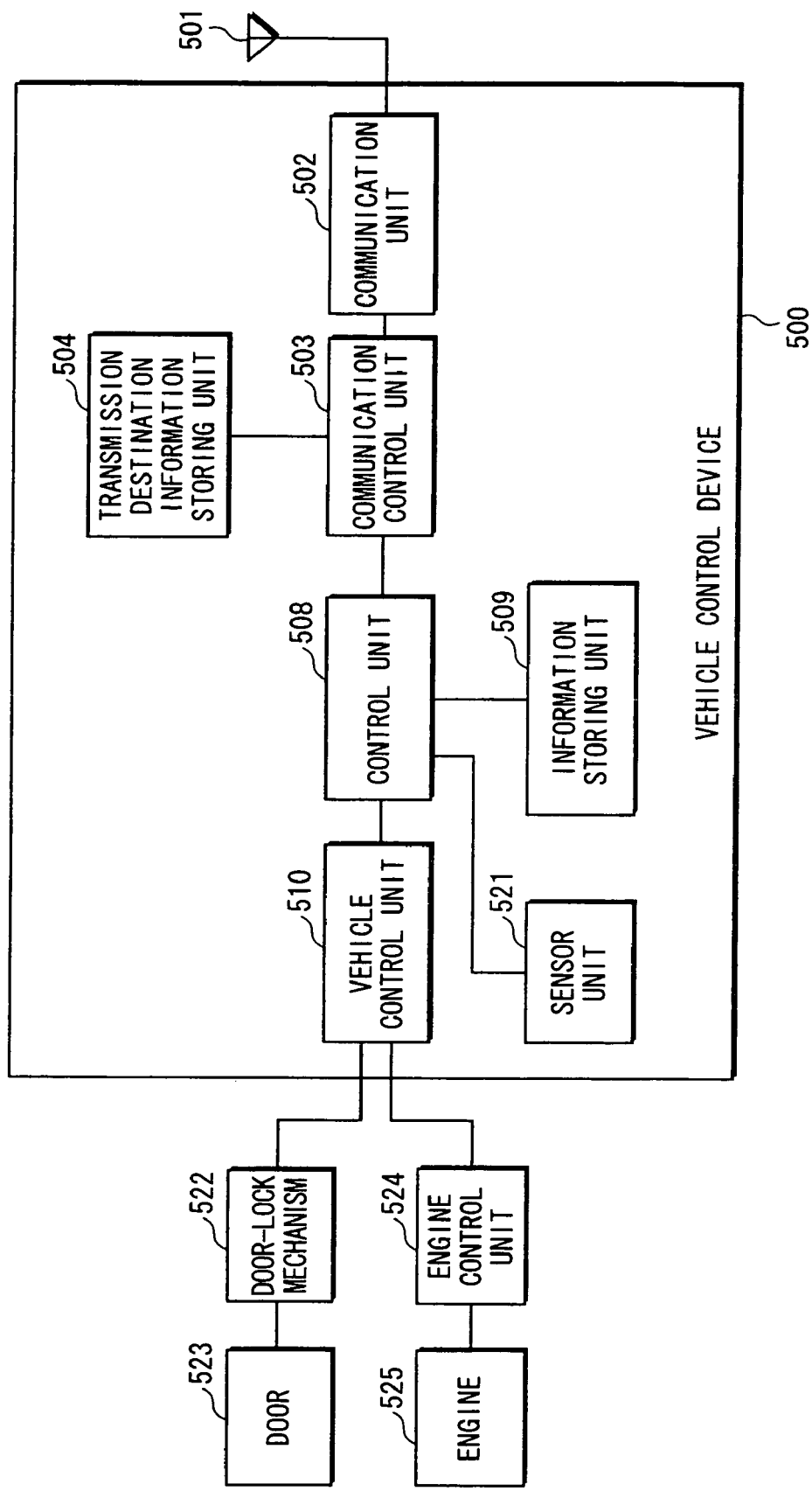
FIG. 23 is a block diagram showing a construction of a vehicle control device 500.

The vehicle control device 500 is installed in the vehicle 60, and is constructed from an antenna 501, a communication unit 502, a communication control unit 503, a transmission destination information storage unit 504, a control unit 508, an information storage unit 509, a vehicle control unit 510 and a sensor unit 521, as shown in FIG. 23.

Specifically, the vehicle control device 500 is a computer system constructed from a microprocessor, ROM, RAM, and the like. The RAM has a computer program stored therein. The vehicle control device 500 realizes a portion of its functions as a result of the microprocessor operating in accordance with the computer program.

Processing to Disable Vehicle Operation

On establishing communication with the mobile telephone 400, the control unit 508 receives a vehicle disabling request indicating to disable the vehicle, from the mobile telephone 400 via the mobile telephone network 70.

Next, the control unit 508 generates a random number R, performs an encryption algorithm E on the generated random number R using the shared key K to generate the ciphertext C=E(K,R), which the control unit 508 possesses in advance. The control unit 508 then transmits the generated ciphertext C via the mobile telephone network 70 to the mobile telephone 400.

The control unit 508 receives the cipertext R' from the mobile telephone 400 via the mobile telephone network 70, and subsequently judges whether or not the generated random number R matches the received decrypted text R'. If there is no match, the control unit 508 transmits authentication failure information indicating authentication failure to the mobile telephone 400 via the mobile telephone network 70.

If there is a match, the control unit 508 reads a mode flag from the information storage unit 509, and judges whether or not the read mode flag indicates that the vehicle 60 is disabled. If the mode indicates that the vehicle is already disabled, the control unit 508 transmits disabled notification indicating that the vehicle 60 is already disabled to the mobile telephone 400 via the mobile telephone network.

If, on the other hand, the mode flag indicates that the vehicle has not been disabled, the control unit 508 generates the first enabling information by generating a random number and using the generated random number as the first enabling information. Next, the control unit 508 writes the generated first enabling information to the information storage unit 509, and instructs the vehicle control unit 510 to disable the door operations and engine operations of the vehicle.

The control unit 508 transmits the generated first enabling information to the mobile telephone 400 via the mobile telephone network.

Processing to Enable Vehicle Operation

The control unit 508 receives the second enabling information from the mobile telephone 400. Next, the control unit 508 reads the first enabling information from the information storage unit 509, compares the read first enabling information and the received second enabling information, and judges whether the two match.

If there is match, the control unit 508 an transmits error message to this effect to the mobile telephone 400 via the mobile telephone network 70.

If there is no match, control unit 508 instructs the vehicle control unit 510 to enable door and engine operations in the vehicle. Next the control unit 508 outputs enable completion information indicating that the vehicle operations have been enabled.

2.3 Operation of Theft Prevention System

Operation of the theft prevention system 50 is described below.

(1) Overview of the Operation of the Theft Prevention System 50

Figure 24:
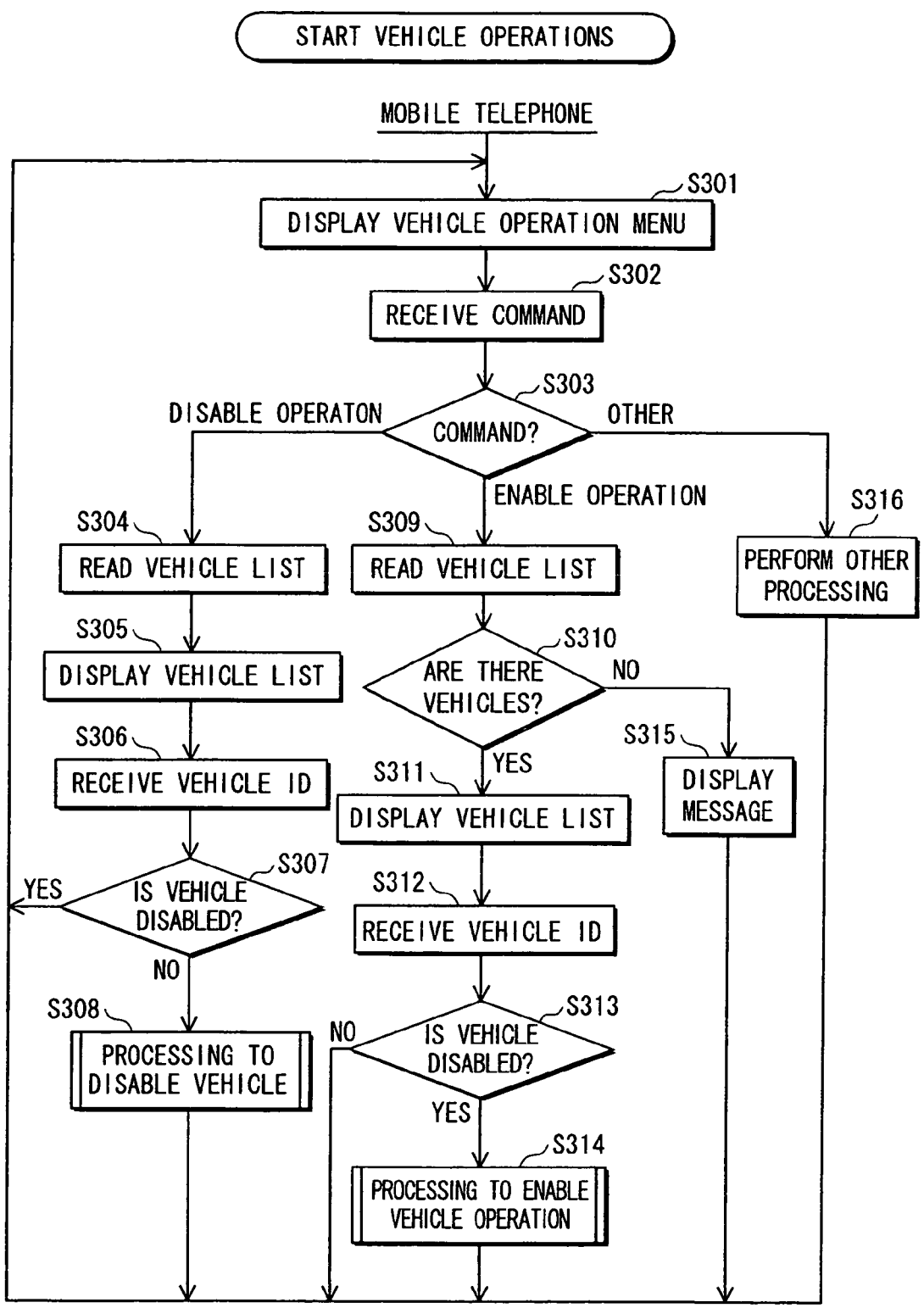
FIG. 24 is a flow-chart showing an overview of operations for the theft prevention system 50 of a second embodiment.

An overview of the operation of the theft prevention system 50 is given below with reference to the flow-chart shown in FIG. 24.

The control unit 401 of the mobile telephone 400 generates a vehicle operation menu as a result of a user instruction, and the display unit 407 displays the vehicle operation menu (Step S301).

Next, the control unit 401 receives one of the options displayed on the vehicle operation menu screen via the input unit 406. These options include "disable" and "enable" among others (Step S302).

When the received option is "disable" (Step S303), the control unit 401 reads the vehicle list from the information storage unit 405 (Step S309), and the display unit 407 displays the read vehicle list (Step S305). The control unit 401 also receives a vehicle ID identifying one of the vehicles on the displayed vehicle list, via the input unit 406 (Step S306).

Next, the control unit 401 checks whether or not the identified vehicle has already been disabled, and if not (Step S307), performs the processing to disable the vehicle (Step S308). The control unit 401 then returns to Step S301 and repeats the above processing. If the vehicle has been disabled (Step S307), the control unit 401 returns to Step S301, and repeats the above processing.

When the received option is "enable" (Step S303), the control unit 401 reads the vehicle list from the information storage unit 405(Step S304), and checks whether there are vehicles on the list. If there are no vehicles on the vehicle list (Step S310), a message to this effect is displayed (Step S315). The control unit 401 then returns to Step S301, and repeats the above processing.

If the vehicles on the vehicle list (Step S310), the display unit 407 displays the read vehicle list (Step S311), and the control unit 401 receives, via the input unit 406, a vehicle ID that identifies one of the vehicles on the displayed vehicle list (Step S312).

Next, the control unit 401 checks whether or not the identified vehicle is already disabled, and if disabled (Step S313), performs the processing to enable the vehicle (Step S314), and returns to Step S301 repeats the above processing. If the vehicle has not been disabled (Step S313), the control unit 401 returns to Step S301, and repeats the above processing.

On receipt of one of the other options (Step S303), the control unit 401 performs the corresponding processing (Step S316). The control unit 401 then returns to Step S301, and repeats the above processing.

(2) Operations for Disabling the Vehicle

Figure 25:
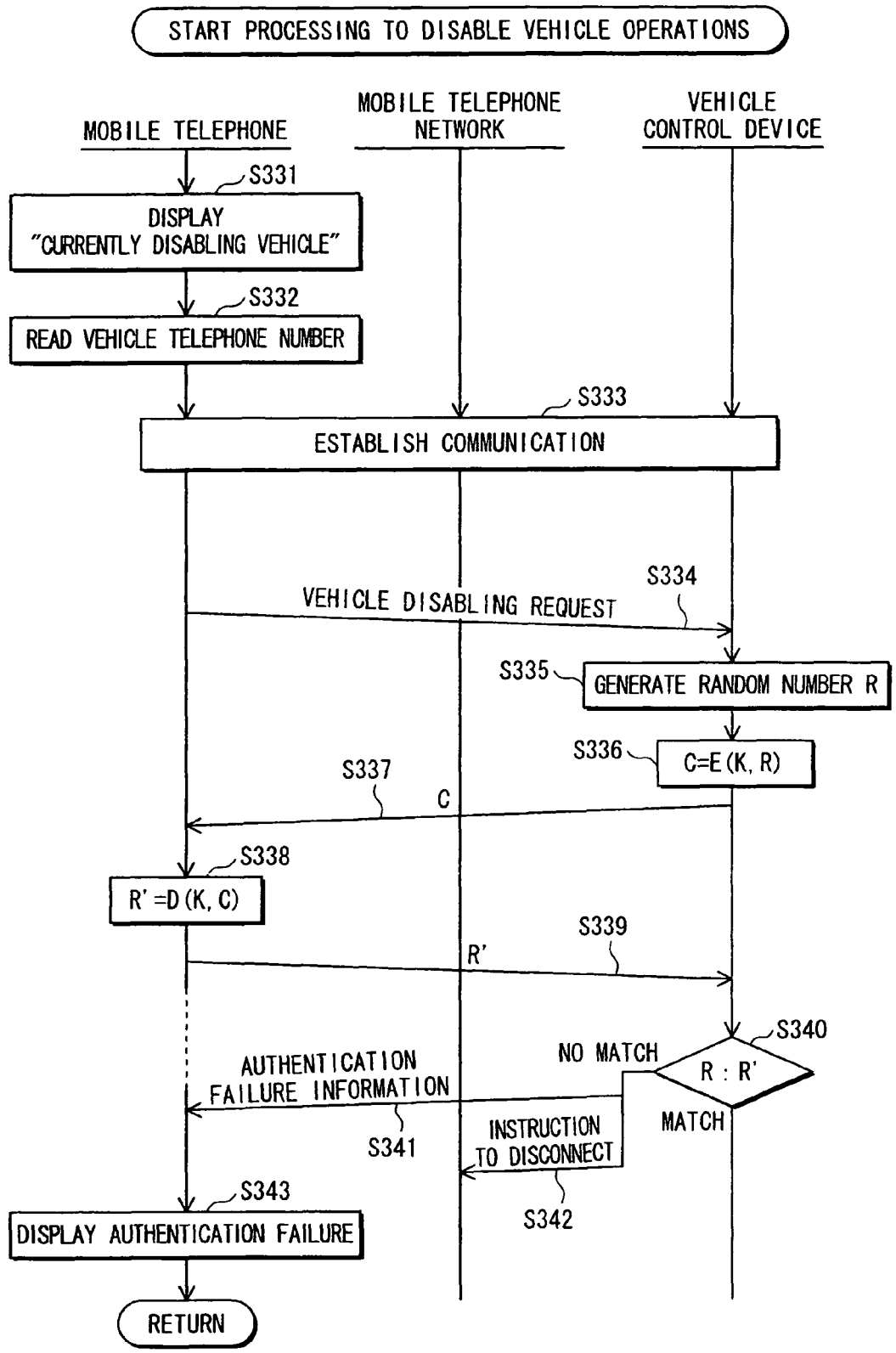
FIG. 25 is a flow-chart showing operations for disabling a vehicle (cont.
Figure 26:
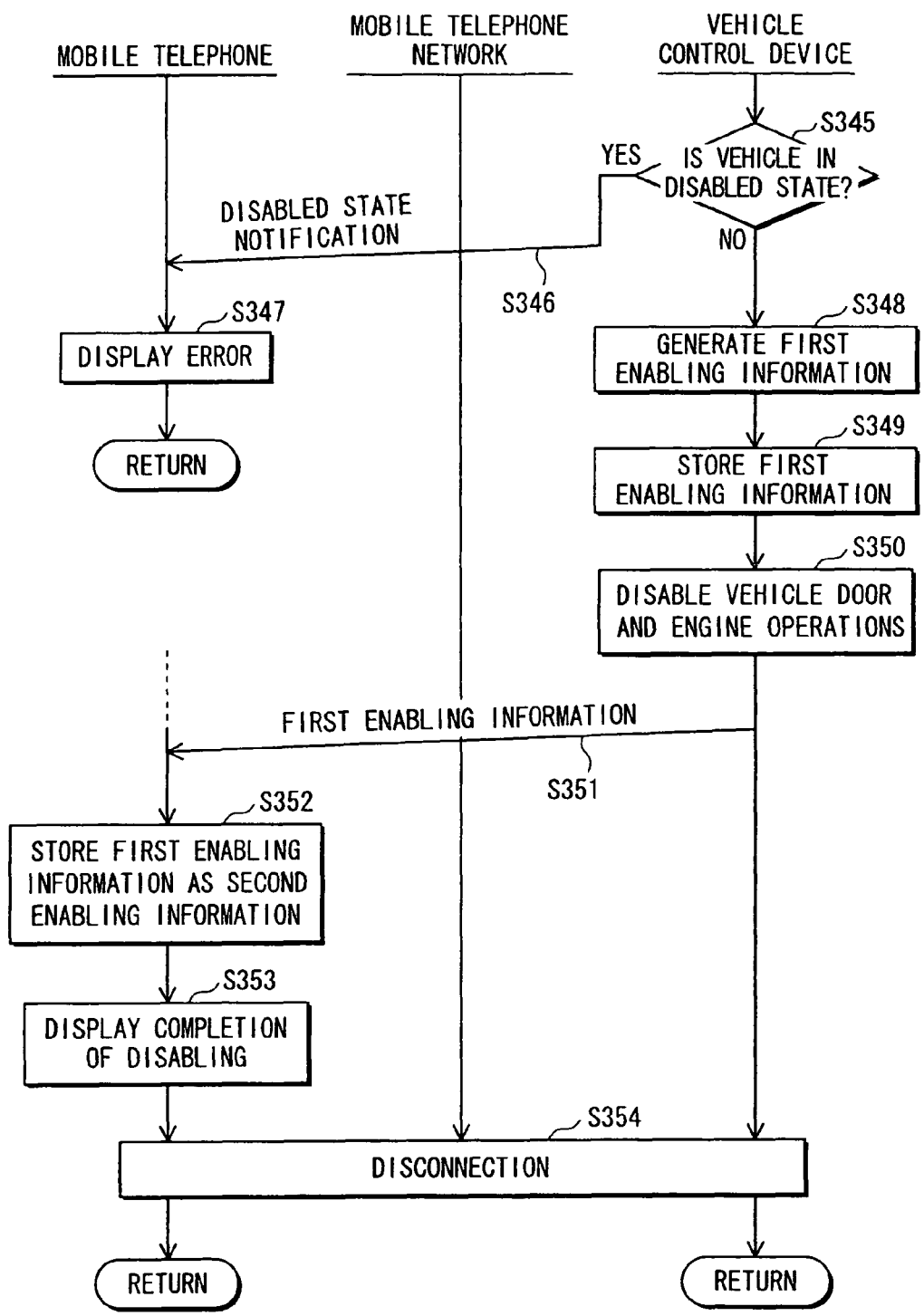
in FIG. 26)

The operations for disabling the vehicle are described with reference to the flow-chart shown in FIGS. 25 and 26.

The display unit 407 of the mobile telephone 400 displays a screen indicating that processing to disable the vehicle is currently being performed (Step S331). The control unit 401 then reads the vehicle telephone number corresponding to the vehicle ID received from the information storage unit 405 (Step S332).

Next, the control unit 401 outputs the read vehicle telephone number to the communication control unit 402, and causes the communication control unit 402 to establish communication with the communication terminal identified by the vehicle telephone number, this being the vehicle control unit 500 (Step S333).

On establishing communication, the control unit 401 transmits a vehicle disabling request to the vehicle control device 500 identified by the vehicle telephone number via the communication control unit 402, the communication unit 403, the antenna 404, and the mobile telephone network 70, (Step S334).

The control unit 508 generates the random number R (Step S335), and performs the encryption algorithm E on the generated random number R using the shared key K, which the control unit 508 possesses in advance, to generate the ciphertext C=E(K,R) (Step S336). The control unit 508 then transmits the generated ciphertext C to the mobile telephone 400 via the mobile telephone network 70 (Step S337).

The control unit 401 receives the ciphertext C from the vehicle control device 500 (Step S337), performs the decryption algorithm D on the received ciphertext C using the shared key K to generate the decrypted text R' (Step S338), and transmits the generated decrypted text R' to the vehicle control device 500 via the mobile telephone network 70 (Step S339).

The control unit 508 receives the decrypted text R' from the mobile telephone 400 via the mobile telephone network 70 (Step S339), and then judges whether or nor the generated random number R matches the received decrypted text R'. If there is no match (Step S340), the control unit 508 transmits authentication failure information indicating the failure of authentication to the mobile telephone 400 via the mobile telephone network 70 (Step S341). The mobile telephone 400 then displays the authentication failure information (Step S343), and ends the processing. The control unit 508 also outputs an instruction to disconnect from the mobile telephone network 70 (Step S342), and ends communication accordingly.

If there is a match (Step S340), the control unit 508 reads the mode flag from the information storage unit 509, and judges whether or not the read mode flag indicates that the vehicle has been disabled. If the mode flag indicates that the vehicle has already been disabled (Step S345), the control unit 508 transmits disabled state notification indicating that the vehicle has already been disabled to the mobile telephone 400 via the mobile telephone network 70 (Step S346). The mobile telephone 400 displays a message to this effect (Step S347), and ends the processing.

If the mode flag indicates that the vehicle has not been disabled (Step S345), the control unit 508 generates the first enabling information by generating a random number and using the generated random number as the first enabling information (Step S348). The control unit 508 then writes the generated first enabling information into the information storage unit 509 (Step S349), and instructs the vehicle control unit 510 to disable the door and engine operations of the vehicle (Step S350). Next, the control unit 508 transmits the generated first enabling information to the mobile telephone 400 via the mobile telephone network 70 (Step S351).

Next, the control unit 401 receives the first enabling information from the control unit 401 (Step S351), and stores the received first enabling information as second enabling information in the information storage unit 405 (Step S352). The display unit 407 then displays the screen indicating that the disabling of the vehicle is complete (Step S353).

Subsequently, the communication between the mobile telephone 400 and the vehicle control device 500 ends. (Step S354).

(3) Operations for Enabling the Vehicle

Figure 27:
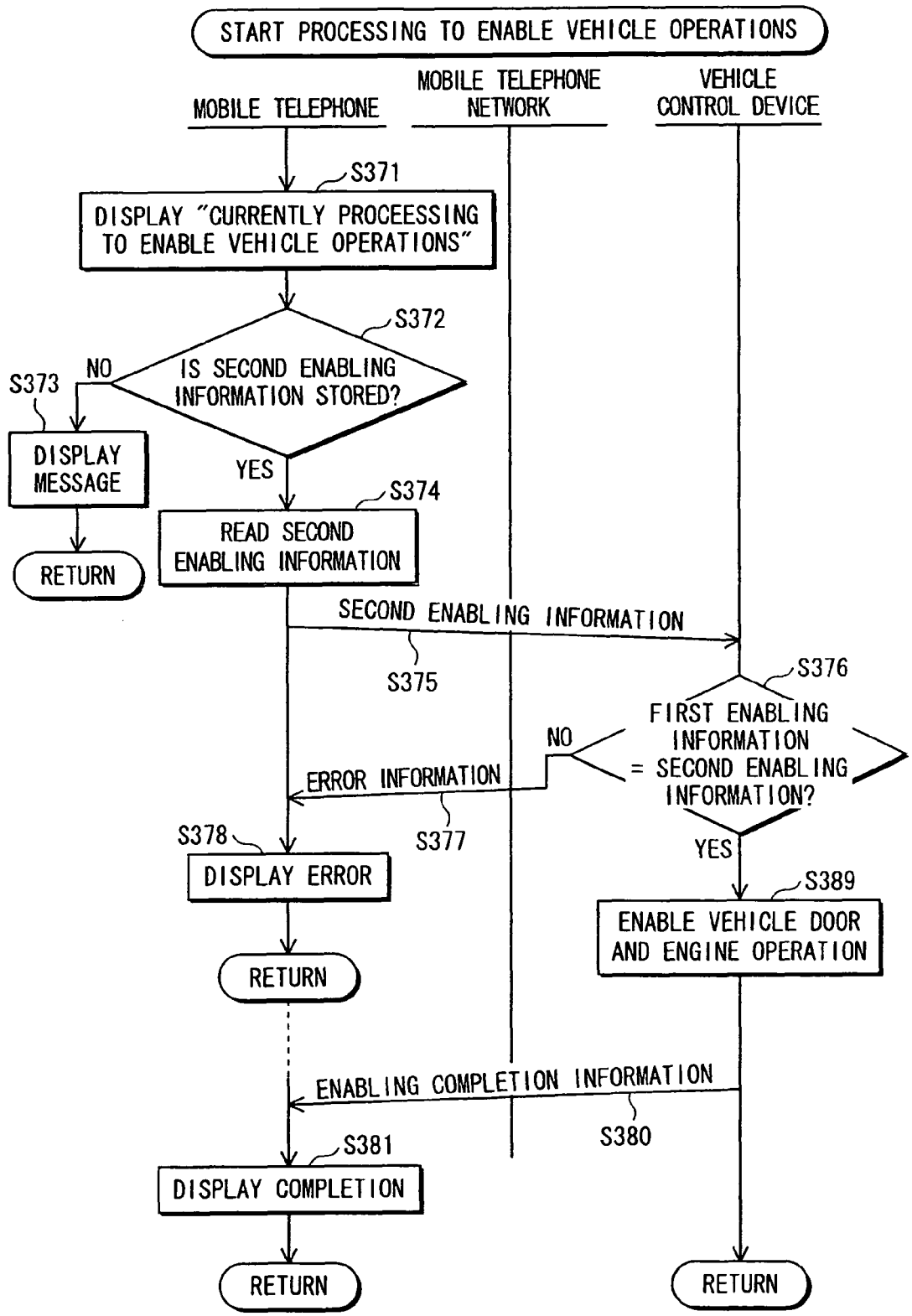
FIG. 27 is a flow-chart showing operations for enabling the vehicle.

The operations for enabling vehicle operation are described below with reference to the flow-chart shown in FIG. 27.

The display unit 407 displays the screen indicating that processing to enable vehicle operation is currently being performed (Step S371), and the control unit 401 judges whether or not the second enabling information is stored in the information storage unit 405. If the second enabling information is not stored (Step S372), the display unit 407 displays this result (Step S373), and the processing ends. If the second enabling information is stored (Step S372), the control unit 401 reads the second enabling information from the information storage unit 405 (Step S374), and transmits the read second enabling information to the vehicle control device 500 via the mobile telephone network 70 (Step S375).

The control unit 508 receives the second enabling information from the mobile telephone 400 (Step S375), compares the first enabling information stored in the storage unit 509 with the received second enabling information, and judges whether or not the two match. If there is no match (Step S376), the control unit 508 transmits error information indicating this result to the mobile telephone 400 via the mobile telephone network 70 (Step S377). The display unit 407 of the mobile telephone 400 then displays a screen indicating the result (Step S378), and the processing ends.

If there is a match (Step S376), the control unit 508 instructs the vehicle control unit 510 to enable the door and engine operations of the vehicle. The vehicle control unit 510 then enables the door and engine operations (Step S389). The control unit 508 then outputs enable completion information indicating that enabling is complete to the mobile telephone 400 via the mobile telephone network (Step S380).

The control unit 401 receives the enable completion information indicating that enabling is complete from the vehicle control unit 500 via the mobile telephone network 70 (Step S380), deletes the second enabling information from the information storage unit 405, and instructs the display unit 407 to display a screen indicating that enabling of the vehicle is complete. The display unit 407 then displays the screen indicating that the enabling of the vehicle is complete (Step S381), and the processing ends.

2.4 Modifications

A theft prevention system 50a is described below as a modification of the second embodiment.

Figure 28:
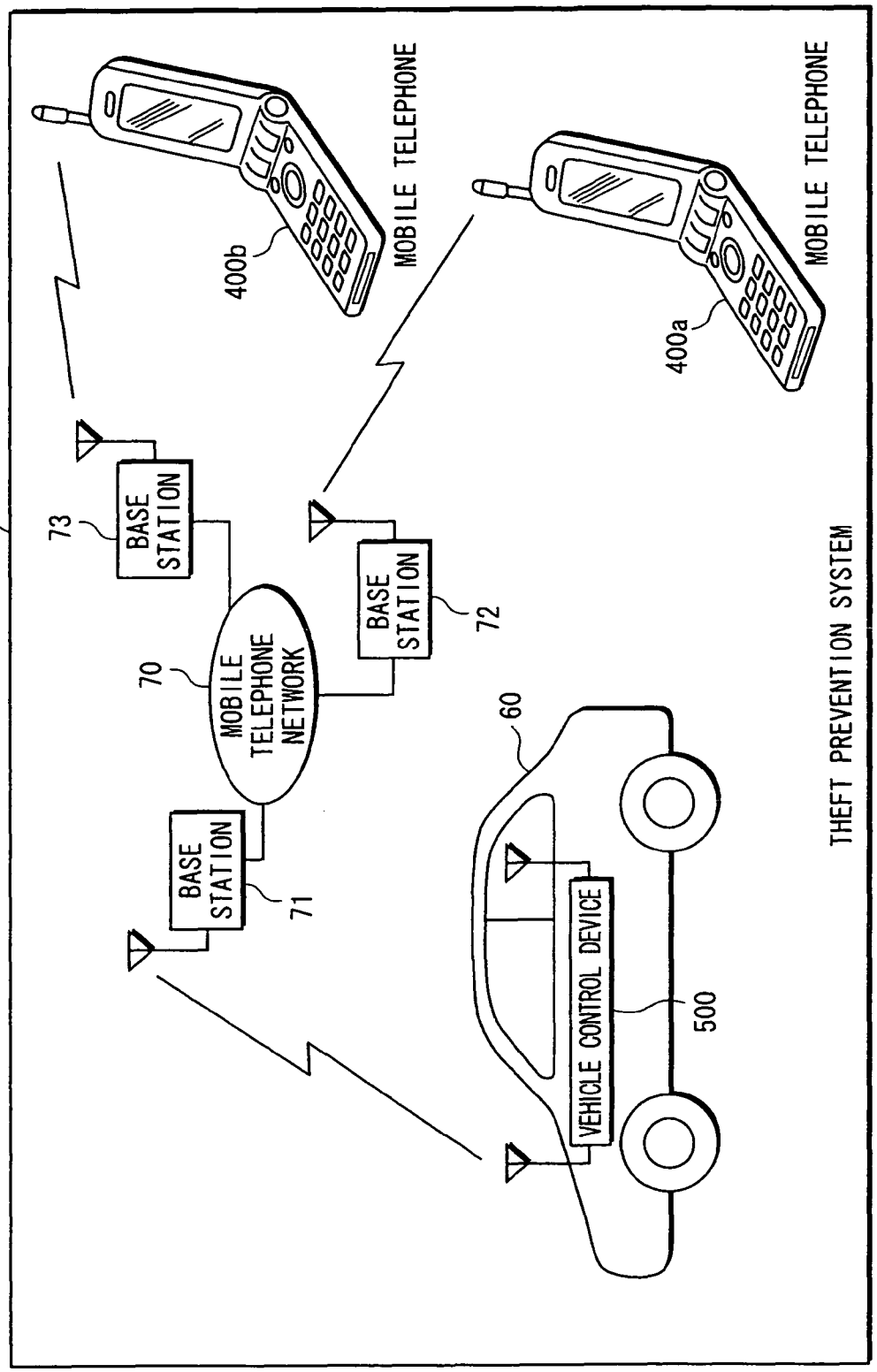
FIG. 28 shows a construction of a theft prevention system 50a as a modification of the second embodiment.

The theft prevention system 50a has a construction similar to the theft prevention system 50, and is constructed from a mobile telephone 400a, a mobile telephone 400b, and the vehicle 60, as shown in FIG. 28.

A vehicle control device 500 is installed in the vehicle 60, and the mobile telephone 400a, the mobile telephone 400b, and the vehicle control device 500 are connected via the mobile telephone network 70.

The vehicle control device 500 of the theft prevention system 50a has a construction similar to the vehicle control device 500 of the theft prevention system 50.

The mobile telephone 400a retains some of the functions contained in the mobile telephone 400, and the mobile telephone 400b retains the other functions.

In short the mobile telephone 400a transmits the vehicle disabling request to the vehicle control device 500, similarly to the mobile telephone 400.

On receipt of the vehicle disabling request from the mobile telephone 400a, the vehicle control device 500 generates first enabling information, disables the door and engine operation of the vehicle, and transmits the first enabling information to the mobile telephone 400b. The mobile telephone 400b receives the first enabling information, and stores the received first enabling information as second enabling information.

The mobile telephone 400b transmits the second enabling information to the vehicle control device 500. On receipt of the second enabling information, the vehicle control device 500 compares the stored first enabling information and the received second enabling information, and if the two match, enables vehicle door and engine operations.

Since the mobile device normally used by the user may be a separate device to the mobile device used in emergencies to enable vehicle door and engine operations that have been disabled, the mobile device used in emergencies can be given to a member of the user's family or otherwise kept separately. Consequently, even if both the vehicle key and the mobile telephone 400a normally used by the user are stolen, and used in combination, disabled door and engine operations cannot be enabled. Therefore, theft of the vehicle is prevented, and a high level of security can be achieved.

2.5 Summary

The present invention relates to a theft prevention system, a vehicle-installed device, and a mobile device which have an enhanced crime prevention function that is achieved by i) disabling vehicle operations which use the vehicle key, on detection of an irregularity or at the request of a user, and ii) subsequently returning the vehicle to a state in which the vehicle key can be used, through communication with a mobile device held by the user.

In the theft prevention system 50, the vehicle control device disables door and engine operations which use the vehicle key when an irregular state is detected as a result of vibrations caused by an attempted theft or the like, or when the user transmits a vehicle operation disable request to the vehicle control device 500 using the mobile telephone 400 via the mobile telephone network 70. To again enable door and engine operations of the vehicle 60 which use the vehicle key, the vehicle control device 500 transmits the enabling information to the mobile telephone 400 via the mobile telephone network 70. Subsequently, on receipt of the enabling information from the mobile telephone 400, the vehicle control device 500 again enables door and engine operations of the vehicle 60 which use the vehicle key.

In short, when an irregularity is detected as a result of such the vibrations caused by an attempted theft or the like, or at the request of a user holding a mobile device owned by the legitimate owner of the vehicle 60, the vehicle control device transmits enabling information to the mobile device and disables the vehicle operations that use the vehicle key, thereby preventing theft of the vehicle. The vehicle remains disabled until such time as the user uses the mobile device transmit the received enabling information to the vehicle 60, With this construction, when an irregularity is detected as a result of the vibrations caused by a theft or the like, or at the request of the user, the vehicle control device disables vehicle door and engine operations that use the normal key. Then, the vehicle control device transmits first enabling information to a user specified mobile device on the basis of pre-stored address information, and the mobile device stores the received first enabling information as the second enabling information. Then, the user can again enable the vehicle door and engine operations by transmitting the second enabling information to the vehicle control device using the mobile device.

Thus, since the disabling of the vehicle operations remains in place until the user-specified mobile device is used, third party theft can be prevented without requiring a management center.

Moreover, the theft prevention system offers unprecedented convenience because the user can use the specified mobile device to restore the vehicle operations.

3 Other Modifications

The above-described embodiments are exemplary embodiments of the present invention. However the present invention is in no way limited by these embodiments and may be implemented in a variety of forms without departing from the scope of the invention. The following cases are included in the present invention.

(1) In the first embodiment, the instruction-use mobile telephone 100 is described as transmitting the setting instruction to set the warning mode directly to the vehicle control device 300a, but the present invention is not limited to this arrangement. The following construction may be also be used.

The key management system 10 further includes a management center device provided at a management center, and the management center device is connected to the instruction-use mobile telephone 100 and vehicle-control device 300a via the internet 25 and the mobile telephone network 20.

The instruction-use mobile telephone 100 transmits the setting instruction to set the warning mode to the management center device. The management center device generates an electronic key, encrypts the generated electronic key, and transmits the result to the instruction-use mobile telephone 100 and the vehicle control device 300a.

The instruction-use mobile telephone 100 controls the locking and unlocking of the door of the vehicle 30a and the starting and stopping of the engine by instructing the vehicle control device 300a using the received electronic key.

(2) In the first embodiment, the vehicle control device 300a may pre-store an identification number (e.g. telephone number) that identifies the instruction-use mobile telephone 100. If the instruction to set the warning mode is received, the vehicle control device 300 may compare the telephone number of the originator with the stored telephone number, and only if they match, generate the electronic key and transmit the generated electronic key to the mobile telephone to which the stored telephone number is allocated.

(3) In the first embodiment, the electronic key may be a passcode that is set in advance, a key of private key encryption used in challenge-response authentication, a private key of a public key encryption method, or the like.

(4) In the first embodiment, the target of the theft is assumed to be a vehicle, mobile telephone, a personal computer, a residence, or the like, but the present invention is not limited to these examples. For instance, the present invention may also be applied to the locking and unlocking of a safe.

The key management system 10 in the first embodiment may include, in place of the instruction-use mobile telephone 100, a mobile telephone for instructing the vehicle to switch between modes and a separate mobile telephone for receiving and storing the electronic key and controlling the vehicle using the stored electronic key, similarly to the modification of the second embodiment.

(6) In the second embodiment, the vehicle control device 500 communicates with the mobile telephone 400 via the mobile telephone network 70, but instead of using the mobile telephone network 70, the vehicle control device 500 may communicate with the mobile telephone 100 by short-range radio.

One example of a mobile device capable of this type of short-range radio communication is a mobile telephone with a non-contact IC card communication function.

Here, short-range radio communication refers to radio communication that is only possible when the communication device is sufficiently close to the vehicle-installed device, such as radio communication with an effective range of up to 10 m used in keyless door-locking circuits or radio communication with an effective range of 10 cm or less that takes place between a non-contact IC card and non-contact IC card reader. Note that technologies such as the keyless door-locking circuit, the non-contact IC card and the like, are well known and a description of these is omitted here.

Using short-range radio enables a higher level of security because once the door and engine operations which use the vehicle key have been disabled in vehicle 60, the mobile telephone 400 must be used near to the vehicle control device to restore them.

(7) In the second embodiment, the mobile telephone 400 may include a communication control unit 402, a communication unit 403 and an antenna 404 which communicate with the other mobile terminal devices via the mobile telephone network, and further include a communication control unit, a communication unit, and an antenna which communicate with the vehicle control device 500 via a communication network other than the mobile telephone network.

This communication control unit, communication unit and antenna may use short-range radio communication.

This communication control unit, communication unit and antenna may also be constructed so as to be detachable from the mobile telephone 400.

Thus, present invention can further be applied in a construction in which a module for realizing short-range radio communication using a non-contact IC card or the like is added to the mobile telephone normally used.

(8) The transmission destination information, which consists of a telephone number specified by the user and is stored in advance in the transmission information storage unit 504 of the vehicle control device 500 may be recorded as follows.

When a user orders a car, for instance, the manufacturer of the vehicle control device 500 may write transmission destination information specified by the user into the transmission destination information storage unit 307 of the vehicle control device 500. With this method, vehicles are shipped containing vehicle control devices 500 that already have transmission destination information written therein.

Alternatively, the user may specify address information in a specialist store, and a store worker may write the address information specified by the user into the transmission destination information storage unit 504.

Furthermore, the vehicle control device may be configured so that the address information of the mobile device specified by the user can be recorded or revised at a later stage.

(9) In the second embodiment, in order to again enable the vehicle 60 door and engine operations which use the vehicle key, the vehicle control device 500 authenticates that the second enabling information was transmitted by the user-specified mobile telephone 400, by verifying that the information matches the generated first enabling information. However, other methods may be used provided that the second enabling information can be authenticated as having been transmitted from the user-specified mobile telephone 400.

For example, a user-specified mobile telephone and the vehicle control device may store common secret information S, and the vehicle control device may authenticate that the user-specified mobile telephone transmitted the second enabling information by verifying whether the user-specified mobile telephone has the secret information S.

Specifically, the vehicle control device generates a random number r, and transmits a ciphertext C obtained by encrypting the random number r encrypted using the secret information S, to the mobile telephone as the first enabling information. Next, the mobile telephone restores the random number r from the ciphertext C using its own secret information S, and transmits the restored random number r as the second enabling information to the vehicle control device. Next, the vehicle control device verifies whether or not the generated random number and the received random number are identical, and thereby authenticates whether the second enabling information was transmitted from the user-specified mobile telephone.

Alternatively, the vehicle control device may generate a random number r, and transmit a ciphertext C obtained by encrypting the random number r using a public key of the mobile telephone, as the first enabling information to the mobile telephone. Next, the mobile telephone restores the random number r from the ciphertext C using its own private key, and transmits the restored random number r to the vehicle control device as the second enabling information. Next, the vehicle control device verifies whether or not the generated random number and the received random number are identical, and thereby authenticates whether the second enabling information was transmitted from the user-specified mobile telephone.

(10) In the second embodiment, the vehicle key was assumed to be a mechanical key, but the vehicle 60 may be provided with a keyless door lock circuit which uses radio waves, and the door and engine operations which use the vehicle key may be performed using radio communication rather than a mechanical key. Moreover, in this case, the mobile telephone 400 may include a vehicle key function for performing door operations using radio communication, and be used instead of the vehicle key to perform the door and engine operations of the vehicle 60.

(11) In the second embodiment, when the mobile telephone 400 transmits the vehicle operation disabling request information to the vehicle control device 500, the mobile telephone network 70 transmits the received vehicle operation disabling request information directly to the vehicle control device 500. However, at this point, when the mobile telephone network 70 is to transmit the vehicle operation disabling request information to the vehicle control device 500, the mobile telephone network 70 may wait until the vehicle control device 500 is in a state in which it is capable of communicating with the mobile telephone network 70 before transmitting, similarly to a mobile telephone transmitting and receiving e-email.

With this arrangement, even if the mobile telephone 400 transmits the disabling request information when the vehicle 60 (and the vehicle control device 500) is, for instance, underground and incapable of communication with the mobile telephone network 70, the mobile telephone network 70 transmits the vehicle operation disabling request received from the mobile telephone 400 when the vehicle 60 (and the vehicle control device 500) emerges and becomes capable of communicating. With this arrangement, the vehicle operation disabling request can be transmitted more reliably to the vehicle control device 500 to control the door and engine operations of the vehicle 60.

(12) Moreover, in the above example, when transmitting the vehicle operation disabling request information from the mobile telephone network to the vehicle control device 500, reliability may be further enhanced as follows.

Figure 29:
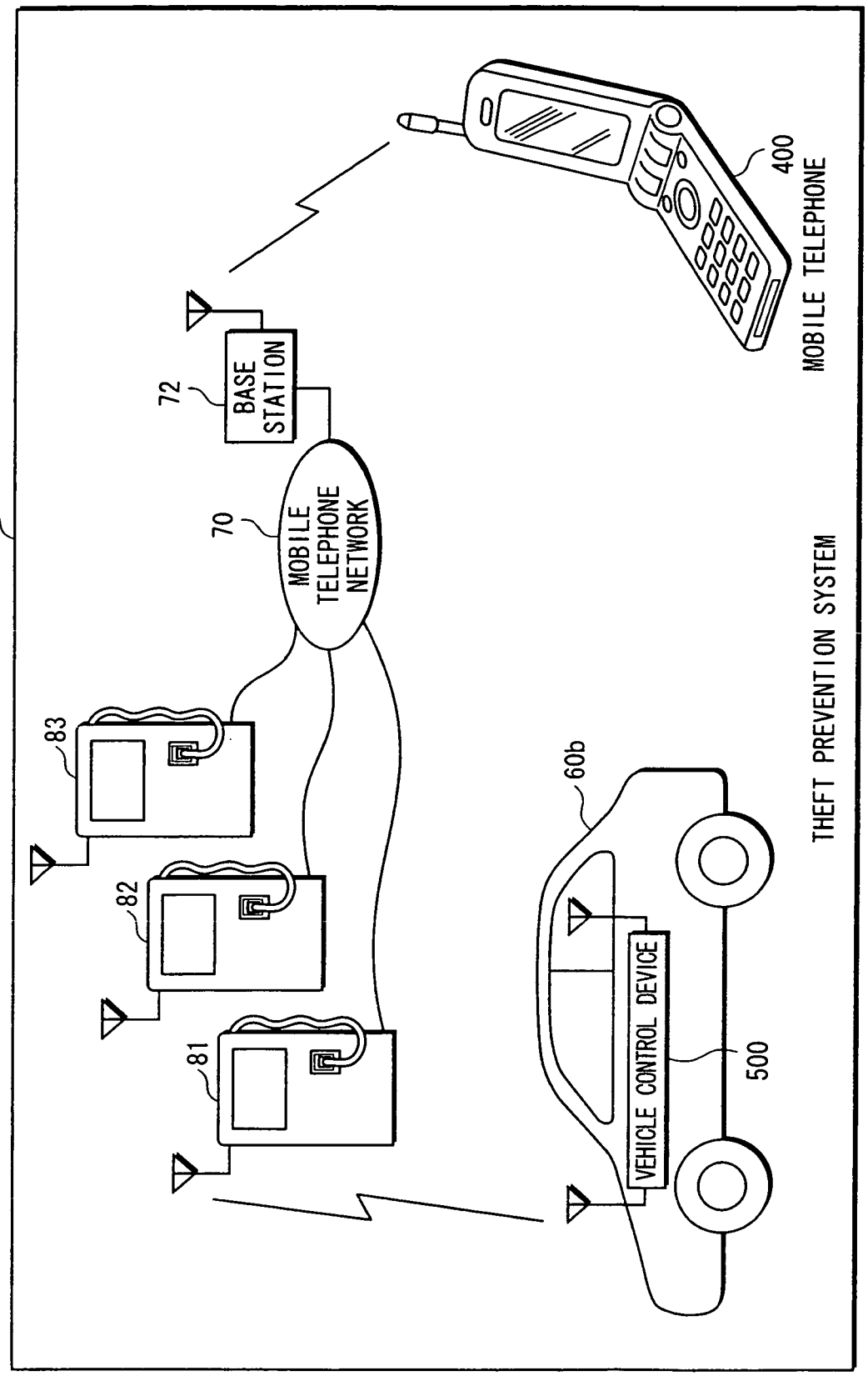
FIG. 29 shows a construction of a theft prevention system 50b as a modification of the second embodiment.

The theft prevention system 50*b* includes theft prevention system 50 and the gasoline supply devices 81, 82, and 83, which are provided at each of a plurality of gas stations, as shown in FIG. 29. Moreover, the theft prevention system 50*b* includes a vehicle 60*b* in place of the vehicle 60. Each of the gasoline supply devices 81, 82 and 83 is connected to the mobile telephone network 70 by a dedicated line or the like, and is capable of communication with the mobile telephone 400 and the vehicle control device 500*b* installed in the vehicle 60*b*.

The vehicle control unit 510*b* installed in the vehicle 60*b* has a construction identical to the vehicle controlling system 500.

When the vehicle 60*b* is refueled, the vehicle control device 500*b* communicates with the mobile telephone 400 via the gasoline supply device 81 provided at the gas station.

The vehicle control unit 510 of the vehicle control device 500 functions to control the locking and unlocking of a gasoline cap in the vehicle 60*b*. To unlock the gasoline cap, the communication control unit 503, the communication unit 502 and the antenna 501 to inquire of the mobile telephone network 70 as to whether there is a message for the vehicle control device 500, by radio communication, via the gasoline supply device 81. If there is a message, the mobile telephone network 70 transmits the content of the message (e.g. a vehicle operation disabling request), to the vehicle control device 500 via the gasoline supply device 81.

With this construction, the vehicle operation disabling request can be transmitted to the vehicle control device 500 with increased reliability to control the door and engine operations of the vehicle 60.

Note that, in the above description, the communication between the gasoline supply device 81 and the vehicle control device 500 is not limited to radio communication, and may instead be cable communication. For instance, an interface may be connected to the communication unit 502 of the vehicle control device 500 located towards the gas cap, and the communication unit 502 may communicate with the gasoline supply device 81 via the interface.

Alternatively, the theft prevention system 50*b* may be constituted so that the gasoline supply device 81 simply transmits a command instructing the vehicle control device 500 to communicate with the mobile telephone network 70. The vehicle control device 500 receives this command and communicates with the mobile telephone network 70 before permitting opening of the gas cap.

Note that although the theft prevention system 50*b* has been described by way of an example using gasoline supply devices installed at gas stations, the theft prevention system 50*b* is not limited to using gasoline supply devices, and may be provided in any other facilities that the vehicle may call at.

Figure 30:
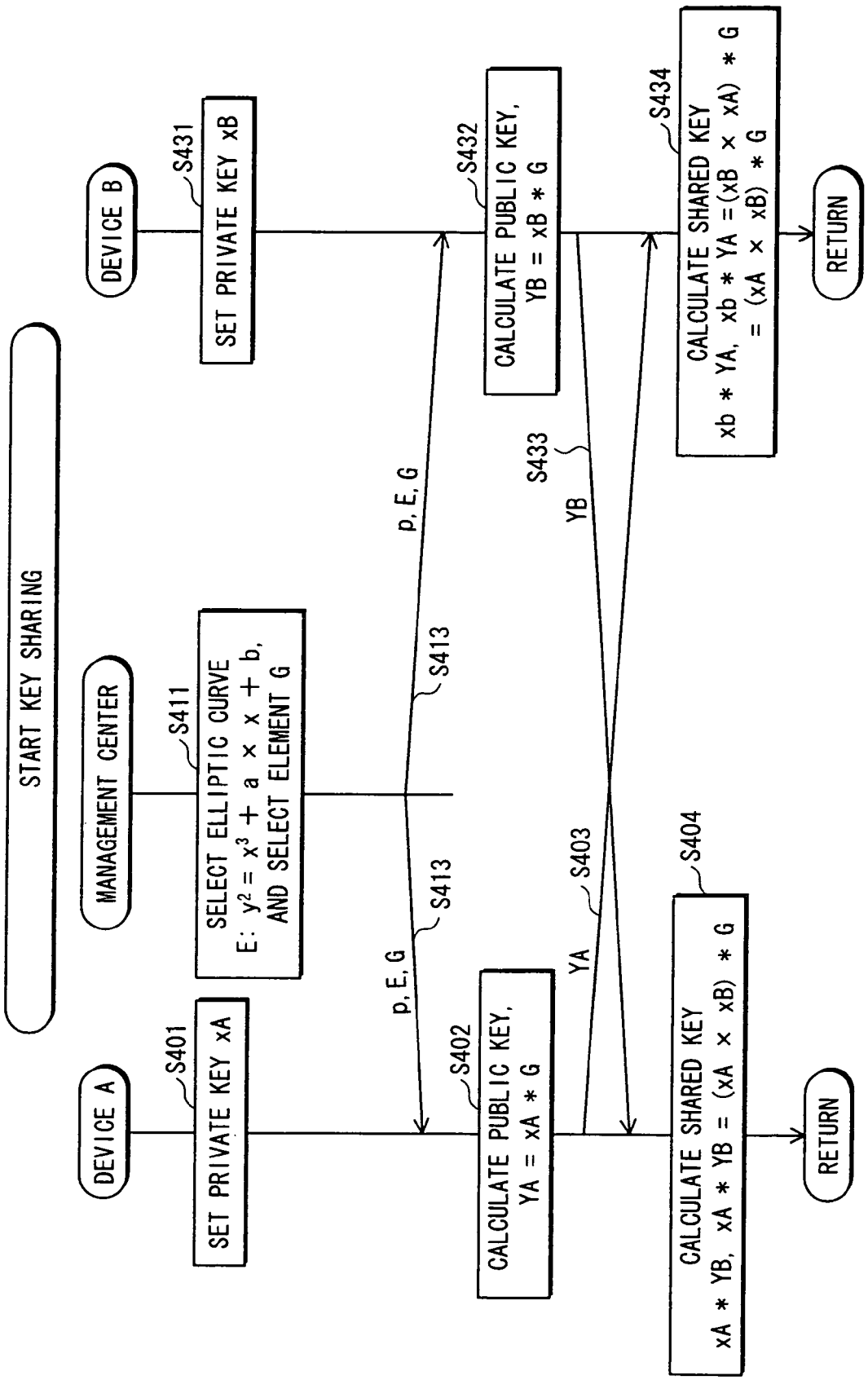
FIG. 30 is flow-chart showing operations for key-sharing.

(13) An example of the key-sharing performed between the memory card 200 and the vehicle control device 300*a* is described with reference to the flow-chart of FIG. 30. In the flow-chart, the memory card 200 and the vehicle control device 300*a* are denoted by device A and device B, respectively.

Device A sets and stores a private key xA (Step S401). Device B sets and stores a private key xB (Step S431).

A management center exists for storing and managing an elliptic curve, and a management center device is provided therein. The management center device provided at the management center selects and stores appropriate parameters a and b of the elliptic curve E: $y^2=x^3+ax+b$, and further selects and stores a prime p and an appropriate element G on the elliptic curve E. The management center device discloses the prime p, the elliptic curve E and the element G (Step S413).

The device A calculates a public key YA=xA*G (Step S402), and outputs the calculated public key YA to the device B (Step S403). Further, the device B calculates a public key YB=xB*G (Step S432), and outputs the calculated public key YB to the device A (Step S433).

Next the device A calculates shared key xA*YB (Step S404). Here, the shared key xA*YB=(xA×xB)*G.

Meanwhile, device B calculates a shared key xB*YA (Step S434). Here, the shared key xB*YA=(xB×xA)*G=(xA×xB)*G=xA*YB.

Thus, device A and device B are able to share the same session key. The security of this method relies on the difficulty of solving the discrete logarithm problem on an elliptic curve.

The symbol * indicates a multiple addition of an element included on the elliptic curve. x*G therefore represents x additions of the element G that is included on the elliptic curve, as shown in the following expression:

$$x*G = G+G+G+\ldots+G$$

(14) In the first embodiment, the memory card 200 is loaded in the instruction-use mobile telephone 100, but the present invention is not limited to this arrangement.

A memory card 200 may be built into the instruction-use mobile telephone 100. In this case, the instruction-use mobile telephone 100 receives electronic key data from the vehicle control unit 300*a*, and internally stores the received electronic key data (second electronic-key).

(15) The present invention may be constructed as follows.

The present invention is a theft prevention system constructed from a vehicle-installed device for disabling and enabling operations of a vehicle which use a vehicle key, and a mobile device capable of communicating with the vehicle-installed device.

The vehicle-installed device includes: a disabling request receiving unit operable to receive vehicle operation disabling request information; a disabling unit operable to disable vehicle operations which use a vehicle key when the disabling request receiving unit receives the vehicle operation disabling request information; a generating unit operable to generate first enabling information when the vehicle operations have been disabled by the disabling unit; a transmitting unit operable to transmit the first enabling information; a receiving unit operable to receive the second enabling information, a comparing unit operable to compare the first enabling information and the second enabling information, and an enabling unit operable, based on a result of the comparison by the comparing unit, to enable the vehicle operations which use the vehicle key.

The mobile device includes: a disabling request transmitting unit operable to transmit the vehicle operation disabling request information; an enabling information receiving unit operable to receive the first enabling information; a conversion unit operable to convert the first enabling information into second enabling information; and an enabling information transmitting unit operable to transmit the second enabling information.

Further, the present invention is a theft prevention system constructed from a vehicle-installed device for disabling and enabling operations of a vehicle which use a vehicle key, and a mobile device capable of communication with the vehicle-installed device.

The vehicle-installed device includes: a detection unit operable to detect an irregular condition of the vehicle; a disabling unit operable to disable the vehicle operations which use the vehicle key based on a result detected by the detection unit; a generating unit operable to generate first enabling information when the disabling unit has disabled the vehicle operations; a transmitting unit operable to transmit the first enabling information; a receiving unit operable to receive the second enabling information; a comparing unit operable to compare the first enabling information and the second enabling information; and an enabling unit operable to enable the vehicle operations which use the vehicle key based on a result of the comparison by the comparing unit.

The mobile device includes: an enabling information receiving unit operable to receive the first enabling information; a conversion unit operable to convert the first enabling information into second enabling information; and an enabling information transmitting unit operable to transmit the second enabling information.

Further, the present invention is a vehicle-installed device for disabling and enabling vehicle operations which use a vehicle key, the vehicle-installed device including: a disabling request receiving unit operable to receive vehicle operation disabling request information from an external source; a disabling unit operable to disable the vehicle operations which use the vehicle key when the disabling request receiving unit has received the vehicle operation disabling request information; a generating unit operable to generate first enabling information when the disabling unit has disabled the vehicle operations; a transmitting unit operable to transmit the first enabling information; a receiving unit operable to receive second enabling information from the external source; a comparing unit operable to compare the first enabling information and the second enabling information; and an enabling unit operable to enable the vehicle operations which use the vehicle key based on a result of the comparison by the comparing unit.

Further, the present invention is a vehicle-installed device for disabling and enabling vehicle operations which use a vehicle key, the vehicle-installed device including: a detection unit operable to detect an irregular condition of the vehicle; a disabling unit operable to disable the vehicle operations which use the vehicle key based on a result detected by the detection unit; a generating unit operable to generate first enabling information when the disabling unit has disabled the vehicle operations; a transmitting unit operable to transmit the first operating enabling information, a receiving unit operable to receive second enabling information from an external source; a comparing unit operable to compare the first enabling information and the second enabling information; and an enabling unit operable to enable the vehicle operations which use the vehicle key based on a result of the comparison by the comparing unit.

The disabling unit may disable a vehicle engine starting operation which uses the vehicle key.

The disabling unit may disable vehicle door locking an unlocking operations which use the vehicle key.

The first enabling information may be a random number.

The first enabling information may be a ciphertext that is an encrypted random number.

The enabling unit may enable vehicle operations which use the vehicle key when, according to the comparing unit, the first enabling information matches the second enabling information.

The enabling unit may enabling the vehicle operations which use the vehicle key when, according to the comparing unit, the first enabling information and the second enabling information satisfy a prescribed equation.

The receiving unit may receive the second enabling information by short-range radio.

The receiving unit may receive the second enabling information by a radio communication method that uses a non-contact IC card.

Further, the present invention is a mobile device for transmitting vehicle operation disabling request information to request disabling of vehicle operations which use the vehicle key, the mobile device including a disabling request transmitting unit operable to transmit the vehicle operation disabling request information.

Further, the present invention is a mobile device for transmitting second enabling information to request enabling of vehicle operations which use a vehicle key, the mobile device including: an enabling information receiving unit operable to receive first enabling information from an external source; a conversion unit operable to convert the first enabling information into the second enabling information; and an enabling information transmitting unit operable to transmit the second enabling information.

The second enabling information may be identical to the first enabling information.

The conversion unit may convert the first enabling information into the second enabling information based on a prescribed relational expression.

The enabling information transmitting unit may transmit the first enabling information by short-range radio.

The enabling information transmitting unit may transmit the first enabling information by a radio communication method that uses a non-contact IC card.

(16) Specifically each of the above devices is computer system constructed from a microprocessor, ROM, RAM, and the like. The RAM has a computer program stored therein. Each device realizes a portion of its functions as a result of the microprocessor operating in accordance with the computer program.

(17) Part or all of the components that make up each of the above devices may be constructed from a single system LSI. A system LSI is super multifunctional LSI, which is manufactured with a plurality of components integrated on a single chip. Specifically it is a computer system constructed to include a microprocessor, ROM, RAM, and the like. The RAM has a computer program stored therein. The system LSI fulfills its functions as result of the microprocessor operating in accordance with the computer program.

(18) The present invention may be any of the methods shown above. Alternatively, the present invention may be computer programs that realize these methods using a computer, or digital signals composed of the programs.

The present invention may be a computer-readable recording medium having the computer program or digital signals recorded thereon, examples of which included flexible disk, hard disk, CD-ROM, MO, DVD, DVD-ROM, DVD-RAM, BD (Blu-ray Disc), and semiconductor memory etc. Alternatively, the present invention may be the computer programs or digital signals recorded on any of these recording media.

The present invention may be the computer programs or digital signals transmitted via a data broadcast or a network the like, typical examples of which include a telecommunications network, a wireless or cable network, and the Internet.

The present invention may be a computer system provided with a microprocessor and memory, in which the memory stores the computer program and the microprocessor operates in accordance with the computer programs.

The computer programs or digital signals may be executed on a separate independent computer system by transferring the computer program or digital signals recorded on the recording medium, or by transferring the computer programs or digital signals via a network or the like.

(19) The present invention may be any combination of the above embodiments and modifications.

INDUSTRIAL APPLICABILITY

The devices and recording media of the present invention can be used administratively as well as continuously and repeatedly in all industries dealing with objects that require protection from theft. The devices constituting the present invention can be continuously and repeatedly manufactured and retailed in manufacturing industries producing electronic devices.

The invention claimed is:

1. A theft prevention system comprising: an object control device for controlling a prescribed operation of an object targeted for theft prevention; and a mobile terminal device for instructing the object control device to control the prescribed operation, wherein the mobile terminal device includes:
 an instruction transmitting unit operable to transmit, to the object control device, a warning mode instruction indicating to set a warning mode;
 an electronic key receiving unit operable to receive a first electronic key from the object control device;
 an electronic key storage unit;
 an electronic key writing unit operable to write the received first electronic key to the electronic key storage unit as a second electronic key; and
 a control instructing unit operable to instruct the object control device to control the prescribed operation, using the stored second electronic key, and wherein the object control device includes:
 an instruction receiving unit operable to receive the warning mode instruction;
 a mode setting unit operable to set the warning mode on receipt of the warning mode instruction;
 an electronic key generating unit operable to generate the first electronic key on receipt of the warning mode instruction;
 an electronic key transmitting unit operable to transmit the generated first electronic key to the mobile terminal device; and
 an object control unit operable, when the warning mode has been set, to control the prescribed operation exclusively in accordance with the control instruction from the mobile terminal device using the second electronic key, wherein the instruction transmitting unit transmits to the object control device (i) a normal mode instruction indicating change from the warning mode to a normal mode and (ii) the second electronic key stored in the electronic key storage unit, wherein the instruction receiving unit receives the normal mode instruction and the second electronic key, wherein the object control device further includes a judging unit operable to judge whether the first electronic key generated by the electronic key generating unit and the received second electronic key match, and wherein the mode setting unit changes, when the first electronic key and the second electronic key match, from the warning mode to the normal mode.

2. The theft prevention system of claim 1,
wherein the mobile terminal device further comprises:
 a completion notification receiving unit operable to receive, from the object control device, a completion notification that indicates completion of normal mode setting; and
 an electronic key deleting unit operable to delete the stored second electronic key on receipt of the completion notification.

3. The theft prevention system of claim 1, wherein the electronic key storage unit is a portable memory card.

4. The theft prevention system of claim 1, wherein
the mobile terminal device is a mobile telephone,
the instruction transmitting unit transmits the warning mode instruction via a mobile telephone network, and
the electronic key receiving unit receives the first electronic key via the mobile telephone network.

5. The theft prevention system of claim 1, wherein
the control instructing unit instructs the object control device to control the prescribed operation, by transmitting the second electronic key and control instruction information prescribing the control, by short range radio to the object control device.

6. An object control device for controlling a prescribed operation of an object targeted for theft prevention in response to a control instruction from a mobile terminal device, the object control device comprising:
 an instruction receiving unit operable to receive a warning mode instruction indicating to set a warning mode;
 a mode setting unit operable to set the warning mode on receipt of the warning mode instruction;
 an electronic key generating unit operable to generate a first electronic key;
 an electronic key transmitting unit operable to transmit the generated first electronic key to the mobile terminal device; and
 an object control unit operable, when the warning mode has been set, to control the prescribed operation exclusively in accordance with the control instruction from the mobile terminal device using a second electronic key, wherein the mobile terminal device stores the first electronic key as the second electronic key, wherein the instruction receiving unit receives, from the mobile terminal device, (i) a normal mode instruction indicating change from the warning mode to a normal mode and (ii) the second electronic key, wherein the object control device further includes a judging unit operable to judge whether the first electronic key generated by the electronic key generating unit and the received second electronic key match, and wherein the mode setting unit changes, when the first electronic key and the second electronic key match, from the warning mode to the normal mode.

7. The object control device of claim 6, wherein
when the warning mode has been set, the object control unit prohibits a prescribed operation from being performed using a mechanical key.

8. The object control device of claim 6, wherein
the object control device further comprises a completion notification transmitting unit operable to transmit to the mobile terminal device a completion notification indicating completion of normal mode setting, and
when the normal mode has been set, the object control unit prohibits the prescribed operation from being performed in accordance with the control instruction from the mobile terminal device using the second electronic key.

9. The object control device of claim 8, wherein
when the normal mode has been set, the object control unit controls the prescribed operation of the target object in accordance with a mechanical key.

10. The object control device of claim 6, wherein
the instruction receiving unit receives the warning mode instruction from the mobile terminal device.

11. The object control device of claim 6, wherein
the instruction receiving unit receives the warning mode instruction from a mobile terminal device other than the mobile terminal device.

12. The object control device of claim 6, wherein
the target object is provided with a sensor unit operable to output the warning mode instruction to the object control device on sensing an irregularity, and
the instruction receiving unit receives the warning mode instruction from the sensor unit.

13. The object control device of claim 6, wherein
the mobile terminal device is a mobile telephone, and
the instruction receiving unit receives the warning mode instruction from the mobile telephone via a mobile telephone network.

14. The object control device of claim 6, wherein
the object control unit receives the second electronic key and control instruction prescribing the control of the prescribed operation of the target object from the mobile terminal device by short-range radio, and controls the prescribed operation in accordance with the received control instruction using the received second electronic key.

15. A theft prevention system comprising: an object control device for controlling a prescribed operation of an object targeted for theft prevention; a first mobile terminal device for transmitting a warning instruction to the object control device; and a second mobile terminal device for instructing the object control device to control the prescribed operation,
wherein the first mobile terminal device includes
an instruction transmitting unit operable to transmit, to the object control device, a warning mode instruction indicating to set a warning mode,
wherein the second mobile terminal device includes:
an electronic key receiving unit operable to receive a first electronic key from the object control device;
an electronic key storage unit;
an electronic key writing unit operable to write the received first electronic key, as a second electronic key, to the electronic key storage unit; and
a control instructing unit operable to instruct the object control device to control the prescribed operation, using the stored second electronic key,
wherein the object control device includes:
an instruction receiving unit operable to receive the warning mode instruction;
a mode setting unit operable to set the warning mode on receipt of the warning mode instruction;
an electronic key generating unit operable to generate the first electronic key on receipt of the warning mode instruction;
an electronic key transmitting unit operable to transmit the generated first electronic key to the second mobile terminal device; and
an object control unit operable, when the warning mode has been set, to control the prescribed operation exclusively in accordance with the control instruction from the second mobile terminal device using the second electronic key,
wherein the second mobile terminal device transmits to the object control device (i) a normal mode instruction indicating change from the warning mode to a normal mode and (ii) the second electronic key stored in the electronic key storage unit,
wherein the instruction receiving unit receives the normal mode instruction and the second electronic key,
wherein the object control device further includes a judging unit operable to judge whether the first electronic key generated by the electronic key generating unit and the received second electronic key match, and
wherein the mode setting unit changes, when the first electronic key and the second electronic key match, from the warning mode to the normal mode.

16. A control method used by an object control device that controls a prescribed operation of an object targeted for theft prevention in response to a control instruction from a mobile terminal device, the control method comprising:
receiving a warning mode instruction indicating to set a warning mode;
setting the warning mode when the warning mode instruction is received;
generating a first electronic key;
transmitting the generated first electronic key to the mobile terminal device; and
controlling the prescribed operation exclusively in accordance with the control instruction from the mobile terminal device using a second electronic key,
wherein the mobile terminal device stores the first electronic key as the second electronic key, and
wherein the control method further comprises:
receiving, from the mobile terminal device, (i) a normal mode instruction indicating change from the warning mode to a normal mode and (ii) the second electronic key;
judging whether the generated first electronic key and the received second electronic key match; and
changing, when the first electronic key and the second electronic key match, from the warning mode to the normal mode.

17. A non-transitory computer readable recording medium having stored thereon a computer program used by an object control device that controls a prescribed operation of an object targeted for theft prevention in response to a control instruction from a mobile terminal device, wherein, where executed, the computer program causes the object control device to perform a method comprising:
receiving a warning mode instruction indicating to set a warning mode;
setting the warning mode when the warning mode instruction is received;
generating a first electronic key;
transmitting the generated first electronic key to the mobile terminal device; and
controlling the prescribed operation exclusively in accordance with the control instruction from the mobile terminal device using a second electronic key,
wherein the mobile terminal device stores the first electronic key as the second electronic key, and wherein the method further comprises:
  receiving, from the mobile terminal device, (i) a normal mode instruction indicating change from the warning mode to a normal mode and (ii) the second electronic key;
  judging whether the generated first electronic key generated and the received second electronic key match; and
  changing, when the first electronic key and the second electronic key match, from the warning mode to the normal mode.

18. A theft prevention system comprising:
a mobile telephone; and
a vehicle including a vehicle control device,
wherein the mobile telephone includes:
  a first communication unit operable to wirelessly transmit and receive information to and from the vehicle control device;
  a first information storage unit; and
  a first control unit operable, (i) in order to instruct the vehicle control device to disable the vehicle, to transmit a vehicle disabling request to the vehicle control device, to receive a first enabling information from the vehicle control device, and to write the received first enabling information as second enabling information in the first information storage unit, and (ii) in order to instruct the vehicle control device to enable the vehicle, to read the second enabling information from the first information storage unit, and to transmit the read second enabling information to the vehicle control device, and
wherein the vehicle control device includes:
  a second communication unit operable to wirelessly transmit and receive information to and from the mobile telephone;
  a vehicle control unit operable to disable or enable operations of a door and an engine included in the vehicle;
  a second information storage unit; and
  a second control unit operable, (i) when the vehicle disabling request is received from the mobile telephone, to generate the first enabling information, to write the generated first enabling information in the second information storage unit, to transmit the first enabling information to the mobile telephone, and to instruct the vehicle control unit to disable the operations of the door and the engine included in the vehicle, and (ii) when the second enabling information is received from the mobile telephone, to read the first enabling information from the second information storage unit, to compare the read first enabling information and the received second enabling information, and when the read first enabling information and the received second enabling information match, to instruct the vehicle control unit to enable the operations of the door and the engine included in the vehicle.

19. A vehicle control device, comprising:
a communication unit operable to wirelessly transmit and receive information to and from a mobile telephone having a first information storage unit;
a vehicle control unit operable to disable or enable operations of a door and an engine included in a vehicle;
a second information storage unit; and
a control unit operable, (i) when a vehicle disabling request is received from the mobile telephone, to generate first enabling information, write the generated first enabling information in the second information storage unit, transmit the first enabling information to the mobile telephone, and instruct the vehicle control unit to disable the operations of the door and the engine included in the vehicle, and (ii) when second enabling information is received from the mobile telephone, to read the first enabling information from the second information storage unit, compare the read first enabling information and the received second enabling information, and when the read first enabling information and the received second enabling information match, instruct the vehicle control unit to enable the operations of the door and the engine included in the vehicle,
wherein the mobile telephone instructs the vehicle control device to disable the vehicle by transmitting the vehicle disabling request to the vehicle control device, receiving the first enabling information from the vehicle control device, and writing the received first enabling information as the second enabling information in the first information storage unit, and
wherein the mobile telephone instructs the vehicle control device to enable the vehicle by reading the second enabling information from the first information storage unit, and transmitting the read second enabling information to the vehicle control device.

20. A control method for a vehicle control device including a second information storage unit, the method comprising:
  wirelessly transmitting and receiving information to and from a mobile telephone having a first information storage unit;
  disabling, when a vehicle disabling request is received from the mobile telephone, operations of a door and an engine included in a vehicle, wherein the disabling the operations of the door and the engine included in a vehicle includes (i) generating first enabling information, (ii) writing the generated first enabling information in the second information storage unit, (iii) transmitting the first enabling information to the mobile telephone, and (iv) disabling the operations of the door and the engine included in the vehicle; and
  enabling, when second enabling information is received from the mobile telephone, the operations of the door and the engine included in the vehicle, wherein the enabling the operations of the door and the engine included in a vehicle includes (i) reading the first enabling information from the second information storage unit, (ii) comparing the read first enabling information and the received second enabling information, and (iii) when the read first enabling information and the received second enabling information match, enabling the operations of the door and the engine included in the vehicle,
wherein the mobile telephone instructs the vehicle control device to disable the vehicle by transmitting the vehicle disabling request to the vehicle control device, receiving the first enabling information from the vehicle control device, and writing the received first enabling information as the second enabling information in the first information storage unit, and
wherein the mobile telephone instructs the vehicle control device to enable the vehicle by reading the second enabling information from the first information storage unit, and transmitting the read second enabling information to the vehicle control device.

21. A non-transitory computer readable recording medium having recorded therein a computer program for controlling a vehicle control device including a second information storage unit, wherein, when executed, the computer program causes the vehicle control device to perform a method comprising:

wirelessly transmitting and receiving information to and from a mobile telephone having a first information storage unit;

disabling, when a vehicle disabling request is received from the mobile telephone, operations of a door and an engine included in a vehicle, wherein the disabling the operations of the door and the engine included in a vehicle includes (i) generating first enabling information, (ii) writing the generated first enabling information in the second information storage unit, (iii) transmitting the first enabling information to the mobile telephone, and (iv) disabling the operations of the door and the engine included in the vehicle; and enabling, when second enabling information is received from the mobile telephone, the operations of the door and the engine included in the vehicle, wherein the enabling the operations of the door and the engine included in a vehicle includes (i) reading the first enabling information from the second information storage unit, (ii) comparing the read first enabling information and the received second enabling information, and (iii) when the read first enabling information and the received second enabling information match, enabling the operations of the door and the engine included in the vehicle, wherein the mobile telephone instructs the vehicle control device to disable the vehicle by transmitting the vehicle disabling request to the vehicle control device, receiving the first enabling information from the vehicle control device, and writing the received first enabling information as the second enabling information in the first information storage unit, and wherein the mobile telephone instructs the vehicle control device to enable the vehicle by reading the second enabling information from the first information storage unit, and transmitting the read second enabling information to the vehicle control device.

22. An object control device for controlling a prescribed operation of an object targeted for theft prevention in response to a control instruction from a mobile terminal device, the object control device comprising a processor including:

an instruction receiving unit operable to receive a warning mode instruction indicating to set a warning mode;

a mode setting unit operable to set the warning mode on receipt of the warning mode instruction;

an electronic key generating unit operable to generate a first electronic key;

an electronic key transmitting unit operable to transmit the generated first electronic key to the mobile terminal device; and an object control unit operable, when the warning mode has been set, to control the prescribed operation exclusively in accordance with the control instruction from the mobile terminal device using a second electronic key, wherein the mobile terminal device stores the first electronic key as the second electronic key, wherein the instruction receiving unit receives, from the mobile terminal device, (i) a normal mode instruction indicating change from the warning mode to a normal mode and (ii) the second electronic key, wherein the processor further includes a judging unit operable to judge whether the first electronic key generated by the electronic key generating unit and the received second electronic key match, and wherein the mode setting unit changes, when the first electronic key and the second electronic key match, from the warning mode to the normal mode.

23. The object control device of claim 22, wherein when the warning mode has been set, the object control unit prohibits a prescribed operation from being performed using a mechanical key.

24. The object control device of claim 22, wherein the processor further includes a completion notification transmitting unit operable to transmit to the mobile terminal device a completion notification indicating completion of normal mode setting, and when the normal mode has been set, the object control unit prohibits the prescribed operation from being performed in accordance with the control instruction from the mobile terminal device using the second electronic key.

25. The object control device of claim 24, wherein when the normal mode has been set, the object control unit controls the prescribed operation of the target object in accordance with a mechanical key.

26. The object control device of claim 22, wherein the instruction receiving unit receives the warning mode instruction from the mobile terminal device.

27. The object control device of claim 22, wherein the instruction receiving unit receives the warning mode instruction from a mobile terminal device other than the mobile terminal device.

28. The object control device of claim 22, wherein the target object is provided with a sensor operable to output the warning mode instruction to the object control device on sensing an irregularity, and the instruction receiving unit receives the warning mode instruction from the sensor.

29. The object control device of claim 22, wherein the mobile terminal device is a mobile telephone, and the instruction receiving unit receives the warning mode instruction from the mobile telephone via a mobile telephone network.

30. The object control device of claim 22, wherein the object control unit receives the second electronic key and control instruction prescribing the control of the prescribed operation of the target object from the mobile terminal device by short-range radio, and controls the prescribed operation in accordance with the received control instruction using the received second electronic key.

* * * * *